US009302393B1

(12) United States Patent
Rosen et al.

(10) Patent No.: US 9,302,393 B1
(45) Date of Patent: Apr. 5, 2016

(54) INTELLIGENT AUDITORY HUMANOID ROBOT AND COMPUTERIZED VERBALIZATION SYSTEM PROGRAMMED TO PERFORM AUDITORY AND VERBAL ARTIFICIAL INTELLIGENCE PROCESSES

(71) Applicants: Alan Rosen, Redondo Beach, CA (US); David B. Rosen, Woodland Hills, CA (US)

(72) Inventors: Alan Rosen, Redondo Beach, CA (US); David B. Rosen, Woodland Hills, CA (US)

( * ) Notice: Subject to any disclaimer, the term of this patent is extended or adjusted under 35 U.S.C. 154(b) by 0 days.

(21) Appl. No.: 14/613,054

(22) Filed: Feb. 3, 2015

Related U.S. Application Data

(63) Continuation-in-part of application No. 14/253,861, filed on Apr. 15, 2014.

(51) Int. Cl.
| | | |
|---|---|---|
| *G05B 15/00* | (2006.01) |
| *G05B 19/00* | (2006.01) |
| *B25J 9/16* | (2006.01) |
| *B62D 57/032* | (2006.01) |
| *G06N 3/00* | (2006.01) |

(52) U.S. Cl.
CPC .............. *B25J 9/1694* (2013.01); *B62D 57/032* (2013.01); *G06N 3/008* (2013.01); *Y10S 901/01* (2013.01); *Y10S 901/46* (2013.01); *Y10S 901/47* (2013.01); *Y10S 901/50* (2013.01)

(58) Field of Classification Search
CPC ........ G10L 15/04; G10L 15/22; G06N 3/008; G06N 3/004

USPC .................................................. 701/245–264
See application file for complete search history.

(56) References Cited

U.S. PATENT DOCUMENTS

| | | | | |
|---|---|---|---|---|
| 4,805,107 | A * | 2/1989 | Kieckhafer et al. ........... 714/4.3 |
| 6,249,763 | B1 * | 6/2001 | Minematsu .................... 704/252 |
| 6,560,512 | B1 * | 5/2003 | Rosen et al. ................... 700/258 |
| 7,016,841 | B2 * | 3/2006 | Kenmochi et al. ............ 704/258 |
| 7,680,660 | B2 * | 3/2010 | Kudoh ........................... 704/248 |
| 8,255,222 | B2 * | 8/2012 | Hirose et al. .................. 704/261 |
| 8,594,845 | B1 * | 11/2013 | Gharpure ....................... 700/253 |
| 2002/0061504 | A1 * | 5/2002 | Saijo et al. .................... 434/268 |
| 2003/0191643 | A1 * | 10/2003 | Belenger et al. .............. 704/254 |
| 2004/0093214 | A1 * | 5/2004 | Belenger et al. .............. 704/269 |
| 2004/0193408 | A1 * | 9/2004 | Hunt ............................. 704/209 |
| 2005/0038647 | A1 * | 2/2005 | Baker ............................ 704/231 |
| 2005/0131680 | A1 * | 6/2005 | Chazan et al. ................ 704/205 |

(Continued)

*Primary Examiner* — Khoi Tran
*Assistant Examiner* — Harry Oh

(57) ABSTRACT

The disclosed Auditory RRC-Humanoid Robot equipped with a verbal-phoneme sound generator is a computer-based system programmed to reach high levels of human-like verbal-AI. Behavioral programming techniques are used to reach human-like levels of identification-AI, recognition-AI, and comprehension-AI of all the words and sentences presented to the robot as verbal input signals. An innovative behavioral speech processing methodology is used to recognize and repeat the acoustic sequential set of phoneme signals that comprise the verbally generated speech of human speakers. The recognized and repeated sequential set of phoneme signals are then mapped onto a unique phonetic structure such as all the words and clauses listed in a 50,000 word lexicon that may then make up the vocabulary of the RRC-Robot. The system is programmed to hear and understand verbal speech with its auditory sensors, and intelligently responds by verbally talking with its verbal-phoneme sound generator.

20 Claims, 15 Drawing Sheets

(56) References Cited

U.S. PATENT DOCUMENTS

| | | | |
|---|---|---|---|
| 2008/0256008 A1* | 10/2008 | Kwok | 706/20 |
| 2009/0149991 A1* | 6/2009 | Sumida et al. | 700/246 |
| 2009/0187278 A1* | 7/2009 | Zhuk | 700/246 |
| 2009/0319267 A1* | 12/2009 | Kurki-Suonio | 704/235 |
| 2012/0191460 A1* | 7/2012 | Ng-Thow-Hing et al. | 704/272 |
| 2013/0218339 A1* | 8/2013 | Maisonnier et al. | 700/257 |
| 2014/0039675 A1* | 2/2014 | Ead | 700/245 |
| 2015/0112687 A1* | 4/2015 | Bredikhin | 704/260 |

* cited by examiner

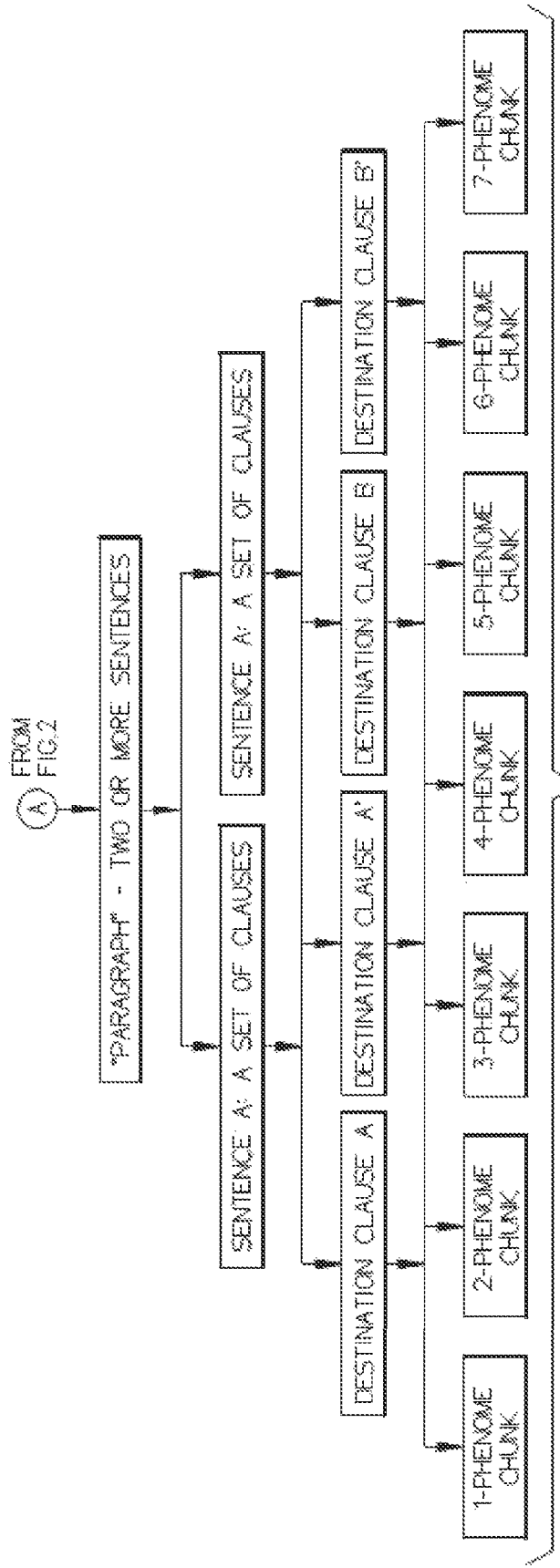

P-DIRECTIONAL SEQUENCE OF NODAL TRANSITIONS IN A 5-DIMENSIONAL SPACE
(AT EACH NODE THERE ARE 120 PHONEME MAGNITUDES (AFTs) EACH (AFT) IS DENOTED BY A TRANSITION TO AN ADJACENT NODE)

P-DIRECTIONAL NAVIGATIONAL PATH FOR A 5-PHONEME WORD THROUGH A 5-DIMENSIONAL PHONEME SPACE

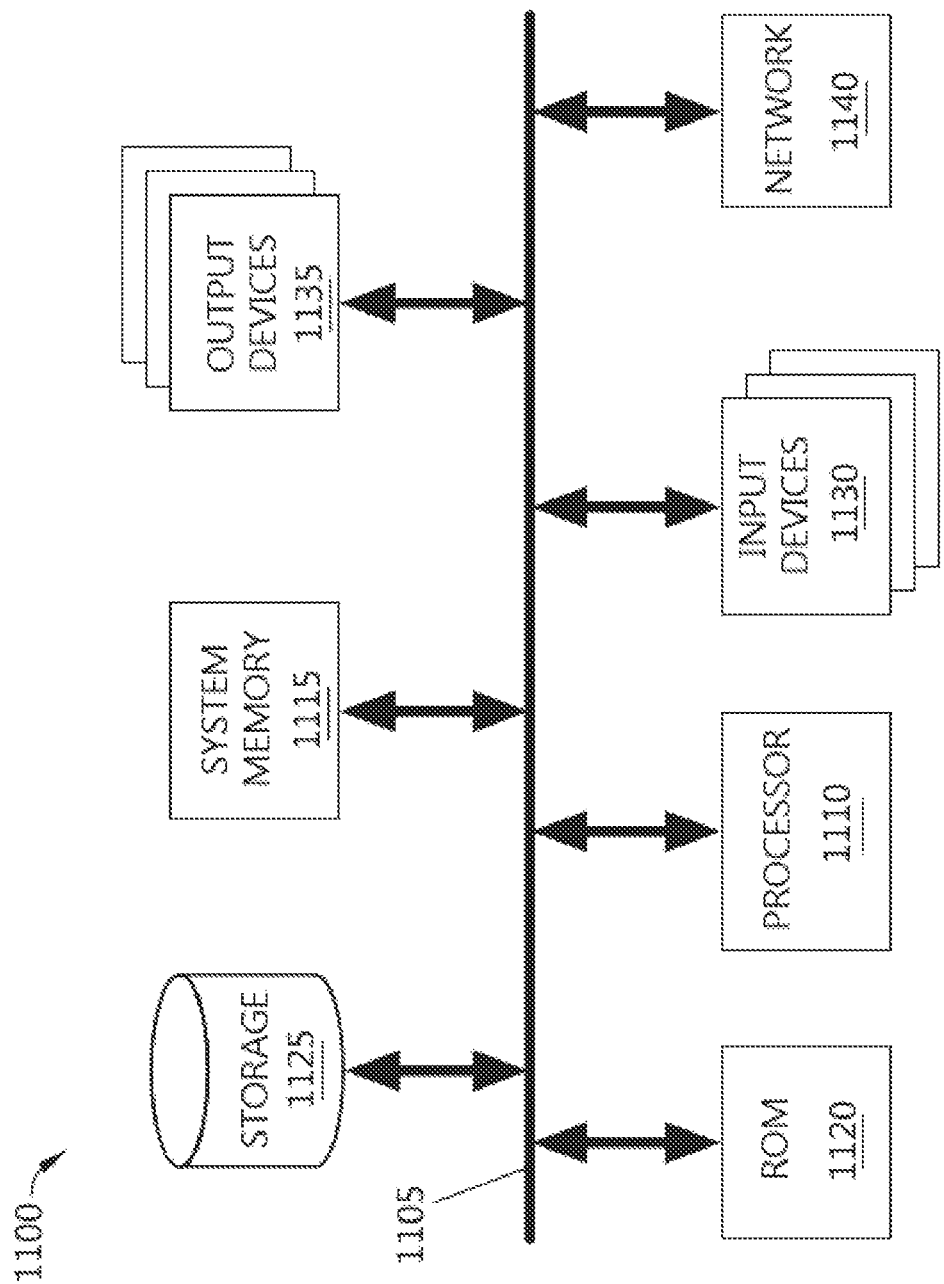

INTELLIGENT AUDITORY HUMANOID ROBOT AND COMPUTERIZED VERBALIZATION SYSTEM PROGRAMMED TO PERFORM AUDITORY AND VERBAL ARTIFICIAL INTELLIGENCE PROCESSES

CLAIM OF BENEFIT TO PRIOR APPLICATION

This application is a continuation-in-part of and claims benefit to U.S. Non-Provisional patent application Ser. No. 14/253,861, entitled "Intelligent Visual Humanoid Robot And Computer Vision System Programmed To Perform Visual Artificial Intelligence Processes," filed Apr. 15, 2014. The U.S. Non-Provisional patent application Ser. No. 14/253,861 is incorporated herein by reference.

CROSS-REFERENCE TO RELATED APPLICATIONS

This application is related to the following applications: U.S. patent application Ser. No. 10/041,713, entitled "Relational Robotic Controller," filed Jan. 4, 2002, now issued as U.S. Pat. No. 6,560,512; and U.S. patent application Ser. No. 09/761,960, entitled "Relational Correlation Sequencer," filed Jan. 17, 2001. The U.S. patent application Ser. No. 10/041,713, now issued as U.S. Pat. No. 6,560,512, and U.S. patent application Ser. No. 09/761,960 are incorporated herein by reference.

BACKGROUND

Embodiments of the invention described in this specification relate generally to human-like artificial intelligence, and more particularly, to human-like artificial intelligence of relational robotic controller (RRC)-controlled Humanoid robotic systems.

The design of "thinking computers" has been a goal of the discipline of Artificial Intelligence (AI) since the advent of digital computers. In 1950, Alan Turing, arguably, the founder of AI, posed the question "when is a machine thinking'?" His approach to an answer was in terms of the behavior of the machine (Turing, A. M. 1950; "Computing machinery and Intelligence" Mind, 59 433-60). He devised an I.Q. 'Turing test' based on the conversational behavior of the machine; and deemed any machine that passed the I.Q.-test to be a thinking machine.

Following Alan Turing, this disclosure describes a building path for a machine that can reach human-like levels of verbal Artificial Intelligence (AI), defined in terms of the verbal behavior of the machine. But instead of programming the computer with AI, we first program a 'robotic self' into the system, that identifies the robotic system, and then program, experientially, all the AI that the robot gains with respect to, or into the robotic self coordinate frame of the system. So that it is the robotic self that develops a high IQ-level of intelligence, NOT the objective-mechanical digital computer system.

We have thereby designed a system, called a Relational Robotic Controller (RRC)-system that has a subjective identity and AI-knowledge associated with that identity. It is the 'robotic self,' programmed into the computer that has verbal intelligence, not the objective-mechanical digital computer.

A Note about Human-Like Levels of AI

Human-like levels of AI have never before been programmed into computer systems. For that reason, embodiments of the invention described in this disclosure differentiate between objective data and subjective data (data programmed with respect to a 'robotic self' coordinate frame of the system). Objective data represents the data programmed into most of the present day digital computers and computing devices. By use of symbolic logic algorithms these computing devices may exhibit forms of artificial intelligence. However, this specification labels all such intelligence as machine-like intelligence, rather than human-like intelligence. Machine-like intelligence may, therefore, refer to the objective knowledge programmed into all modern day computing devices. In contrast, human-like intelligence refers to the data programmed into the computing system with respect to the robotic self-coordinate frame of the system.

All programmable digital computers do not have a "self identity" as a human does, that could absorb and convert all data into subjective knowledge, knowledge absorbed relative to the "self" of the machine. Therefore, the ordinary computers do not have human-like intelligence, they have machine-like intelligence.

Machine-like intelligence may refer to the objective knowledge programmed into all modern day computing devices. Human-like intelligence is obtained relative to the "self" of the machine. Human-like intelligence is called subjective knowledge.

The following are six requirements of human intelligence that are fundamental to any quantitative measure of intelligence. When those six requirements are imposed on a robotic computer system, the system may achieve human-like levels of AI. Those six requirements also form the basis for a quantitative definition of human-like AI (see lexicography section).

Requirement #1. The Robotic Controller Must Relate, Correlate, Prioritize and Remember Sensory Input Data.

It has been observed that human intelligence in the human brain is generally achieved by relating, correlating, prioritizing and remembering input patterns that are observed by the human sensory system (consisting of the tactile, visual, auditory, olfactory and gustatory sensors). Therefore relating, correlating, prioritizing and remembering must be the essential analytic tool of a robotic controller. The RRC, (a proprietary robotic controller of MCon Inc.), was specifically designed to emulate the operation of the human brain. It also was designed to operate with a 'self' circuit that is the central hub of intelligence for the whole robotic system.

Requirement #2. The Robotic System Must have Proprioceptive Knowledge.

Humans have a self-location and identification coordinate frame that is trained from infancy to give the human brain a proprioceptive self-knowledge capability. Even a baby, with a self-knowledge capability, instinctively knows the location of every surface point on its body, the location of its flailing limbs, and by extension, the location of every coordinate frame point in the near space defined by its flailing limbs. The fundamental design characteristic of any human-like intelligent system is a centralized hub of intelligence that is the centralized "self location and identification" coordinate frame of the system. The RRC-Humanoid Robot is designed to give the robot a form of proprioceptive knowledge, similar to human proprioceptive intelligence. In the RRC-Robot, the self-knowledge capability is the basis for all knowledge.

Requirement #3. Contextual 'Self-Knowledge' of Other Sensory Data Must be Achieved by Relating/Correlating with the Self-Location and Identification Coordinate Frame of the System.

In order to achieve contextual 'self-knowledge' of the visual data, auditory data, olfactory data, gustatory data, and vestibular data, all the data obtained from those human-like sensors must be related and correlated with the self-knowledge, self-location and identification coordinate frame. The RRC is ideally suited to relate and correlate the visual, auditory, olfactory, and gustatory data with the self-location and identification coordinate frame that serves as the central hub of intelligence of an RRC-robotic system.

Requirement #4. Human Intelligence is Gained Only from the Human-Like Sensors.

In this disclosure we consider the external sensors: Tactile, visual, auditory, olfactory, gustatory, and vestibular sensors. These sensors provide for the sensations associated with human 'feeling,' 'seeing,' 'hearing,' 'smelling,' 'tasting,' and 'balancing,' respectively.

The recording monitors of the RRC-Humanoid Robot are mechano-electric sensors that emulate the external sensors of humans. The 6-robotic sensors should be human-like sensors designed to gain the same information as is gained by the human sensors. These sensors provide for behavioral/experiential intelligence associated with 'experiential feeling,' 'experiential seeing,', 'experiential hearing,' 'experiential smelling,' 'experiential tasting,' and 'experiential balancing.' See the disclaimer at the end of the Detailed Description of the Invention Section to clarify that the inventors claim that the robot behaves as if it 'feels,' 'sees,' 'hears,' 'smells,' or 'tastes,' the input data.

Requirement #5. Human Intelligence is Experiential Intelligence.

Humans learn from, and remember their experiences throughout their lifetime. A behaviorally programmed human-like system has a memory system that remembers the experiences of the robot and emulates the experiential intelligence of a human. The RRC robot has a memory system that may be behaviorally programmed to remember all its experiences.

Requirement #6. Human-Like Intelligence is Gained Only by a Mechanically Human-Like Robotic System.

The mechanical robotic body and associated sensors must simulate the human body and the human sensors. The robotic body must be bipedal, standing and walking upright with two arms, hands and five fingers per hand free to manipulate objects in the environment. The six (6) robotic sensors should be human-like sensors designed to gain the same information as is gained by the human sensors. The mechanical robotic body of the RRC-Humanoid Robot emulates the static and dynamic characteristics of the human body.

Those six requirements must be fulfilled by any robotic computer/controller in order to have a human-like AI capability. Those six requirements form the basis for the robotic definition of human-like intelligence (see lexicography section).

Embodiments of the Invention

RRC-Humanoid Robots

Embodiments of the Invention Described in this Disclosure Pertain to Intelligent Auditory RRC-Humanoid Robots Equipped with a Computerized Verbalization System.

This disclosure describes an RRC-based computer auditory and verbalization system called an Auditory RRC-humanoid robot that is programmed to hear and understand human speech and respond by talking intelligently. In addition, the experiential or behavioral form of programming coupled with the memory system, leads to a robotic capability of abstracting or conceptualizing the input data patterns detected by the robot (see section D, Step 7, paragraph titled 'conceptualization'). This level of auditory and verbalization AI is analogous to the intelligence that may be gained from the human 'hearing and speaking' experience. The innovations of this disclosure lie in the design of a human-like microphone based auditory recording monitor, the design of a verbal-phoneme sound generator and the interface circuits between the auditory recording monitor, verbal-phoneme sound generator and a relational robotic controller system that may be programmed to reach human-like levels of auditory-AI, analogous to human-like 'hearing and speaking' However, a relational robotic controller, called a RRC (Relational Robotic Controller)-system has already been patented and is described in the related applications section. The following is a general discussion relating to the RRC and the human-like AI gained by the mechanical analogues to the other human external sensors (tactile, visual, olfactory, gustatory, vestibular, etc.), in addition to the auditory and vocalizing systems of humans.

Smart Robotic Systems Programmed to Reach Human-Like High IQ Levels of AI.

A computer based robotic system called an Auditory RRC-humanoid robot is described in this disclosure. The RRC-humanoid robot is a computer-based system that may be programmed to become a highly intelligent "smart system." The intelligence level of the RRC-humanoid robot is exemplified by the low IQ machine devised by Alan Turing, the founding father of Artificial Intelligence (AI). However, the low IQ Turing machine did not have human-like intelligence. It was just another objective computing device programmed to reach machine-like levels of AI. On the other hand, the RRC-Humanoid Robot is programmed to reach human-like levels of AI by relating all data (knowledge) to a defined/centralized "self" (a self location and identification coordinate frame) within the computer. The intelligence level (the IQ) of the system is quantified by the number of programmed data-facts that are related and correlated to the self-location and identification coordinate frame of the system. An auditory RRC-Humanoid Robot may be programmed to reach IQ-levels exceeding the IQ of a college professor. RRC-recording monitor systems that are programmed to reach human-like levels of AI are called Auditory RRC-humanoid robots.

RRC-Humanoid Robots: A Revolutionary Development.

Human-like intelligence levels have never before been programmed into a computer system. The inventors believe that RRC-humanoid robots, exhibiting human-like and super-human-like levels of intelligence, will revolutionize the 21st century so that humanoid RRC-robotic systems are as common as automobiles.

An RRC-humanoid robot includes at least the following:

a) A mechanical robotic system: The mechanical system is made up of a human-like robotic body, bipedal limbs, energy-power source, and the motors and gears required to move the body, limbs, arms, hands, and fingers.

b) Sensory recording monitors: The human-like recording monitors are those that simulate the six human external sensors (tactile, vestibular, visual, auditory, olfactory and gustatory). The recording monitors are the data-gathering portions of the RRC-humanoid robotic system. They include pressure transducer sensors (tactile), vestibular (balance) sensors, video-visual sensors (visual), microphones and verbal phoneme generators (auditory), gas chromatograph (olfactory), and wet mass spectrometer (gustatory). All artificial intelligence for the system is gained by processing/programming the input data obtained from the 6 human-like recording monitors.

c) A Relational Robotic Controller (RRC): The RRC is used to control the motors and verbal-phoneme sound generator of the mechanical robotic system. Note that RRC, (U.S.

Pat. No. 6,560,512, issued May 6, 2003), is an operating system that has been designed (reverse engineered) to operate like the human brain (based on the assumption that the human brain relates, correlates, prioritizes and remembers rather than computes and solves problems). An RRC consists of sets of Relational Correlation Sequencer (RCS) modules (See the Incorporated Disclosure listed in Related Applications section) and associated memory units called Task Selector Modules (TSMs) that operate by relating and correlating the input signals and prioritizing and remembering important correlations. Relational and correlational training is facilitated by the RCS-modules that make up the RRC-system.

d) An interface circuit between the sensory recording monitors and the RRC-controller. In general, the interface circuit of any intelligent RRC-Humanoid Robot is the most innovative element in the system. For any one of the recording monitors incorporated into a humanoid RRC-system, four major steps are required to properly design the interface.

1) The required human-like intelligence level of the sensory input q-signals must be specified.

2) The sensory system must be designed so that the discrimination and resolution of the signals is compatible with each of the specifications of each of the 6 human external sensors (tactile, vestibular, visual, auditory, olfactory and gustatory).

3) The sensory system signals must be calibrated and scaled with the dimensionality and scaling present in the RRC-Nodal Map Module to which the data is applied.

4) Proof that the interface is properly designed is obtained by specifying the training-programming of the RRC so as to achieve the required level of human-like artificial intelligence.

The inventors have invented 3-preferred embodiments of the patented (tactile) RRC-Humanoid Robot that may be programmed with human-like intelligence: a) a visual RRC-humanoid robot equipped with human-like tactile and visual sensors, described in the United States co-pending non-provisional patent application Ser. No. 14/253,861 (see claim of benefit to prior application section), b) an auditory RRC-humanoid robot, described in this disclosure, is built upon the visual humanoid robot by adding human-like auditory sensors and a verbal-phoneme sound generator, to give it a verbal 'talking' capability, and c) a complete RRC-humanoid robot incorporating all 6-human-like external sensors: it is built upon the auditory humanoid robot by adding the human-like olfactory sensor (gas chromatograph) and human-like gustatory sensor (wet mass spectrometer).

Embodiments of the auditory RRC-humanoid robot system include human-like auditory sensors, a verbal-phoneme sound generator, and programming that reaches human-like levels of declarative AI, and are built upon a visual RRC-humanoid robot system that is designed to visualize and internalize the binocular video-visual real time data input to the system. The system is programmed to perform phoneme, word, and sentence pattern recognition, identification, and comprehension and to respond verbally to words, sentences, patterns detected by the RRC-system.

The following innovative features have been incorporated into some embodiments of the auditory RRC-humaniod robot system: A) Incorporation of the RRC (Patented) and RCS (Incorporated disclosure); B) Incorporation of a p-vector phoneme space, input to the multi-dimensional Nodal Map Module; C) Incorporation of a babbling Sequence Stepper Module; D) A paradigm shift in the speech processing methodology employed in mapping the acoustic signals onto phonetic structures (relating and repeating); E) Incorporation of a search engine access rule to facilitate the search for a response to any query; F) Incorporation of a central hub of intelligence within the Declarative Hierarchical Task Diagram (DHTD); G) Design of a self-knowledge and awareness-monitoring capability; and H) Design of an interface circuit compatible with human-like levels of AI.

The Field of the Inventive Embodiments

The field of the inventive embodiments described in this disclosure is relatively narrow. It is the design and development of various human-like sensory recording monitors that interface with a central controller that meet the requirements #1, #2, #3 and #5 described in the BACKGROUND section by reference to the sub-section entitled "A Note About Human-Like Levels of AI". In the preferred embodiment of this disclosure the patented RRC-controller (U.S. Pat. No. 6,560,512, issued May 6, 2003), is utilized to meet the requirements listed above. However, any relational robotic controller (rrc) (in general, designated by the lower case abbreviation rrc), that meets requirement #1, #2, #3 and #5, may be in the field of the invention. In the following sections the letters RRC denote the patented Relational Robotic Controller utilized in the preferred embodiment of this disclosure. Whereas the lower case letters, rrc (relational robotic controller), denote any robotic controller that meets requirements #1, #2, #3 and #5.

Robotic computing devices that are in the field of this disclosure are constrained by the 6-requirements (listed above) that define human-like levels of AI. After considering the requirements, the inventors conclude that there are five sensory rrc-Humanoid Robotic systems, and one class of super-sensory rrc-Humanoid robotic systems that are in the field of this disclosure.

Only Humanoid rrc-Controlled Robots Equipped with Human-Like Sensors are in the Field of the Inventive Embodiments Only rrc-controlled robots are in the field of the invention. Requirements #1, #2, #3 and #5 assure that only those robots controlled by a rrc (relational robotic controller) may be used to achieve levels of human-like AI.

Two essential elements to programming human-like high IQ-levels of AI into a system limit the field of this disclosure to the group of rrc-controlled Robots. The first is that the rrc must be specifically designed to operate like the human brain (requirement #1). That is, the rrc relates, correlates, prioritizes and remembers (requirement #5) input data, rather than computes, calculates, and displays the data, as most modern day computing devices do. The second is the rrc must be specifically designed to adhere to requirements #2, the proprioceptive 'self-knowledge' capability. That is, the rrc must generate a self-location and identification robotic self-coordinate frame that forms a robotic self-identity and a centralized hub of 'intelligence' for the system, and the rrc must be behaviorally programmed (itch-scratch methodology) to emulate the experiential 'self-knowledge' gained by humans (requirement #5). Note that the preferred embodiment, patented RRC meets all those requirements.

Only Humanoid Robots Controlled by Human-Like Sensors are in the Field of Inventive Embodiments Requirements #4 and #6 assure that only robotic systems that are humanoid systems, equipped with human-like sensors are in the field of the inventive embodiments described in this disclosure. Requirement #6 assures that the mechanical robotic body is human-like. Requirement #4 assures that the humanoid robot is equipped with the six external human-like sensors (i.e., tactile, vestibular, visual, auditory, olfactory, and gustatory sensors).

Those requirements restrict the group of rrc-humanoid robots that are in the field of the inventive embodiments to the following rrc-Humanoid Robots: The tactile, vestibular, visual, auditory, olfactory, and gustatory rrc-Humanoid robots.

Since all the input data of humans comes from the five external sensors (i.e., tactile, visual, auditory, olfactory, and gustatory sensors), there are five sensory rrc-humanoid robots that may be programmed with human-like AI. In addition, an rrc-Humanoid robot may be equipped with non-human sensors, in addition to its human-like sensors, to form a super-sensory rrc-Humanoid Robot. The super-sensory rrc-humanoid robot is described and listed below as the sixth rrc-Humanoid robot.

1. The Tactile rrc-Humanoid Robot:

The tactile rrc-humanoid robot must be outfitted with pressure transducer tactile sensors simulating the tactile sensors embedded in the human skin, and vestibular sensors to give the robot a balancing capability. A tactile rrc-humanoid robot must be programmed with a self identity form of AI, an itch-scratch capability to move its body and limbs so as to scratch any itch point on the robotic body, and a bi-pedal ambulating AI-capability with the aid of balance-vestibular sensors. Note that the RRC-Humanoid Robot meets all those requirements and is in the field of this invention.

2. The Visual rrc-Humanoid Robot:

The visual rrc-humanoid robot is outfitted with a binocular video-visual system that simulates human vision, in addition to the tactile and vestibular sensors of the tactile rrc-humanoid robot. Note that a visual RRC-Humanoid robot programmed with human-like visual-intelligence is described in co-pending U.S. patent application Ser. No. 14/253,86. The visual RRC-Humanoid robot may be programmed with a visualization form of AI and its behavioral programming simulates the visualization or 'seeing' intelligence of a human that observe the same three dimensional image as the image formed by the binocular video-visual RRC-Humanoid robotic system.

3. The Auditory rrc-Humanoid Robot:

The auditory rrc-humanoid robot is a visual RRC-Humanoid robot outfitted with sound pick-up microphones that simulate the human ear, and a verbal-phoneme sound generator that gives the robot a verbal vocalizing or 'talking' capability. Note that the auditory RRC-Humanoid Robot, the subject of this disclosure, is a human-like robotic system, controlled by the proprietary Relational Robotic Controller (RRC) and programmed to reach human-like levels of artificial intelligence in 'hearing and understanding' verbal speech with its auditory sensors, and intelligently-verbally respond to the 'heard' verbal speech with its vocalizing verbal-phoneme sound generator.

4. The Olfactory rrc-Humanoid Robot:

The olfactory rrc-humanoid robot is an auditory rrc-Humanoid robot equipped with a gas chromatograph the simulates the nasal sensory system of humans. This robot must be programmed with a 'smell-sensing' form of AI that simulates the 'smelling' capability of humans. The engineering challenge in the design of the olfactory rrc-humanoid robot is the design of the interface circuit between the gas chromatograph and the rrc so that the robot has a more limited human-like analytic capability of analyzing the air sampled in the gas chromatograph input chamber. A gas chromatograph with a greater than human-like analytic 'smelling' capability is a super-sensor in terms of its analytical capability, and may be used to give the Robot a super-human-like form of AI. However, the more limited human-like form of 'smelling' AI must be designed into the system so that the robot can verbally describe the super smell to humans who have the more limited 'smelling' capability.

5. The Gustatory rrc-Humanoid Robot:

The gustatory rrc-humanoid robot is an olfactory rrc-Humanoid robot equipped with a wet mass spectrometer the simulates the 'mouth chamber taste' sensory system of humans. This robot must be programmed with a 'tasting' form of AI that simulates the 'tasting' capability of humans. The engineering challenge in the design of the gustatory rrc-humanoid robot is the design of the interface circuit between the wet mass spectrometer and the rrc so that the robot has a more limited, human-like analytic capability of analyzing the food and other objects sampled in the input chamber (for example, wine tasting). A wet mass spectrometer may operate as a super-sensor in terms of its analytical capability, and may be used to give the rrc-humanoid robot a super-human-like form of 'tasting'-AI. However, the more limited human-like form of 'tasting' AI must also be designed into the system so that the robot can verbally describe the super taste as it would be perceived by other humans (without a super-human like tasting capability).

6. Super-Sensor rrc-Humanoid Robots:

Super sensors that give rise to super-human-like AI. An RRC-Humanoid Robot may gain super human-like intelligence levels by adding non-human sensors to the set of human-like sensors incorporated in the system. Non-human sensors are either sensors operating outside of the human-like sensitivity range, or sensors that are distinctly different from the human-like sensors. Examples of super sensors that operate outside of the human sensitivity range are visual sensors sensitive to Infrared or vacuum-ultra-violet radiation, or sound-microphone sensors sensitive to ultra-sound frequencies (frequencies greater than 20,000 cps). Examples of sensors that are distinctly different from the human-like sensors are antennae's and pre-amplifiers that pickup radio wave, or radar wave electromagnetic frequencies, or X-ray detectors that pick up X-radiation.

The Innovativeness of the Inventive Embodiments of this Disclosure

The auditory RRC-humanoid robot, the subject of this disclosure, is designed to pass the Turing Test unequivocally. Alan Turing attempted to build a machine that had an Intelligence Quotient (IQ) of a 6-year-old child. We shall describe an auditory RRC-Humanoid Robot, programmed by behavioral-programming techniques, that may achieve an IQ of a college graduate, or super human-like intelligence levels gained from super-human sensors. In general, the innovativeness of the described invention lies in 4 areas:

Area 1. Programming of an Auditory RRC-Humanoid Robot with a Centralized Hub of Intelligence to Achieve Human-Like IQ-Levels of AI.

The fundamental design characteristic of the RRC-Humanoid system is a centralized hub of intelligence that is the centralized "self location and identification" coordinate frame of the system. The RRC-Humanoid Robot is designed to give the robot a form of proprioceptive knowledge, similar to human proprioceptive intelligence. The RRC-Humanoid robot therefore 'knows' the location of every surface point on its body, the location of its flailing limbs, and by extension, the location of every coordinate frame point in the near space defined by its flailing limbs. In the RRC-Robot all knowledge is 'subjective' knowledge, and the self-knowledge capability is the basis for all knowledge. By relating all other sensory data to this centralized hub of intelligence, experiential and/or behavioral programming techniques may be utilized (requirement #5) that yield a human-like, high IQ-level of 'subjective'

AI. In this disclosure, the system is programmed to hear and understand verbal speech with its auditory sensors, and intelligently responds by verbally talking with its verbal-phoneme sound generator (which is further described below by reference to Area 4).

Area 2. The Design of an Interface Circuit.

The design of an Interface circuit between the sensors (visual, auditory, olfactory, or gustatory) and the RRC that converts the input signal into a format that is compatible with the programming of high IQ-levels of AI.

Area 3. The Definition of the Robotic 'Self' and Programming 'Self Knowledge' into the RRC Humanoid Robot.

There is nothing innovative about building a humanoid robot (the mechanical robotic body and limbs that simulate the human body). However the combination of a RRC Humanoid Robot equipped with tactile sensors that define a centralized self location and identification coordinate frame, and that is programmed to develop self-knowledge for the tactile, visual, and auditory sensors, is innovative in at least the following ways.

Area 3(a)—

The tactile pressure transducers cover the total robotic body and form a protective covering that simulates the human skin (with embedded mechano-thermal receptors). This covering gives rise to a coordinate frame and intelligence associated with the motion of limbs in that coordinate frame.

Area 3(b)—

The visual system simulates, and operates like the human eyes (which is described by reference to co-pending U.S. Non-Provisional patent application Ser. No. 14/253,861). It forms a 3D-photometric image of the environment that is a high fidelity representation of objects located in the environment. The visual system is programmed to enhance the self-knowledge of the robot by assuring that the robot gains visual self-knowledge of all the input visual data. This is achieved by relating and correlating the visual data to the tactile self location and identification coordinate frame defined by the tactile data. With visual self-knowledge programmed into the RRC humanoid robot, the visual system is the only environmental sensing system the robot needs to operate intelligently in any environment (e.g., it takes the place of radar, lidar, sonar, and/or GPS systems that are often employed by humanoid robotic systems).

Area 3(c)—

The auditory receiving microphones and verbal-phoneme sound generator have been specifically designed to simulate the human hearing sensors, and the human verbal vocalization capability. The auditory system is also programmed to enhance the self-knowledge of the robot by assuring that the robot gains auditory self-knowledge of all the words and sentences heard by the robot and spoken by the verbal-phoneme sound generator. This is achieved by relating and correlating all the word and sentence input data to the words and sentences spoken by the verbal-phoneme sound generator and to the tactile self location and identification coordinate frame defined by the tactile data. With the formation of auditory and visual self-knowledge related to the self location and identification circuit, and starting with the formation of phoneme sounds, the constituents of words and sentences, the system has the capability of learning to converse in any language, and to develop a human-like, high IQ-level of AI with the same behavioral speech processing techniques (repetition, babbling, and experiential programming) that is utilized in the human educational system.

Area 4. The Design of a Contextual 'Self Knowledge' Capability for the Other Sensors.

Contextual self-knowledge of the visual data, auditory data, olfactory data, gustatory data, and vestibular data, is designed into the system by relating and correlating all sensory data with the self-knowledge, self-location and identification coordinate frame. It is important to stress that the expansion of self-knowledge must be applied to all the sensors added to the system (visual, auditory vestibular, olfactory and gustatory).

The design of contextual self-knowledge is an innovative technique that gives the robot the capability to gain 'subjective' experiential knowledge about the environment and about the systems that make up the robotic 'self'. It is the technique that allows the robot to operate with human-like, high IQ-levels of AI with all its sensors in any environment in which it gains experiential self-knowledge.

RELATED ART

The field of the invention is relatively narrow. The technologies utilized in the development of parts of rrc-humanoid robots may be related to a large number of commercially available computer based systems. However, the relationship of these technologies to the field of this invention is very tenuous.

Related art that is not in the field of this invention, may include the design and development of all commercial recording monitors (camera recorders, audio recorders, gas chromatographs, wet and dry spectrometers, sonar, radar and various electromagnetic detectors, etc.), and possibly all artificially intelligent computer systems and peripherals (personal computers, computers, monitor recorders, printers, telecommunication devices, etc). Recording monitors that do not interface with a RRC controlled robot are not in the field of this invention. Similarly robotic systems that have machine-like artificial intelligence rather than human-like or super human-like artificial intelligence are also not in the field of this invention.

This invention relates to robotic recording monitors that record real time auditory, visual, tactile, vestibular, olfactory, and gustatory data that is utilized by the RRC-robot, and is specifically NOT utilized by a human observer. The RRC-robot itself performs 3D-real time video camera visualizations, verbal phoneme word-sentence comprehension and generation, pattern recognition and identification, and monitoring of any other real time effect data recorded by the RRC-recording monitor.

Advantages of the RRC-Humanoid Robot

Human-like auditory/declarative levels of artificial intelligence refer to the capability of the auditory RRC-humanoid robot to be trained/programmed to perform phoneme, word, and sentence pattern recognition, identification and comprehension, and to respond verbally and intelligently, via the verbal-phoneme sound generator, to the recognized, identified and comprehended word and sentence patterns detected by the RRC-system. In order to quantify the amount of programming/analysis required, we have quantitatively defined, in the lexicography section, the amount of programming that must be performed on a RRC-system in order to reach a) the self-knowledge level of intelligence, b) the "identification" level of intelligence, c) the "recognition" level of intelligence, and d) the "comprehension" level of intelligence. In each case, quantification of the amount of programming/analysis required to reach a high level of AI is determined by the number and type of relations and correlations programmed into the system.

The advantages of the auditory RRC-humanoid robot are listed in the following sections. However, we will first describe an innovative behavioral speech processing methodology that is inherent in the design of the auditory RRC-humanoid robot. This speech processing methodology is a significant advance in the State of the Art (SOA) of speech processing and a radical departure from the present methodologies of speech processing. The new methodology is based on a capability of the RRC to recognize and repeat (via the Sequence Stepper Module) the acoustic sequential set of phoneme-signals that comprise the phonetic words and sentences spoken by a human speaker.

The Behavioral Speech Processing Methodology of the Auditory RRC-Humanoid Robot

The Problem:

The problem of converting the perceived acoustic spectrographic (a-f-t) properties of language (e.g., as illustrated in FIG. 7), into an identifiable phonetic structure is an ill posed problem, similar to the 3-dimensional inverse optics problem that was solved in co-pending U.S. Non-Provisional patent application Ser. No. 14/253,861, the complete contents of which are incorporated into this disclosure. There is not a simple one to one mapping between the acoustic properties of the speech signals and the phonetic structure of an utterance. Co-articulation (the segmentation problem) is generally identified as the major source of the problem. Co-articulation gives rise to difficulty in dividing the acoustic signal into discrete "chunks" that correspond to individual phonetic segments. Co-articulation also gives rise to a lack of invariance in the acoustic signal associated with any given phonetic segment. The usual methods for solving the problem include lexical segmentation processing (co-articulation), word recognition processing, context effect processing, syntactic effects on lexical access processing, lexical information and sentence processing, syntactic processing, and intonation-structure processing.

The State of the Art (SOA):

Most, if not all, computer auditory/declarative systems have not solved the acoustic mapping problem (one to one mapping of the acoustic spectrographic (a-f-t) properties of language, onto an identifiable phonetic structure). The SOA-systems operate by computing, calculating, and solving a large number of auxiliary problems related to the mapping of the acoustic signals onto a selected 'most-probable' phonetic structure. The problem is complex because there does not exist a one to one correspondence between the acoustic signal and the phonetic structure. And many additional visual cues and verbal cues must be added to the system in order to find a unique one to one correspondence. At the present time this problem has not been solved. And the SOA auditory/declarative AI-computer system operates by a) attempting to identify and recognize the input sound signal, b) relating those input sound signals to one of a set of pre-recorded words or sequence of words, and c) depending on the success in recognized input signal, respond with a pre-recorded sequence of words tailored to the recognized signal.

The RRC-Humanoid Robot Behavioral Speech Processing Methodology for Solving the Inverse Auditory Problem: A Significant Advance in the Speech Processing SOA.

Because of the complexity in the mapping between the acoustic signal and phonetic structure, an experiential, behavioral programming methodology was developed for 'unpacking' the highly encoded, context dependent speech signals. 'Unpacking' is performed in the Interface Circuit by programming the RRC to repeat and 'remember' (in the TSM-memory modules) the 'heard' words and sentences of multiple speakers.

Repetition and Babbling the Words and Sentences Taken from a 50,000 Word Lexicon (Task 201 in Table 3):

Training to repeat the phoneme-sound based words and sentences is described in section C, step 6a of this disclosure. The trained repetition and babbling sub-task A-1 TSM, activates the total vocabulary of the robot. (Note that the sub-task A-1 TSM acts as memory module that remembers the 50,000 Task Initiating Trigger (TIT) words taken from the word lexicon, and that the Sequence Stepper Module is trained to repeat each of those TIT-words). In order to achieve repetition accuracy it is necessary to refine the design of the verbal-phoneme sound generator, expand the number of phoneme sounds listed in the 120 phoneme sound combinations utilized in the preferred embodiment RRC-humanoid Robot, and refine the tuning of the spectrum analyzer to the actual collective modalities present in the English language verbal input signal.

Additional speech processing by behavioral programming techniques includes the following: First, by relating, correlating, associating and calibrating the heard verbal speech with the corresponding visual and tactile data obtained in the visual and tactile coordinate frames in which the robot is operating. Next, by training the RRC-Robot to be sensitive to such factors as acoustic phonetic context, speaker's 'body language,' speaking rates, loudness and 'emotion laden' intonations. The Auditory RRC-Humanoid Robot takes into account the acoustic consequences of such variations when mapping the acoustic signal onto the phonetic structure. The problems of speaker's 'body language,' emotion laden' intonations, acoustic phonetic context, speaking rates, and loudness is solved in the Auditory RRC by coordinating the search engines of the visual and tactile systems with the search engine of the Auditory RRC-Humanoid Robot.

An auditory RRC-system achieves human-like levels of intelligence by relating, correlating prioritizing and remembering speech phoneme-input data, the basic constituents of language, rather than computing and solving problems associated with the acoustic content of the verbal input signals.

The inventors believe that without a solution to the acoustic mapping problem, the present day SOA auditory/declarative calculating computer cannot achieve human-like levels of AI. The reason for this is the complexity of the co-articulation (segmentation) problem, and the fact that many visual cues, as well as acoustic variations (such as emotion laden intonations) have not been added to the system.

RRC-Humanoid Robot Comparison to Other Computerized Human-Like AI-Systems

Advantages of an Auditory RRC-System for Defining Human-Like Levels of AI.

The RRC described in U.S. Pat. No. 6,560,512, issued May 6, 2003, is an operating system that has been designed (reverse engineered) to operate like the human brain (based on the assumption that the human brain relates, correlates, prioritizes and remembers rather than computes and solves problems). An RRC consists of sets of Relational Correlation Sequencer (RCS) modules and associated memory units called Task Selector Modules (TSMs) that operate by relating and correlating the input signals and prioritizing and remembering important correlations. Relational and co-relational training is facilitated by Relational Correlation Sequencer (RCS)-modules that makes up the RRC-system (see also the Incorporated Disclosure listed in the Related Applications section).

The RRC controls the tasks (including sound generation, memory storage and retrieval tasks) performed by a robot. The RRC is programmed to perform all tasks relative to a self-location and identification task, performed by a nodal map, known as the self-nodal map, and associated with one of the RCSs that make up a RRC. A trained self-nodal map gives the robot a level of intelligence that may be called "self location and identification" knowledge (proprioceptive knowledge). The totality of the "self location and identification" data, stored in a TSM-memory module, is the basis for the "self Knowledge" capability of the RRC-robot.

In order to be capable of achieving a level of programmed intelligence that can be termed human-like, the RRC-system has a self-knowledge capability and it constantly monitors the sensory data throughout the operational lifetime of the robot.

In addition, the sensory data obtained by any robotic system must be "internalized" with respect to the self-knowledge memory module. Internalization means that the data from each of the different sensory systems must be related and correlated with the self-knowledge memory module in a manner such that the robot develops self-knowledge of the visual data, the auditory data, the olfactory data, and the gustatory data.

The innovativeness of the inventive embodiments described in this disclosure also lies in the design of an interface that facilitates the internalization of sensory data into the self-knowledge module. The following innovative features have been incorporated into the design of the interface circuit:

a) Incorporation of a p-vector phoneme space, input to the multi-dimensional Nodal Map Module;

b) Incorporation of a babbling Sequence Stepper Module;

c) A paradigm shift in the speech processing methodology employed in mapping the acoustic signals onto phonetic structures (relating and repeating); and d) A methodology for relating and correlating the multi-dimensional Nodal Map Module with the self-location and identification self-knowledge module.

With the internalization process in place, achieving human-like intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training programming of the various modules of the RRC. The high levels of training-programming associated with robotic comprehension and visualization imply a large number of relations and correlations between the various sensory signals, programmed into the system.

How the Inventive Embodiments Differ from and/or Improves Over Existing Systems

Human-like, high IQ-AI is highly dependent on hearing and comprehending verbal speech, and the capability to respond verbally to the heard speech. Without a one to one mapping of the acoustic signals onto a reasonable phonetic structure, such human-like high IQ-AI becomes impossible. The claimed invention is unique and an improvement over what currently exists for the nine reasons outlined below. However, the most unique improvement is the solution offered, in the design of the auditory interface circuit, of the one to one mapping methodology of the acoustic signals onto a reasonable phonetic structure. The invention described herein, the acoustic RRC-Humanoid robot, is an improvement over what currently exists because of the following innovative features that have been incorporated into the system.

1. Incorporation of the RRC:

The RRC described in U.S. Pat. No. 6,560,512, issued May 6, 2003, is an operating system that has been designed (re-verse engineered) to relate, correlate, prioritize and remember auditory input data. Relating, correlating, prioritizing and remembering auditory input phoneme-patterns is the essential analysis tool required to organize and centralize the collected data, and thereby reduce the amount of programming required to access the remembered auditory input patterns.

In contrast, most other auditory-verbalizing computers start the memory and prioritization process at the word or sentence level. For any given query, the mapping of the acoustic signal onto a phonetic set of words or sentences is very inexact, and the number of combinations of words and sentences so large, that the system is subject 50-90% error rates. In addition the number of relations and correlation required to home in on an appropriate response requires a very large number of programming steps to reduce the error rate to below 50%. Therefore SOA auditory-verbalizing computers limit the number of queries that they can recognize to a very small number, and they limit their responses to an analogous small number of words. The response is often non-verbal. For example, the response may require confirmation, such as a button push or mouse click.

2. Incorporation of the RCS:

An RRC consists of sets of Relational Correlation Sequencer (RCS) modules and associated memory units called Task Selector Modules (TSMs) that operate by relating and correlating the input signals and prioritizing and remembering important correlations. The RCS is a proprietary module described in document: Ser. No. 09/761,960, titled "Relational Correlation Sequencer" (RCS), filed Jan. 17, 2001 in the name of David Rosen and Alan Rosen, and incorporated into the RRC-patent (U.S. Pat. No. 6,560,512, issued May 6, 2003).

By contrast, most other computer systems are not made up of modules specifically designed to relate and correlate input signals and then prioritize and remember important correlations.

3. Incorporation of a Central Hub of Intelligence:

The RRC is programmed to perform all tasks relative to a self location and identification task, performed by a nodal map, known as the self nodal map/coordinate frame, and associated with one of the RCSs that make up a RRC. It is important to stress the word all, since no task may be performed by the system that is not related to the centralized self-nodal map/coordinate frame. The centralized self-nodal map coordinate frame is the central hub of intelligence for the system. Therefore it is easy to access data stored in the central intelligence hub.

In contrast, most other computer systems do not relate all the programmed tasks to a single centralized coordinate frame/task. Therefore it is much more difficult to access the diverse "knowledge-data" stored in the computer system.

4. Design of a Self-Knowledge Capability:

A trained self-nodal map-coordinate frame, programmed into a Nodal Map Module (NMM). gives the robot a level of intelligence that may be called "self location and identification" knowledge. This trained NMM has all the information/knowledge associated with the proprioceptive knowledge present in every human. The totality of the programmed 'self location and identification' data, stored in a TSM-memory module, is the basis for the self-knowledge (proprioceptive knowledge) level of intelligence. A RRC robot with a fully programmed self-knowledge capability "knows" the location of every surface point of the robotic body, the location of flailing limbs, and by extension, the location of every coordinate frame point in the near space defined by flailing limbs.

In comparison, robotic machines independent of the RRC, which have been designed in the past with the goal of simulating proprioceptive-like intelligence levels, failed to achieve their goal because the robotic machines did not relate all the data obtained to a self-knowledge coordinate frame that should have been programmed into the system. Examples of such machines, which do not have a self-knowledge capability, are the famous Turing machine and the chess playing computers that always win when playing against a human competitor. Most other computer systems don't have a self-knowledge capability-coordinate frame to which all other data may be related. They do not internalize the data into a self-knowledge coordinate frame; that is, they do not relate all the programmed tasks to a single centralized coordinate frame/task.

5. Design of an "Awareness"-Monitoring Capability:

In order to be capable of achieving a level of programmed intelligence that can be termed human-like "awareness" of the input data, the robotic system must constantly monitor the sensory data throughout the operational lifetime of the robot, and relate the monitored data to the self-knowledge coordinate frame.

Most other computer systems designed to perform monitoring or surveillance do not have a human-like "awareness" capability unless the monitored data is constantly related to a self-knowledge coordinate frame. When tactile sensors that form a protective covering of the robotic body, constantly monitor the environment around the robotic body for any possible tactile activation, then robotic self-knowledge becomes another level of intelligence called "robotic self awareness" of the tactile environment around the robot. Robotic self awareness coupled with self-knowledge of the tactile sensory data may lead to a robotic reaction to the data that is analogous to the human-like modality of "feeling touch-pain" associated with the pressure exerted on tactile mechano-receptors (pressure transducers).

6. Internalization of the Data:

In a RRC system, the sensory data obtained by any recording monitor must be "internalized" with respect to the self-knowledge memory module. Internalization means that the data from each of the sensors must be related and correlated with the self-knowledge memory module in a manner such that the robot develops self-knowledge of the visual data, the auditory data, the olfactory data, and the gustatory data. The self-knowledge level of intelligence may therefore be gained for the auditory, olfactory, and gustatory sensors, in addition to the visual sensors. And the total "knowledge" gained by the system may be quantified by the number of relations and correlations programmed into the system.

By contrast, the designers of most other computer systems have never quantified the level of intelligence programmed into their system by the number of relations and correlations between the various sensory data inputs. In addition they rarely centralize and store all the relations and correlations into a self-knowledge coordinate frame. Therefore, internalization with respect to the self-knowledge memory module remains a unique and innovative characteristic of the RRC-recording monitor system.

7. Paradigm Shift in the Analytical-Programming Methodology Employed in Auditory Verbalization Systems.

The analytical-programming methods employed by the RRC-humanoid system are a paradigm shift in the methodology generally employed by other computer auditory-verbalization systems. The shift in emphasis is from analytical programming methodologies involving the identification and recognition of words and sentences spoken by humans, to analytic programming operating on sequences of phoneme sounds, the constituents of words and sentences, and programming the system to repeat and 'learn' the sequential phoneme patterns that make up the words and sentences commonly used by humans (e.g., words and sentences that may be listed in a 50,000 word lexicon, that is the total vocabulary of the Robot). The system is therefore designed to recognize any word present in the 50,000-word lexicon, and any sentence made up of those words. This leads to an accuracy of identification and recognition of words and sentences approaching 100%.

In comparison, most SOA auditory/declarative AI-computer systems operate by a) attempting to identify and recognize the word and sentence-input sound signal, b) relating those words and sentences to one of a set of pre-recorded words or sequence of words, and c) depending on the success in recognizing the input signal, responding with a pre-recorded sequence of words tailored to the recognized signal. SOA systems are therefore limited by their analytic design to recognize only those the words and sentence programmed into the system, and in addition the words and sentences programmed into the system are susceptible to co-articulation errors. This leads to an accuracy of identification and recognition of words and sentences below 50% of the words or sentences that would be applied to the system, if it had human-like auditory intelligence.

8. Design of an Interface Circuit Compatible with Human-Like Levels of AI.

The innovativeness of the inventive embodiments described in this disclosure also lie in the design of an interface that facilitates the internalization and the human-like self-knowledge level of intelligence of the auditory data. Some unique elements in the interface design are as follows:

a) The spectrum analyzer and the decomposition of the phonetic (a-f-t)-signals into collective modalities;

b) The design of the q-magnitude and p-direction of a p-phoneme vector; and c) the design of the multidimensional auditory Nodal Map Module.

However, as stated earlier, the most unique improvement is the solution offered, in the design of the auditory interface circuit, of the one to one mapping methodology of the acoustic signals onto a reasonable phonetic structure. Human-like high IQ-AI is highly dependent on 'hearing' and 'comprehending' verbal speech, and the capability to respond 'verbally' to the 'heard' speech. Without a one to one mapping of the acoustic signals onto a reasonable phonetic structure, such human-like high IQ-AI becomes impossible.

The interface circuit is unique to this invention because the RRC is a unique element of the invention. However, auditory-verbalization systems, an important element of the RRC-verbal-phoneme sound generator interface circuit, are SOA and used commercially in the field of communication. The inventors discovered that present day auditory-verbalization systems were not suitable for high IQ-AI systems. Present day operational auditory-verbalization systems don't even try to solve the acoustic-signal-phonetic-structure mapping problem. On the other hand, the programming methodology presented in the design of the RRC-interface circuit comes very close to solving, in a one-to-one manner, the acoustic mapping onto a unique phonetic structure.

9. Quantifying the Amount of Programming Required to Reach Human-Like Levels of AI.

With the internalization process in place, achieving human-like intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training-programming of the various modules of the RRC. An auditory RRC-system achieves human-like levels of intelligence by relating, repeating, correlating, prioritizing and remembering the auditory input data, rather than computing and solving speech processing problems associated with the auditory input data.

Quantifying the amount of programming required to reach a given level of human-like AI is simply a matter of counting the number of relations and correlations, associated with each noun, adjective, and verb present in the vocabulary of the robot (the 50,000 word lexicon), that is to be programmed into the system. For example, to develop a high IQ level of intelligence about the word 'apple' one needs to program the image of an apple with the word apple, with the verbal dictionary definition of an apple, with the encyclopedic data (which could be verbally repeated by the Robot), associated with the word and visual image of an apple, with the feel, color, shape etc. that differentiate the various varieties of apples (crab-apple Washington-delicious apples), with the smell of an apple, with the taste of an apple, etc. Human-like levels of AI generally involve hundreds of thousands of relations and correlations programmed into the system. The inventors believe that without a relating-correlating auditory RRC system, present day calculating computers would be overwhelmed by the amount of programming code that would be required to achieve human-like, high IQ-levels of AI.

In contrast, the designers of most other intelligent-computer systems have never quantified the level of intelligence programmed into their system by the number of relations and correlations between the various sensory data inputs. Most computer auditory-verbalization systems operate by computing, calculating, and solving problems related to the input data, and aimed at obtaining a particular set of solutions for each particular set of input data. If such a computer system were to be programmed to reach human-like levels of AI, the amount of programming code would be orders of magnitude greater than the countable number of relations and correlations described above. In addition other computer systems rarely centralize and store all the relations and correlations into a self-knowledge coordinate frame.

Commercialization of the Auditory RRC-Humanoid Robot Technology

The commercialization of the Auditory RRC-Humanoid Robot technology is described in the following three sections: The first section describes the commercial uses of the Auditory RRC-Robotic system. The second section describes the commercial uses of an RRC-auditory-verbalizing answering machine system, a stand-alone RRC that has been fully trained (experientially—with the robotic body) as an auditory-verbalizing answering machine system. The third section describes the business model for the commercial development of the invention (licensing and joint ventures).

Commercial Use of an Auditory RRC-Humanoid Robot

In the following two parts the list of tasks performed by an auditory RRC Humanoid robot are divided into two parts. Part 1 is the same list of tasks performed by the visual RRC-Humanoid Robot (described in co-pending U.S. patent application Ser. No. 14/253,861), except that in this case there is a maximum amount of verbal communication between humans and Robot. Part 2 is a list of tasks performed by an Auditory RRC-Humanoid Robot that comprehends (understands) verbal speech, may communicate verbally as does a human, and may perform all the tasks that a human with a college or graduate school degree is capable of performing (read, write, comprehend verbal speech and respond to verbal speech).

Part 1—the Tasks Performed by a Procedurally Trained Auditory RRC-Humanoid Robot.

An auditory RRC-Humanoid Robot may perform all the tasks performed by the Visual RRC Humanoid Robot, with the addition that the Robot now has verbal communications skills and can therefor perform all procedural tasks more efficiently and effectively (minimize errors). An auditory RRC-Humanoid robot may be used to perform practically all-skilled manual labor and hand manipulation tasks performed by humans. For example, expert cook, expert waiter (serving food collecting and washing dishes) supplemented with communication with humans. In a household, a visual humanoid robot may perform all tasks of a household servant (supplemented with verbal communication skills), handyman, guard, or babysitter. In the medical care/nursing field an Auditory RRC-Humanoid Robot may serve as a nursing companion, helper, expert medical nurse, or an expert doctor (well trained in communicative bed-side manners). In a skilled labor environment a visual humanoid robot may perform the tasks of engine maintenance and repair, jewelry making, watch making and repair, skilled operator of all equipment such as welding, assembly, polish, paint, and all the tasks associated with building and repair (foundation, framing, electrical, plumbing, and appliances). In an office, a visual robot may perform the tasks of a stock-boy, internal mail delivery, guard, or errand boy. In the transportation field, a visual humanoid robot may perform expert driver tasks for cars, trucks, buses, trains, ships and airplanes. For the Department of Defense, a visual humanoid robot may be used for surveillance, monitoring, carrying heavy equipment, or as an expert rifleman, or expert fighter (with boots on the ground). For NASA, a visual humanoid robot may be used for planetary and lunar exploration, astronautic space mission, and long duration missions to the stars.

Part 2—List of Tasks Performed by an Auditory RRC-Humanoid Robot that Comprehends (Multiple Correlations) Verbal Speech, and Responds Verbally.

An auditory humanoid robot may be used to perform all tasks that humans perform that including all tasks that require verbal communication, reading and writing skills. Therefore, an auditory humanoid robot may perform all the tasks that a visual humanoid robot can perform with the enhanced capability to communicate verbally matters relating to the tasks performed. In addition, the auditory humanoid robot may perform all expert and professional task that require verbal communication, reading, and writing skills. For example in the expert arena, an auditory humanoid robot may function as a receptionist, clerk, or errand boy. In the professional arena, an auditory humanoid robot may function as an engineer, chemist, doctor, lawyer or dentist.

Human-like intelligence levels have never before been programmed into a computer system. RRC-humanoid robots are highly intelligent, high IQ-machines that pass the "Turing Test" with tactile and vestibular sensors that 'feel' and balance, a visual system that visualizes and "sees," an auditory system that hears and understands human speech, and a verbal-phoneme sound generator that speaks verbally and responds intelligently to the "heard" verbal sounds. The preliminary training of the RRC-robot is analogous to human education in grades K-1 to K-12. The programming-proof that the RRC-system has achieved human-like intelligence levels is identical to the performance of a Turing Test, wherein behaviorally, in its capability to 'feel,' 'see,' manipulate objects, 'hear,' and 'speak,' the RRC-humanoid robots are indistinguishable from human.

The inventors believe that RRC-humanoid robots have the potential of revolutionizing the 21st century. The design, development and manufacture of intelligent humanoid robots may become a major industry, serving individuals, corporations, and local, state, and federal governments. RRC-controllers exhibiting human-like and super-human-like levels of intelligence will revolutionize the 21st century so that humanoid RRC-robotic systems are as common as computers.

Commercial Use of the RRC-Auditory Verbalizing Answering Machine System.

A stand-alone RRC-auditory-verbalizing answering machine system may be formed by combining 3-parts of fully trained (experientially—with the robotic body and limbs) auditory RRC-Humanoid Robot. RRC-auditory-verbalizing answering machines consist of the following 3 parts of a fully trained auditory RRC-Humanoid Robot; Part 1 is the RRC system, part 2 is the auditory RRC recording monitor (pick up microphones and the interface spectrum analyzer), and part 3, is the verbal-phoneme sound generator. Training of the three parts is performed on the total RRC-Humanoid robotic system (sensors plus a complete robotic body and limbs). The trained expertise and verbal IQ-AI level of the system may be tailored to the answering machine requirements of specific customers who may need specialized levels of AI. A fully trained RRC-auditory-verbalizing answering is sold separately (without the robotic body and limbs) as a stand-alone system.

RRC-auditory verbalizing answering machines may function as telephone answering machines, as a receptionist in any office, commercial organization, non-profit organizations (museums, art galleries, etc.), as a receptionist and guide to any federal, state and local governmental organizations, and as a search engine that is accessed verbally and responds verbally to any query.

RRC-auditory-verbalizing answering machines are unique in that they are the only ones that use an internal one-to-one mapping methodology of the acoustic signals onto a reasonable phonetic structure. As a result, for example, the preferred embodiment system is designed to recognize any word present in a 50,000-word lexicon, and any sentence made up of those words. This leads to an accuracy of identification and recognition of words and sentences approaching 100%. Furthermore, with the search engine access rule the system may be programmed to respond verbally and appropriately to any query.

Business Model for the Commercial Development of the Invention: Licensing and Joint Ventures.

The invention described herein generally require, for training purposes, a human-like mechanical body and limbs, with input data coming from 6 human-like recording monitors (tactile, vestibular, visual, auditory, olfactory and gustatory sensors), so that the system may be programmed to reach human-like levels of artificial intelligence. The inventors have a strong capability in the commercial design and development of the RRC-controller, the 6 human like recording monitors, the interface design between the RRC and the recording monitors, and the programming of the system so that it may reach human-like levels of artificial intelligence. However, the inventors do not have a strong capability in the commercial development of the state of the art human-like mechanical body and limbs, the power supplies and the structure, motors and gears that make up the mechanical robotic body. Therefore, the inventors plan to license their invention or joint venture with a corporation that can fund the design, development, and manufacture the robotic body, controlled by the RRC-controller. Joint venturing and licensing activities will begin as soon as the invention is patented.

Lexicography

The lexicography section is organized alphabetically with two section breaks denoted by using bold face type on the items to be defined. One section break, collects all the definitions that begin with the word 'human-like.' The other section break, collects all the definitions that begin with the words 'quantitative measure.'

Auditory Collective Modalities

Auditory collective modalities are groupings of hair-like fibers that are tuned selectively to some distinctive features of the spectrographic (a-f-t) frequency pattern. Among the distinctive features are segments of frequency changing in time (FM sweeps or glides) or band-pass noise bursts with specific center frequency and bandwidth.

Auditory Cues

Auditory cues refers to the additional data that must be abstracted from any verbal interaction between the RRC-system and a human in order to solve the problem of converting the acoustic properties of the input signal into an understandable phonetic structure (solving the co-articulation problem). The conversion of the perceived acoustic spectroscopic properties (a-f-t-diagrams) of language into an identifiable phonetic structure requires additional data in addition to the spectroscopic (a-f-t)-data. Auditory cues denote the additional data required in order to map the phonetic structure of an utterance into acoustic spectroscopic a-f-t-data. The auditory cues used in this disclosure include a) visual data of speaker's body language, lip movements and recognition-identification of the characteristics of the speaker, and b) acoustic phonetic context such as "emotion laden" intonation, speaking rates and loudness.

Auditory RRC-Humanoid Robot.

A visual RRC-humanoid robot equipped with an auditory RRC recording monitor with a human-like interface and a verbal-phoneme sound generator, may be called an auditory RRC-humanoid robot.

Auditory RRC-Verbalizing Answering Machine System.

(Also denoted as a RRC-answering machine) A stand alone RRC-answering machine may be formed by combining 3 parts of a fully trained Auditory RRC Humanoid Robot. The RRC-Verbalizing answering machine consists of the following three parts: a) The auditory apparatus stage, b) The auditory Interface Circuit Stage, and c) The RRC processing stage. The answering machine does not include a robotic body or limbs.

Auditory Nodal Map Module

The auditory nodal map module is a multidimensional p-q function space wherein the q represents the spectrographic characteristics of the phoneme sound and the p is a control signal that activates one of the 130 phoneme sounds generated by the verbal-phoneme sound generator. In the auditory p-q multidimensional space, the p-vector represents one of 130 different direction (to an adjacent node), wherein each p-direction activates one of the 130 phoneme sounds generated by the verbal-phoneme sound generator. The dimensionality of the p-space must be sufficiently high so that at least 130 different adjacent nodes surround the initial position of p. And each transition to an adjacent node represents one of the 130 different phoneme sound generated by the verbal-phoneme sound generator.

Behavioral (or Experiential) Programming (Also denoted as experiential programming) Behavioral programming techniques are utilized on all RRC-humanoid systems to achieve high levels of AI for the identification, recognition, visualization or comprehension of the input sensory patterns. Behavior programming is experiential in that the system relates, correlates, prioritizes and remembers input patterns by performing manual dexterity manipulation tasks on the visualized objects and locomotion tasks guided by the visualized objects. For example, the behavioral programming technique employed for the self location and identification self-knowledge coordinate frame is an itch scratch methodology, wherein the robot is fully trained and remembers how to a) reach and touch (scratch) all points located on the surface of the robotic body, and all points in the near space surrounding the robotic body, b) to identify and locate all such points, and c) to identify and locate all the "end joint" body parts (ends of fingers, elbow, knee etc) used to scratch all the itch points. When the level of training reaches the threshold of "self Knowledge," the self nodal map and associated TSMs will facilitate the robotic identification and recognition of all body parts, and the navigation of all moveable parts of the robot towards any and every itch point located on the surface of the robotic body and all points in the near space surrounding the body.

Cause Vector

Also denoted as a p-vector, p-field data, or cause vector space: as used herein, a "cause vector" includes those control signals (such as inputs to a motor control) that are used to cause spatial transitions, adjust optical or other sensors, and generate sound in the verbal-phoneme sound generator. Generally, cause vectors are related to actions taken by the robot.

Collective Modality of a Group of Sensors

As used herein the "collective modality" of a group of sensors is the collective-sensation generated when a collective or group of sensor-receptors, made up of individual receptors that have the same modality, are stimulated simultaneously. For example the composite modality of the CCD-arrays is a retinotopic organization of receptors that have tri-chromatic collective modality, a monochromatic low transient response collective modality, and a monochromatic high transient response collective modality. For example, the tri-chromatic collective modality gives rise to the sensation of color, whereas the retinotopic organization of the individual tri-chromatic receptors generates a higher resolution image and assures that the color is applied to the correct part of the image.

Comprehension (Robotic)

Robotic "comprehension" is a higher level of "recognition" wherein the robot relates and correlates the signal to other signals. In order to "comprehend" the signal it must be related and co-related to signals activated at a different time or originating from a different source. (For example the robot may be trained to identify an environment wherein it suffers many sharp blows as a bombardment with rocks, or lighter scratches (for example caused by a swarm of bees)). In each case comprehension is achieved if the robot may be trained to accurately recognize the environment and takes appropriate action that proves that it accurately "comprehended" the meaning of all the related and correlated signals. (For example the robot may shield itself either from a bombardment of rocks or a swarm of bees). Higher levels of comprehension are achieved by relating and correlating the signal with a large number of other signals obtained at different times or from different sources. Proof that a higher level of comprehension has been achieved is obtained by training the robot to respond accordingly to all the related and correlated signals (for example the robot may make a decision whether -fight or flight- is the accurate reaction based on the related and correlated data).

Daisy Chains

As used herein, a "daisy chain" is a "line dance" that includes a repetitive-sequential array of a large number of simple sequences of cause vectors.

Declarative Hierarchical Task Diagram (DHTD)

The Declarative Hierarchical Task Diagram (DHTD) is the top level specification for a HTD-system that includes a verbal-auditory search engine among the top level search engines located at the top of the hierarchy.

Declarative Memory System

The programmed/trained TSMs listed in the DHTD, gives the robot the capability to "remember how" to perform all the auditory sub-tasks listed in the DHTD. The declarative memory system includes a robotic capability to a) repeat, read and write all words and sentences presented go the robot, b) comprehend and identify and describe verbally all nouns, adjectives, verbs and adverbs that are presented to the robotic visual and tactile systems, and c) perform robot-human conversation with comprehension. In the preferred embodiment, the declarative memory system within the controller is distributed among the various TSM-pattern recognition circuits listed in the DHTD.

Declarative Multi-Tasking RRC-Robot

A declarative multi-tasking RRC robot is a robotic system designed and trained by a Declarative Hierarchical Task Diagram (DHTD).

Effect Vector (Also denoted as q-vectors). Effects vector space or q-field data: as used herein, "effect vectors" are signals received from a set of sensors used to monitor the external and internal environment of the robot. The external environment is received by an array of pressure transducers, pick-up microphones, optical devices and other sensors that are incorporated into the robotic system. The internal sensors receive internal data such as the current flow and voltage associated with the motors and sensory systems, the charge in one or more batteries, the lubrication of moving parts and other information that reflect the internal state of the robot. In the preferred embodiment, the effect vectors frame rate is generally determined by the frame rate of the visual video q field data. A specific effect vector often labeled q-final, defines a destination node associated with a particular task initiating trigger.

Frame Rate & Frame Period

As used herein, the "frame rate" refers to the operational speed of the relational robotic controller (RRC). The frame rate and frame period is fixed in the PHTD, and is variable in the DHTD. The "frame period" refers to the time duration of each frame (See the definition of variable frame rate & frame period used in the DHTD). In the Procedural HTD, the control signal output rate of the RRC is limited to a maximum of one p vector control signal leading to a traversal to an adjacent node, per frame period. Whereas, the Sequence Stepper Module generates a long sequence of control signals during each frame period that "plans" a navigational path to a destination node, only one motor control p signal is generated by the control signal output during each frame period. (The RRC does "end point planning" at each step of its motion.) See the definition of variable frame rate & frame period used in the DHTD.

Hierarchical Task Diagram (HTD)

The hierarchical Task Diagram (HTD) is the top level specification of a RRC-system. The HTD consists of an hierarchical-pyramidal listing of the tasks performed by the RRC-system. Sensory search engines are located at the top of the hierarchy. The search engine searches the input sensory signals for signal patterns that may be identified as TIT. Identification and prioritization of the TITs is performed by TSMs that are associated with each of the tasks listed in the HTD. The programming-training of a RRC-system is a process of training each of the TSMs associated with all the tasks listed on the HTD.

Human-Like (General Definition).

The term 'human-like' is applied to the robotic body and limbs, to the robotic sensors and to a human-like control system, which has been selected in the preferred embodiment, to be a RRC-controller. Human-like robotic body and limbs consist of a bipedal, two handed, 5-fingers per hand robot controlled by an RRC-controller. Human-like sensors consist of electro-mechanical analogues of the 6 human external sensors (tactile, visual, auditory, olfactory, gustatory, and vestibular (balance) sensors).

Human-Like RRC-Recording Monitors

The recording monitors and the input signals generated by them are human-like if a) the recording monitors operate like the human-like receptors that are analogous to one or more of the five human sensory receptors (tactile, visual, auditory, olfactory and gustatory), and b) the sensitivity, intensity, and range of the signals generated by the recording monitor are specified to be the same as the sensitivity intensity and range as the human sensory receptors.

Human-Like Artificial Intelligence (AI) (General Definition).

A human-like levels of AI may be achieved by any computational system that adheres to the following six requirements:

The robotic controller must relate, correlate, prioritize and remember the sensory input data.

The robotic controller must be programmed to form a "self-identity, in the form of a centralized self location and identification coordinate frame.

Contextual self location and identification 'knowledge' must be programmed into the system by relating all other sensory data to the self-knowledge-self location and identification coordinate frame.

Human like intelligence is gained only from the human-like sensors.

Human-like intelligence is experiential intelligence. The robot must be behaviorally programmed with a memory system that remembers the experiences of the robot throughout its lifetime.

Human-like intelligence may be gained only by a mechanically human-like RRC-Humanoid Robot.

Human-Like Artificial Intelligence (AI) Levels of the Visual RRC Recording Monitor A human-like level of intelligence is achieved when the signals and/or visual patterns a) are a high fidelity 3-dimensional representation of the objects present in the FOV of the recording monitor, b) are constantly monitored throughout the operational lifetime of the visual system, c) are fully related and correlated and internalized into the self-knowledge nodal map module, and d) are fully trained to move body, limbs, or activate sound generators so that different actions (or the addition of sounds, smells and tastes) differentiate, distinguish, identify and recognize the location and character of 3-dimensional forms and shapes, and the different colors and textures of all the objects in the FOV. When a human-like level of intelligence is achieved by the visual RRC-recording monitor, the robot is said to have a "visualization" capability, a visual awareness capability, a "seeing" capability, and/or a capability to "comprehend" the visual objects present in the FOV of the recording monitor.

Human-Like Artificial Intelligence Levels.

Only RRC-robotic systems equipped with 2 of more of the 5 human-like external sensors, and that have a self location and identification (self-knowledge) module, may achieve human-like intelligence levels. Non-verbal human-like intelligence levels may be gained by a RRC robot equipped with mechanical and visual sensory recording monitors that simulate the human tactile receptors and visual sensors. Higher levels of human-like intelligence may be achieved by adding auditory, olfactory, or gustatory sensors. A robot equipped with tactile and visual sensors may be called a visual RRC-humanoid robot. A visual RRC-humanoid robot equipped with auditory sensors and a verbal-phoneme sound generator may be called an auditory RRC-humanoid robot.

Human-Like Intelligence Levels-Visual

When the visual sensors constantly monitor the environment around the robotic body, it may be possible to achieve human-like intelligence levels for the visual signals by relating the visual signals to self-knowledge and control of limbs. Visual monitoring and self-knowledge of the visual signals is analogous to a level of intelligence commonly called "seeing" or "visualizing" the visual signals.

Human-Like Intelligence Levels-Auditory

Human-like AI levels for the auditory recording monitor and associated verbal-phoneme sound generator are achieved by relating auditory and verbal sound signals to the visual signals, to the self-knowledge signals and to the control of limbs. Self-knowledge of the auditory signals and the verbal signals generated by the verbal-phoneme sound generator is one of the prerequisite steps that lead to a level of intelligence commonly called "hearing with comprehension" and "verbally responding with comprehension" to the auditory signals and the signals generated by the verbal-phoneme sound generator.

Human-Like Intelligence Levels—Other Sensors.

The same can be said for the olfactory sensor (a modified gas chromatograph) leading to intelligent "smelling" and the gustatory sensor (a modified wet spectrometer) leading to intelligent "gustatory tasting."

Human-Like Interface.

The design of the interface of the RRC-monitor may be human-like when the input sensors of the RRC are human-like. The five human-like mechanical sensors are those analogous to the human tactile, visual, auditory, olfactory, and gustatory sensors. In order to achieve a human-like interface the mechanical human like sensors must be designed with the following sensitivities, operational ranges and intelligence levels:

Tactile sensors must respond to pressure (ranging from light to high), temperature (ranging from warm to cold), high pressure (causing injury to the surface of the robot or pain to the human), and light flutter (senses vibrations or light breeze). In order for the tactile sensors to be human-like they must have the sensitivity and operational range of a human sensor.

Visual sensors operate in the wavelength range between 4000-8000 angstroms. The sensors must form a 3D photometric image which is a high fidelity representation of the objects present in the FOV of the visual sensors. In order for the visual sensors to be human-like the RRC-system must be capable of "visualizing" the trio-chromatic 3D-photometric image and prove that it is capable of identifying, recognizing and comprehending the colored photometric image.

Auditory sensors operate in the audible sound frequency range of up to 20,000 cps. In order for the sensors to be human-like they must be capable of identifying, recognizing and comprehending human verbal speech and music. An auditory RRC monitor may operate with a unique system for performing speech processing (identification and recognition, and comprehension of verbal words and sentences).

Olfactory sensors must respond to the same "smells" that humans respond to. The sensor may be a gas spectrometer that generates a unique spectral decomposition for each "smell" associated with a gas sample. In order for the gas spectrometer sensor to be human-like, it must interface with the RRC-system and prove that it is capable of identifying, recognizing and comprehending the "smells" picked up by the spectrometer.

Gustatory sensors must respond to the same "tastes" that human palate responds to. The sensor may be a wet spectrometer that generates a unique spectral decomposition for each "taste" associated with food, drink, or any other object placed in the input chamber of the spectrometer. In order for the wet spectrometer sensor to be human-like, it must interface with the RRC-system and prove that it is capable of identifying, recognizing and comprehending the "tastes" picked up by the spectrometer.

Humanoid RRC Robot. See RRC-Humanoid Robot Identification (See "Robotic Identification").

Robotic "identification" of a signal is a level of intelligence wherein the RRC-system is trained, or programmed to distinguish the source of the signal and the presence or absence of an activated signal (with zero activation defined as no signal whatsoever).

Internalization of the Data.

"Internalization" of the data is achieved by relating and correlating the data to the self-knowledge TSM-memory module, of the "self locating and self identifying robot," relating and correlating each and every input data signal (tactile, visual, or auditory signals) with each other, and relating and correlating each and every input data signal with each and every output-control signal generated by the RRC-controller. It is the internalization of all the input data that allows the RRC-robot to identify, recognized, visualize and comprehend the input signal. Internalization means that the data from each of the sensors must be related and correlated with the self-knowledge memory module in a manner such that the robot develops self-knowledge of the visual data, the auditory data, the olfactory data, and the gustatory data. With the internalization process in place, achieving human-like intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training-programming of the various modules of the RRC.

Line Dance

As used herein, a "line dance" is a preprogrammed sequence of cause vectors that are used repeatedly. Line dances are particular useful in the development of tools for performing useful actions associated with those sequences.

Machine Like Interface.

The design of the interface of RRC-monitors are machine-like when the sensors themselves are not human-like or when the sensors are human-like but operative in a sensitivity range that diverges greatly from the human-like sensor sensitivity range. For example radar, lidar, sonar, electromagnetic sensors operating in the microwave, radio or communication frequency bands are not human-like sensors. Examples of human-like sensors that operate outside of the human sensors sensitivity and range are visual sensors that operate in the x-ray, far ultra violet and infrared portions of the spectrum, or telescopic sensors and microscopic sensors that operate in the 4000-8000 angstrom spectral range.

Memory System within the RRC

The programmed/trained totality of TSMs associated with and listed in the HTD, represent a memory system within the controller that remembers the procedure for performing the various subtasks listed in the HTD.

Modality of a Sensor

As used herein, the "modality" of a human-like sensor is analogous to the biological modality of a receptor (biological sensor). It is the sensation that is generally associated with the sensor-receptor. For example the modality of a pressure transducer is the "feeling" of touch-pressure. The modality of a single visual-receptor (a single CCD (charge coupled device)) is the sensation of a pinpoint of light. The modality of an auditory microphone tuned to a single frequency is the sensation of a sound generated at the pitch determined by the tuned frequency.

Nodal Map—Also Abbreviated as NMM (Nodal Map Module)

As used herein, a "nodal map" is a correlation network that maps a relationship between a set of cause vectors (denoted herein as p vectors) and a set of effect vectors (denoted herein as q vectors). The configuration of the nodal map may be in the form of a multi-dimensional Euclidean space, or a multi-dimensional function space of any dimensionality whatsoever, as long as neighboring nodal points in that space are assigned to adjacent positions along the coordinates of the space. Each node in the nodal map is assigned a specific set of multi-dimensional pq vector pairs, which may be expressed in tabular form, with one pq table assigned to each node.

Pavlovian or Conditioning Programming Techniques

As used herein, a "pavlovian programming technique" is a conditioning learning technique that includes a procedure for programming the invention to convert a temporally adjacent q field that is present near, or in conjunction with, a q TIT, into a new TIT operating independently of the q TIT. In this way, the robot "learns" to initiate tasks with new triggers that are associated with the original q TIT.

Procedural Hierarchical Task Diagram (PHTD)

The procedural HTD is the top level specification for a HTD-system that excludes a verbal-auditory search engine from the top level search engines located at the top of the hierarchy.

Procedural Memory System

The programmed/trained TSMs listed in the PHTD, gives the robot the capability to "remember how" to perform all the mechanical displacement subtasks listed in the PHTD. The design of the procedural memory capability of the RRC-robot is described by reference to the RRC in U.S. Pat. No. 6,560,512, issued May 6, 2003.

Procedural Multi-Tasking RRC-Robot

A procedural multi-tasking RRC robot is a robotic system designed and trained by following the top level specifications of a Procedural Hierarchical Task Diagram.

Quantitative Measures of Human-Like Intelligence Levels (General Definition).

The intelligence of any RRC-robotic system is determined by the number of sensory recording monitors incorporated into the RRC-system and the number of relations and correlations programmed/learned into each, and between the different sensory recording monitors. For any recording monitor included in the field of the invention, in order to achieve human-like levels of artificial intelligence a robotic system must first be equipped with a fully trained self-knowledge set of tactile modules that define the coordinate frame in which the robot is operating. Second, the sensory signals arising from other recording monitors (visual, auditory, olfactory, and gustatory sensors that simulate the human external sensory system) must be related and correlated with the self-knowledge modules. In addition to inter-monitor training and intra-monitor cross training, there are five defined forms of human-like intelligence that may incorporated into the software developments of the RRC. These software developments quantify the level of training of the recording monitor-data and the amount of data stored in the associated TSM-memory system required to reach the defined form of robotic intelligence. The five forms of robotic intelligence are "robotic self knowledge," "robotic awareness," "robotic identification," "robotic recognition" and "robotic visualization or comprehension" of the input signals. As will be shown in the following definitions, none of these levels of intelligence has ever been programmed into a computer.

Quantitative Measure of Robotic Self-Knowledge Level of Intelligence.

(Determined by the number of relations and correlations programmed into the system). That number is determined by noting that robotic self-knowledge is programmed into the self-location and identification Nodal Map Module and the Task Selector Module (TSM)-memory system associated with it. The pressure transducers that are uniformly distributed on the robotic body constitute the "robotic skin" of the robot and are used to define the center of gravity of the robot and the coordinate frame in which the robot is operating. Initial self-knowledge training, that determines the bulk of the relations-correlations programmed into the system, is best described in terms of an "itch-scratch" sequence of actions. The robot is trained to move all its limbs or other bodily parts towards any activated pressure transducer (the itch-point) located on the robotic body and limbs and/or a point in the near space surrounding the robotic body and defined by the range of motion of flailing limbs. Robotic self-knowledge is achieved when the TSM-memory system of the robot is fully trained and remembers how to a) reach and touch (scratch) all points located on the surface of the robotic body, and all points in the near space surrounding the robotic body, b) to identify and locate all such points, and c) to identify and locate all the "end joint" body parts (ends of fingers, elbow, knee etc) used to scratch all the itch points. When the level of training reaches the threshold of self-knowledge, the self nodal map and associated TSMs will facilitate the robotic identification and recognition of all body parts, and the navigation of all moveable parts of the robot towards any and every "itch" point located on the surface of the robotic body and all points in the near space surrounding the robotic body. An RRC-robot that has been trained to this most basic level of self-location and identification is said to have a self-knowledge intelligence level or is said to have self-knowledge.

Quantitative Measure of Robotic "Self Awareness" Level of Intelligence.

(Determined by the number of relations and correlations programmed into the system). That number is determined by noting that when tactile sensors that form a protective covering of the robotic body, constantly monitor the environment around the robotic body for any possible tactile activation, then robotic self-knowledge becomes a higher level of intelligence that is called "robotic self awareness" of the tactile environment around the robot. Robotic self awareness coupled with self-knowledge of the tactile sensory data may lead to a robotic reaction to the data that is analogous to the human-like reaction to the "feeling" of "touch-pain" associated with the pressure exerted on tactile mechano-receptors (pressure transducers). A robotic system is said to be "aware" of a sensory activation if the system constantly—that is throughout its operational lifetime—monitors the environment for that sensory activation and relates that activation to the self location and identification Nodal Map Module and the Task Selector Module (TSM)-memory system associated with it. A RRC robot trained to the basic level of self-knowledge is said to have robotic awareness of tactile activations when the system constantly monitors the environment for any possible tactile activation. In order to 'be-aware' of tactile activations the robot must be trained to distinguish the characteristics of any activation and to respond accordingly. The methodology for distinguishing different tactile activations is by training/programming a different motor response for each different sensory activation. Note that since the visual, auditory, olfactory and gustatory signals must be internalized—that is completely related and correlated with the "self-aware" and self-knowledge nodal map modules—then the system may achieve visual self-awareness (visual-awareness is generally called "seeing"), auditory self-awareness (auditory-awareness is generally called "hearing"), olfactory self-awareness (olfactory-awareness is generally called "smelling"), and gustatory self-awareness (gustatory-awareness is generally called "tasting"), of the visual, auditory, olfactory and gustatory signals.

Quantitative Measure of Robotic "Identification" Level of Intelligence:

(Determined by the number of relations and correlations programmed into the system). That number is determined by noting that robotic identification is a low level of intelligence associated with training or programming the RRC-robot to distinguish the recording-monitor-source of the signal (tactile, visual, auditory, olfactory and gustatory) and the presence or absence of an activated signal (with zero activation defined as no signal whatsoever). In all cases the recording-monitor-source of the signal, and the signal itself, if it is present, must be related to and correlated with the Self-knowledge nodal map module.

Quantitative Measure of Robotic "Recognition" Level of Intelligence.

(Determined by the number of relations and correlations programmed into the system). That number is determined by noting that robotic recognition is a mid-level of intelligence wherein the recording monitor signal of the RRC is trained/programmed with a capability to distinguish and differentiate the location, intensity or magnitude of the pattern/signal, assign a priority level to the signal and relate that location, intensity, or magnitude to the self-knowledge nodal map module. Having recognized and prioritized the signal, the robot may be trained to take action dependent on the recognized/prioritized signal. (For example, recognizing the "itch" point and taking action to "scratch" that point, or recognizing a high priority or low priority obstacle which may or may not cause the robot to take action to avoid the obstacle).

Quantitative Measure of Robotic "Comprehension" Level of Intelligence.

(Determined by the number of relations and correlations programmed into the system). That number is determined by noting that robotic comprehension is a high level of intelligence. It includes robotic recognition and additional training of the robot to relate and correlate the signal of the recording monitor to the signals of other recording monitors and simultaneously to the self-knowledge nodal map module. In order for the robotic system to "comprehend" the signal it must be related and co-related with signals activated at a different time or originating from a different source, in addition to being related and correlated to the self-knowledge nodal map module. For example, the visual image of an apple may be related to the verbal word "apple" and may be correlated with the dictionary definition of an apple.

Quantitative Measure of Higher Levels of Comprehension Intelligence.

(Determined by the number of relations and correlations programmed into the system). That number is determined by noting that higher levels of intelligence are reached by the robotic system as more signal data from more sensory monitor sources are related and correlated with each other and with the self-knowledge nodal map module. By relating visual data, auditory data, verbal/written words, the verbal words generated by a verbal-phoneme sound generator, data from a 50,000 word lexicon and encyclopedic data, to the self-knowledge nodal map module, very high-levels of human-like intelligence and expertise can be programmed into a RRC robotic system.

Recognition (See "Robotic Recognition")

Relational Correlation Sequencer Also Abbreviated as RCS

As used herein, a "relational correlation sequencer (RCS)" include a nodal map and a Sequence Stepper Module that work together to select the motor control cause signals that result in navigating a robot through a nodal space to a desired location. More than one relational correlation sequencer can be hierarchically arranged or stacked, so as to achieve an increasingly complex result.

Robotic Comprehension (See "Comprehension-Robotic")

Robotic Identification.

Robotic identification is a low level of intelligence associated with training or programming the RRC-robot to distinguish the recording-monitor-source of the signal (tactile, visual, auditory, olfactory and gustatory) and the presence or absence of an activated signal (with zero activation defined as no signal whatsoever). In all cases the recording-monitor-source of the signal, and the signal itself, if it is present, must be related to and correlated with the Self knowledge nodal map module.

Robotic Recognition.

Robotic recognition is a mid-level of intelligence wherein the recording monitor signal of the RRC is trained-programmed with a capability to distinguish and differentiate the location, intensity or magnitude of the pattern/signal, assign a priority level to the signal and relate that location, intensity, or magnitude to the self-knowledge nodal map module. Having recognized and prioritized the signal, the robot may be trained to take action dependent on the recognized/prioritized signal.

Robotic Visualization or "Seeing Knowledge".

Visualization is a form of knowledge; a level of intelligence programmed into the system. Visualization is commonly called "seeing knowledge." Visualization or "seeing" knowledge is obtained by internalizing all the different colors, shapes forms and textures into the self-knowledge nodal map module and learning to move the robotic body, limbs or sound generators so as to distinguish manipulate and respond to the different colors, shapes, forms and textures of all the objects in the FOV. The RRC is trained to perform 3D-real time video camera visualizations by performing manual dexterity manipulation tasks on the visualized ("seen") objects and locomotion tasks guided by the visualized objects. Based on the visualized data and the relationship of that data to the self location and identification coordinate frame, a RRC robot may be taught to perform all locomotive and limb manipulation tasks that range from driving autos to threading a needle.

Robotic Self-Knowledge Level of Intelligence. See "Self Knowledge" Level of Intelligence.

Robotic Visual Sensation or "Seeing Knowledge" of the Photometric Image.

Sensations are forms of knowledge; levels of intelligence programmed into the system. The robotic visual sensation of the photometric image refers to the level of intelligence gained by the system with regard to the photometric image. The robotic system is said to have the "sensation" of the photometric image when the level of intelligence of the photometric image reaches the "seeing knowledge" or the robotic visualization level of intelligence. The sensation itself is a form of seeing knowledge of the 3D photometric image inside the controller that consists of CCD—electronic pixels distributed in the 3D-Nodal Map space within the controller. The pixels making up the 3D-photometric image are a high fidelity representation of the 3D-objects located in the FOV of the cameras. In this sense, the photometric image, a mirror image of objects in the FOV, is a "virtual illusion" located within the controller, and the "sensation" represents knowledge of the photometric "virtual illusion." The 3D-virtual image is calibrated with, and related to real objects in the FOVs surrounding the robot, so that no other measurements need be obtained in order to manipulate real-objects or avoid real-obstacles while driving or walking through the 3D-photometric-illusion space.

Robotic Comprehension.

Robotic "comprehension" is a higher level of "recognition" wherein the robot relates and correlates the signal to other signals. In order to "comprehend" the signal it must be related and co-related to signals activated at a different time or originating from a different source. (For example the robot may be trained to identify an environment wherein it suffers many sharp blows as a bombardment with rocks, or lighter scratches (for example caused by a swarm of bees)). In each case comprehension is achieved if the robot may be trained to accurately recognize the environment and takes appropriate action that proves that it accurately "comprehended" the meaning of all the related and correlated signals. (For example the robot may shield itself in a different manner from a bombardment of rocks than from a swarm of bees). Higher levels of comprehension are achieved by relating and correlating the signal with a large number of other signals obtained at different times or from different sources. Proof that a higher level of comprehension has been achieved is obtained by training the robot to respond accordingly to all the related and correlated signals (for example the robot may make a decision whether -fight or flight- is the accurate reaction based on the related and correlated data).

Robotic Awareness of Tactile Activation.

A robotic system is said to be "aware" of a sensory activation if the system constantly—that is throughout its operational lifetime—monitors the environment for that sensory activation and relates that activation to the self location and identification Nodal Map Module and the Task Selector Module (TSM)-memory system associated with it. A RRC robot trained to the basic level of self-knowledge is said to have robotic awareness of tactile activations when the system constantly monitors the environment for any possible tactile activation. In order to be "aware" of the tactile activation the robot must be trained to distinguish the characteristics of any activation and to respond accordingly. A self-knowledge intelligence level robot that has been trained throughout its operational lifetime to distinguish and respond to any tactile activation is said to have robotic awareness of that activation.

Robotic Self Awareness of Visual, Auditory, Olfactory and Gustatory Activations.

A robotic system is said to be "aware" of a sensory activation if the system constantly—that is throughout its operational lifetime—monitors the environment for that sensory activation and relates that activation to the self location and identification Nodal Map Module and the Task Selector Module (TSM)-memory system associated with it. Thus if the visual, auditory, olfactory and gustatory signals are internalized—that is completely related and correlated with the "self-aware" and "self-knowledge" nodal map module—then the system may achieve visual self awareness (visual awareness is generally called "seeing"), auditory self awareness (auditory awareness is generally called "hearing"), olfactory self awareness (olfactory awareness is generally called "smelling"), and gustatory self awareness (gustatory awareness is generally called "tasting"), of the visual, auditory, olfactory and gustatory signals.

RRC-Humanoid Robot

A RRC-humanoid robot, also called a Humanoid-RRC Robot, is generally equipped with human-like body and limbs and all, or part of the human-like sensors. Such a robot has the capability to be behaviorally-programmed to experientially "feel," and/or "see," and/or "hear," and/or "smell," and/or "taste," just like a human, and have the capability to control the robotic body and limbs and the verbal-phoneme sound generator so as to verbalize what it "feels," "sees," "smells," "hears," or "tastes".

rrc-Humanoid Robot

As used herein, the lower case rrc (relational robotic controller) is used to denote a controller that is not the patented RRC, but meets those requirements imposed on the RRC that allow it to be programmed with human-like levels of AI (Requirements #1, #2, #3 and #5; See human-like levels of AI)

RRC-Recording Monitor.

RRC-recording monitors consist of a sensory system and an interface circuit between the sensory system and the RRC-controller. In this disclosure we distinguish between sensory systems and interface circuits that are described by a human-like interface and those described by a machine-like interface.

Search Engine Access Rule

The search engine access rule is a programming rule devised in order to facilitate the search for an appropriate response to any query or statement directed at the RRC-system. The following programming rules have been devised in order to facilitate the search for an appropriate response to any auditory input signal: 1) Search the input signal to determine which TSMs are likely repositories of the appropriate verbal response. 2) Form a compound set of TSMs wherein the response may be stored. 3) Utilize the data present in the input signal and in the compound set of TSMs to home in on an appropriate response.

Self-Knowledge Intelligence Level, Also, Robotic Self-Knowledge Intelligence Level.

Robotic self-knowledge is achieved when the TSM-memory system of the robot is fully trained and remembers how to a) reach and touch (scratch) all points located on the surface of the robotic body, and all points in the near space surrounding the robotic body, b) to identify and locate all such points, and c) to identify and locate all the "end joint" body parts (ends of fingers, elbow, knee etc) used to scratch all the itch points. When the level of training reaches the threshold of "self Knowledge," the self nodal map and associated TSMs will facilitate the robotic identification and recognition of all body parts, and the navigation of all moveable parts of the robot towards any and every itch point located on the surface of the robotic body and all points in the near space surrounding the robotic body. An RRC-robot that has been trained to this most basic level of self location and identification is said to have a self-knowledge intelligence level or is said to have self knowledge.

Self-Location and Identification Nodal Map Module.

As used herein, a "self location and identification nodal map" refers to a pq-nodal map within a Relational Correlation Sequencer wherein the cause vector (p-vector) is trained to navigate one movable part of the robot towards any and all other parts by use of the tactile sensor effect vectors (q-field). This is also referred to as "the self nodal map." The self location and identification Nodal Map Module (NMM), the so called itch-scratch NMM, is the central NMM to which all other NMMs are related. Relations and correlations between signals are programmed for signals emanating from each recording monitor, and between signals emanating from different recording monitors. When the signal data from other recording monitors are related and correlated with the fully trained central self-knowledge coordinate frame, then the system may achieve visual self-knowledge, auditory self-knowledge, olfactory self-knowledge and gustatory self-knowledge levels of intelligence.

Sequence Stepper Also Abbreviated as SSM (Sequence Stepper Module)

As used herein, a "sequence stepper" is an element of the relational correlation sequencer. The sequence stepper determines a sequence of steps for navigating through a set of adjacent nodal points in a pq-nodal map that define a sequence of pq vectors from an initial effects vector to a destination effects vector.

Super-Intelligent Humanoid RRC Robots.

An additional level of machine-like intelligence may be gained by any type of humanoid RRC-robot by adding non-human sensors to the set of human-like sensors. In this case, the signal data from the non-human sensors may be related and correlated with data from the human-like sensors and the self (knowledge) Nodal Map Module, and thereby develop a higher level of human-like intelligence for the non-human sensors. Examples of non-human sensors include radar detectors, sonar detectors, GPS detectors, gas chromatograph detectors, mass spectrometer detectors, electromagnetic detectors operating outside of the human 4000-8000 Angstrom range (for example infrared detectors or X-ray detectors), or any other human-like sensor operating outside of the human range of sensitivity. The addition of a non-human RRC-recording monitor that gives a humanoid RRC-robot an additional level of machine-like intelligence or expertise may give rise to a super-intelligent humanoid RRC-robot.

Task Selector—Also Abbreviated as TSM (Task Selector Module)

As used herein, the "task selector" is trained to select a particular effect vector from all q effect vectors that are applied to the robot at the frame rate. The particular set of effects vectors, selected by the task selector are used as task initiating triggers (TITs). Each TIT is based upon internal or external q field inputs. The TSMs are the primary components of the search engines shown at the top of the HTD. The TSM performs 3-functions: a) It searches the input effect vectors for TIT-patterns. b) It identifies and prioritizes the TIT-pattern. And c) It transmits the highest priority TIT to the Nodal Map Module.

Task Initiating Trigger—Also Abbreviated as TIT

As used herein, a "task initiating trigger" (TIT) includes the particular set of effects vectors that are identified by the TSMs. Generally, a TIT consists of two nodes, a q final node and a q initial node. Those two nodes are used by the Sequence Stepper Module to determine a sequence of p type control signals that move the robot from its initial nodal location (q initial) to the final nodal location (q final). Verbal auditory TITs consist of a sequence of phoneme sounds that are identified by the auditory TSMs as verbal utterances. The trained auditory TSM solves the speech processing coarticulation problem (also known as the segmentation problem) of mapping the acoustic properties of speech into the phonetic structure of an utterance.

Task Interrupt Triggers

Task Interrupt Triggers are TITs with sufficiently high priority to interrupt the task that the RRC-system is presently performing.

The TIT-Processing Periods for the Declarative Hierarchical Task Diagram (DHTD).

The TIT-processing period associated with every TIT-grouping determines the number of sequential phonemes that must be processed before the RRC recognizes the total sequence as a TIT. For the auditory signal, the TIT-processing period is a grouping of frame periods that correspond to the number of frame periods per phoneme, per word, per clause, or per sentence. The selection and identification of a sequential group of phonemes as a TIT is performed in the TSM pattern recognition circuit by training the TSM to repeat the phoneme sounds spoken by the trainer-supervisor (see section 6.1 sub-task A-1). For each phoneme, word, clause, or sentence spoken by the trainer-supervisor, the RRC is trained to recognize the total word, clause or sentence as a TIT and accurately repeat the words spoken by the trainer. In this training mode the TSM may be programmed to determine the speaking rate of the trainer, the number of frame periods per phoneme, per word, per clause, or per sentence, and the spacing between words, clauses or sentences.

Tonotopic Organization

Refers to the locational organization of sound receptors (vibrating reeds or hair fibers) and the tonal-frequency related to their location (placement on a basilar membrane). The RRC-auditory input sensors (vibrating reeds or hair fibers) are organized by what is known as the "place" principle. Following the "place" principle, the frequency of a stimulating sound is mapped onto a location (a "place") along a basilar membrane wherein vibrating reeds pick up the incoming sound wave (The hair-like fibers vibrate like the reeds of an harmonica). The "place" principle is consistent with a collective modality constraint that may be placed on the sound receptors and may be the basis for tuning the time rate of change of frequency pattern (FM-glides) to verbal sounds.

Visual RRC-Humanoid Robot.

A RRC-robot equipped with tactile and visual recording monitors and a human-like interface may be called a visual RRC-Humanoid robot.

Visualization (Robotic). See Robotic Visualization

Robotic visualization is also called 'seeing knowledge.'

Variable Frame Rate and Frame Period.

As used herein, in the Declarative Hierarchical Task Diagram (DHTD), the frame rates and frame periods are variable. They are highly dependent on the declarative training methodology. While training the declarative TSM to repeat the words or sentences spoken by the trainer-supervisor, the selection and identification of sequential groupings of phonemes as TIT-groups is performed. The duration of each word or clause-grouping (TIT-group) is recognized as the frame period of the TIT-group, and the rate at which sequential TIT-groupings are generated is the frame rate of system.

Verbalizing RRC Answering Machine System (Also RRC Answering Machine)

(See Auditory RRC-verbalizing answering machine). A stand-alone sub-system of the Auditory RRC-Humanoid robot that may function as a highly intelligent telephone answering machine.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

BRIEF DESCRIPTION

Some embodiments of the invention include an Auditory RRC-humanoid robot system that is programmed/trained to reach human-like levels of auditory and verbal artificial intelligence (AI). Each inventive embodiment consists of an auditory recording monitor, a RRC-controller equipped with a verbal-phoneme sound generator, a mechanical human-like robotic body, the interface circuit between the recording monitor and the RRC, and a description of the training programming required to reach human-like levels of AI. The innovativeness of the invention resides in the interface circuit between the state of the art auditory recording monitor, the patented RRC controlled robot, and the programming/training of the system to reach human-like levels of AI. Human-like levels of AI may be measured by giving a fully programmed robot an IQ-test, similar to the one given to humans. Programming the defined level of human-like AI into the system, constrains the design of the sensory monitors, the interface circuitry, and the programming of the RRC as follows: The system must a) identify, recognize and comprehend all sounds in the audible frequency range from 0 to 20,000 cps, b) differentiate and respond to the sensation of musical sound, verbal speech and sound noise present in the environment of the robot, c) identify, recognize and comprehend verbal speech directed at, or spoken to the auditory RRC recording monitor, d) have the capability to respond intelligently, via a verbal-phoneme sound generator to verbal queries or statements directed at the auditory RRC recording monitor. In addition, the interface must be designed e) so that the auditory signals are scaled and calibrated with the input to the multi-dimensional Nodal Map Module. And f) finally it is necessary to prove that the robotic system may indeed identify, recognize, and comprehend the signals modified by the interface and presented to the RRC. This proof is obtained by training-programming the RRC-system to actually identify, recognize, comprehend, and vocalize a response to the signals described in the steps a) to f) outlined above.

Overview of the Three Major Steps in the Design of an RRC-Humanoid Robot

Major Step 1 includes the defined level of intelligence

A human-like level of intelligence is achieved when the signals and/or sequential, acoustic phoneme sounds are a) recognized and identified as phonetic words and sentences in the auditory recording monitor, or as objects present in the FOV of the visual recording monitor, b) constantly monitored throughout the operational lifetime of the system, and c) fully related and correlated and internalized into the self-knowledge nodal map module. In addition, d) the TSM-memory systems must be fully trained, as described in the RRC-patent, to remember all the relations, correlations, and priority levels associated with them. And e) the system must be fully trained to move body, limbs, or activate sound generators so that different actions (or the addition of visual stimuli, sounds, smells and tastes) differentiate, distinguish, identify and recognize the acoustic input signals and the visual location and character of 3-dimensional forms and shapes, and the different colors and textures of all the objects in the FOV.

Major Step 2 includes the design of a human-like interface

A human-like interface requires that the design of the auditory apparatus be human-like, and that the sensory system, the interface, and the RRC can "identify", "recognize" and "comprehend," the following:

a) Identify, recognize and comprehend all sound in the audible range of 0 to 20,000 cps, b) Differentiate and respond to the sensation of musical sound, verbal speech and sound noise present in the environment of the robot, and c) Identify, recognize and comprehend verbal speech directed at, or spoken to the auditory RRC recording monitor.

d) Have the capability to respond, via a sound generator to verbal queries or statements directed at the auditory RRC recording monitor. In addition, the interface must be designed so that e) the auditory signals are scaled and calibrated with the input to the multi-dimensional Nodal Map Module.

Major step three includes programming proof that the RRC-system has achieved human-like high IQ-levels of AI.

Finally it is necessary to prove that the robotic system may indeed identify, recognize, and comprehend the signals modified by the interface and presented to the RRC. This proof is obtained by behaviorally training-programming the RRC-system to actually identify, recognize, comprehend, and vocalize a response to the signals described in the steps outlined above. This includes the activation of the verbal-phoneme sound generator and/or movement of the robotic body or limbs so as to verbally distinguish and discriminate, or physically manipulate and respond in an appropriate manner to all the different sounds impinging on the auditory recording monitor.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein both Figures and Tables are briefly described.

List of Figures

FIG. 3A is a continuation of FIG. 2, conceptually illustrating the lower levels of the Declarative Hierarchical Task Diagram (DHTD) that are denoted by insert A in FIG. 2.

FIG. 11 conceptually illustrates an electronic system with which some embodiments of the invention are implemented.

LIST OF TABLES

All tables have been incorporated into the text of the specification. Tables are referred to by their table number.

Table 1 presents an overview of the specification, specifying SECTIONS A, B, C, D and STEPS 1-8.

Table 2 presents a list of English phonemes and phoneme-combinations utilized in the preferred embodiment.

Figure 2:
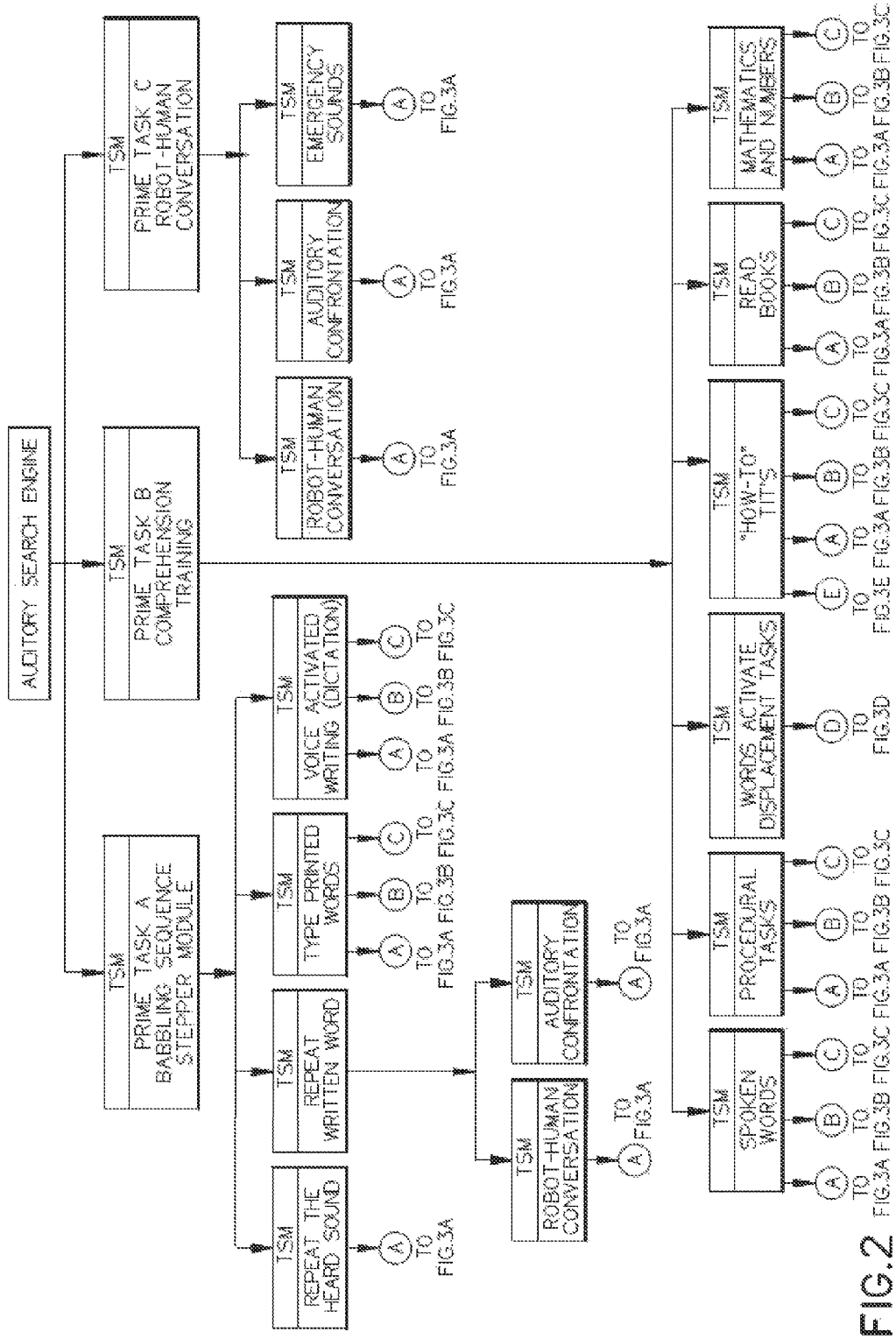
FIG. 2 illustrates a schematic of the Declarative Hierarchical Task Diagram (DHTD) in which the TSMs of the auditory search engine form a declarative memory system within the RRC in some embodiments.
Figure 3B:
FIG. 3B is a continuation of FIG. 2, conceptually illustrating the lower levels of the Declarative Hierarchical Task Diagram (DHTD) that are denoted by insert B in FIG. 2.
Figure 3C:
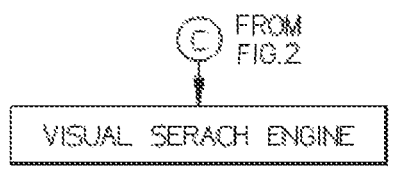
FIG. 3C is a continuation of FIG. 2, conceptually illustrating the lower levels of the Declarative Hierarchical Task Diagram (DHTD) that are denoted by insert C in FIG. 2.
Figure 3D:
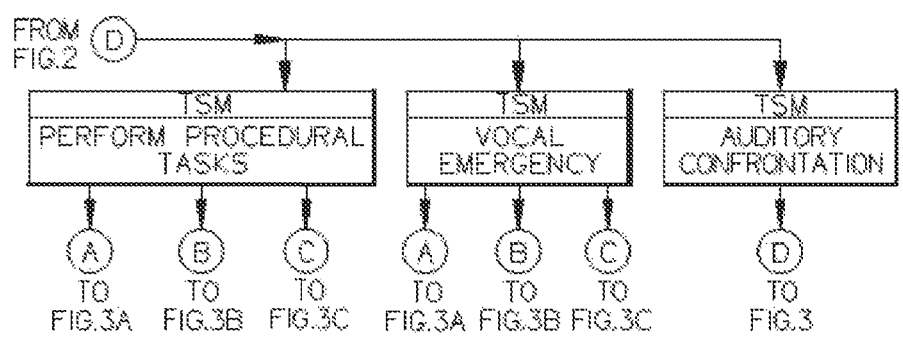
FIG. 3D is a continuation of FIG. 2, conceptually illustrating the lower levels of the Declarative Hierarchical Task Diagram (DHTD) that are denoted by insert D in FIG. 2.
Figure 3E:
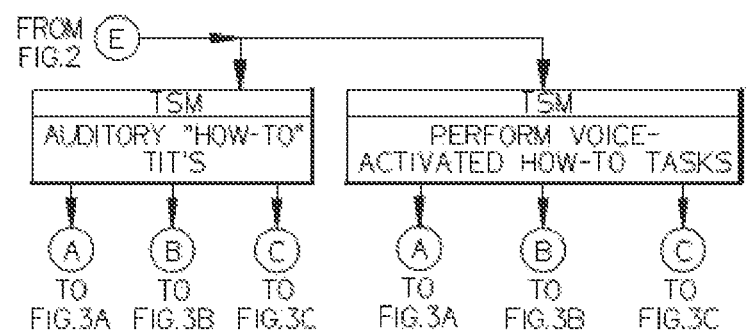
FIG. 3E is a continuation of FIG. 2, conceptually illustrating the lower levels of the Declarative Hierarchical Task Diagram (DHTD) that are denoted by insert E in FIG. 2.

Table 3 presents the sequence of training steps for programming the TSMs of the declarative memory system listed in FIG. 2.

Table 4 presents the training methodology (Subtask A-1) for robotic repetition of the words and sentences spoken to the Robot.

Table 5A presents the training methodology (Subtask A-2a) to verbally read written words and sentences.

Table 5B presents the training methodology (Subtask A-2b) to verbally spell written words and sentences.

Table 6A presents the training methodology (Subtask A-3) to verbally spell words spoken by the trainer-supervisor.

Table 6B presents the training methodology (Subtask A-4) to typewrite the text read by the robot.

Table 6C presents the training methodology (Subtask A-5) to typewrite the words and sentences spoken by the trainer-supervisor (take dictation).

Table 7A presents the training methodology (Subtasks B-1) to verbally describe visual image data.

Table 7B presents the training methodology (Subtasks B-2) to verbally describe experiential data.

Table 7C presents the training methodology (Subtasks B-3) to have the robot respond to verbal commands that activate displacement tasks.

Table 8A presents the training methodology (Subtasks B-4) to verbally describe 'how to' perform a previously learned procedural task.

Table 8B presents the training methodology (Subtask B-5) to train the RRC-robot to read books and remember their contents.

Table 8C presents the training methodology (Subtasks B-6) to comprehend numbers and perform mathematical computation.

Table 9A presents the training methodology (Subtasks C-1) to perform robotic conversation.

Table 9B presents the training methodology (Subtasks C-2) to perform 'in passing,' non-confrontational robotic conversation.

Table 9C presents the training methodology (C-3) to perform 'in passing,' confrontational robotic conversation.

BRIEF DESCRIPTION OF THE COMBINED FIGURES AND TABLES

Table 1 presents an overview of the design of an auditory RRC controlled robot. The design is described below as an 8-step process divided into four sections, sections A, B, C, and D.

Section A is an introductory section that describes the operation of the RRC. Section B describes the auditory apparatus stages. Section C describes the interface circuit stage, and Section D describes the programming of the system to prove that the intelligence level of the system is human-like. Note: Three additional sections are added at the end of section D. Section E describes improvements added to the state of the art by the robotic speech processing capability described herein. Section F is a description of the underlying electronic system. And section G differentiates between robotic and human subjective experiences.

Figure 1:
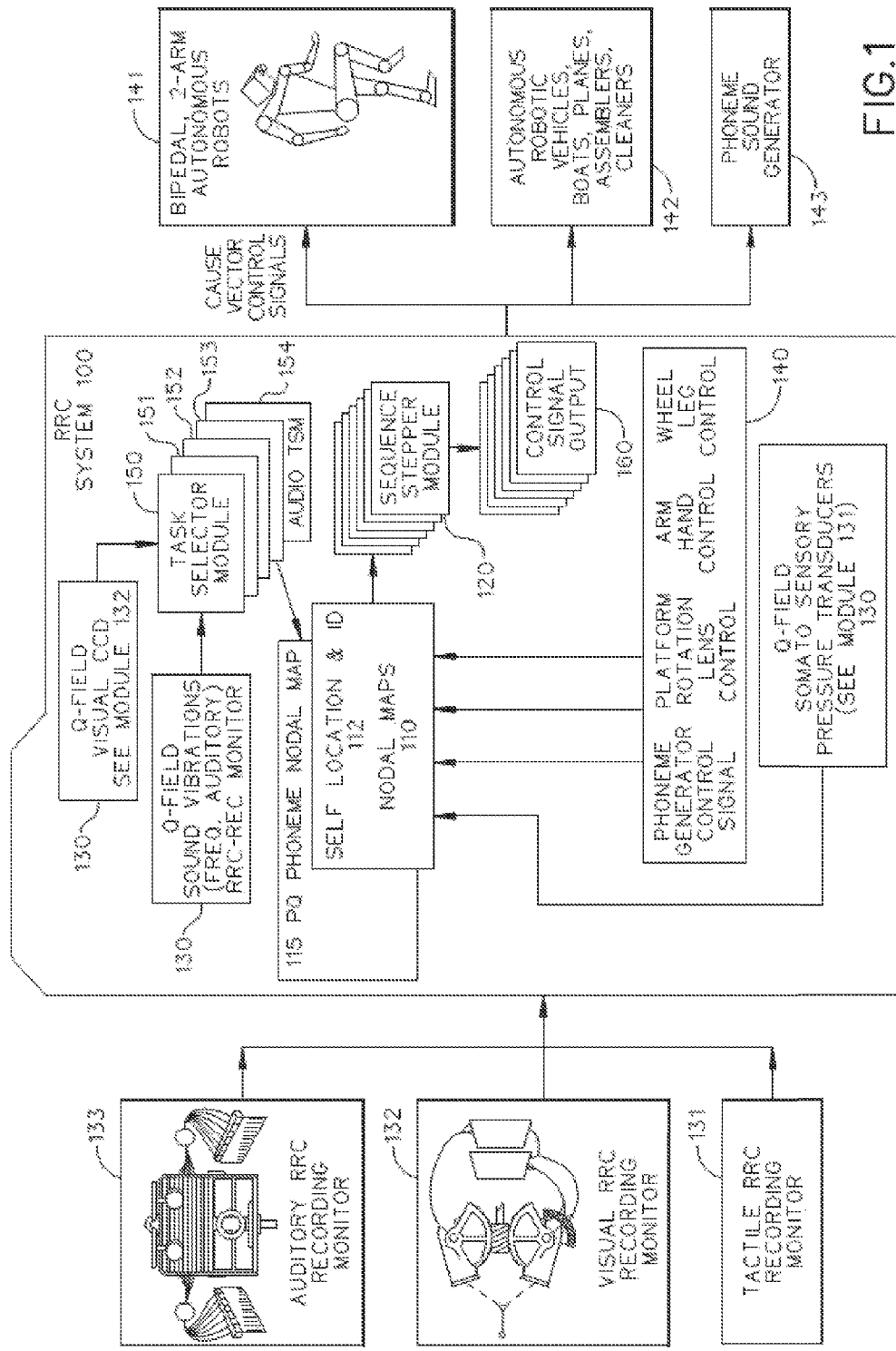
FIG. 1 conceptually illustrates a set of recording monitors included in the auditory RRC-humanoid robot system in some embodiments.
Figure 4:
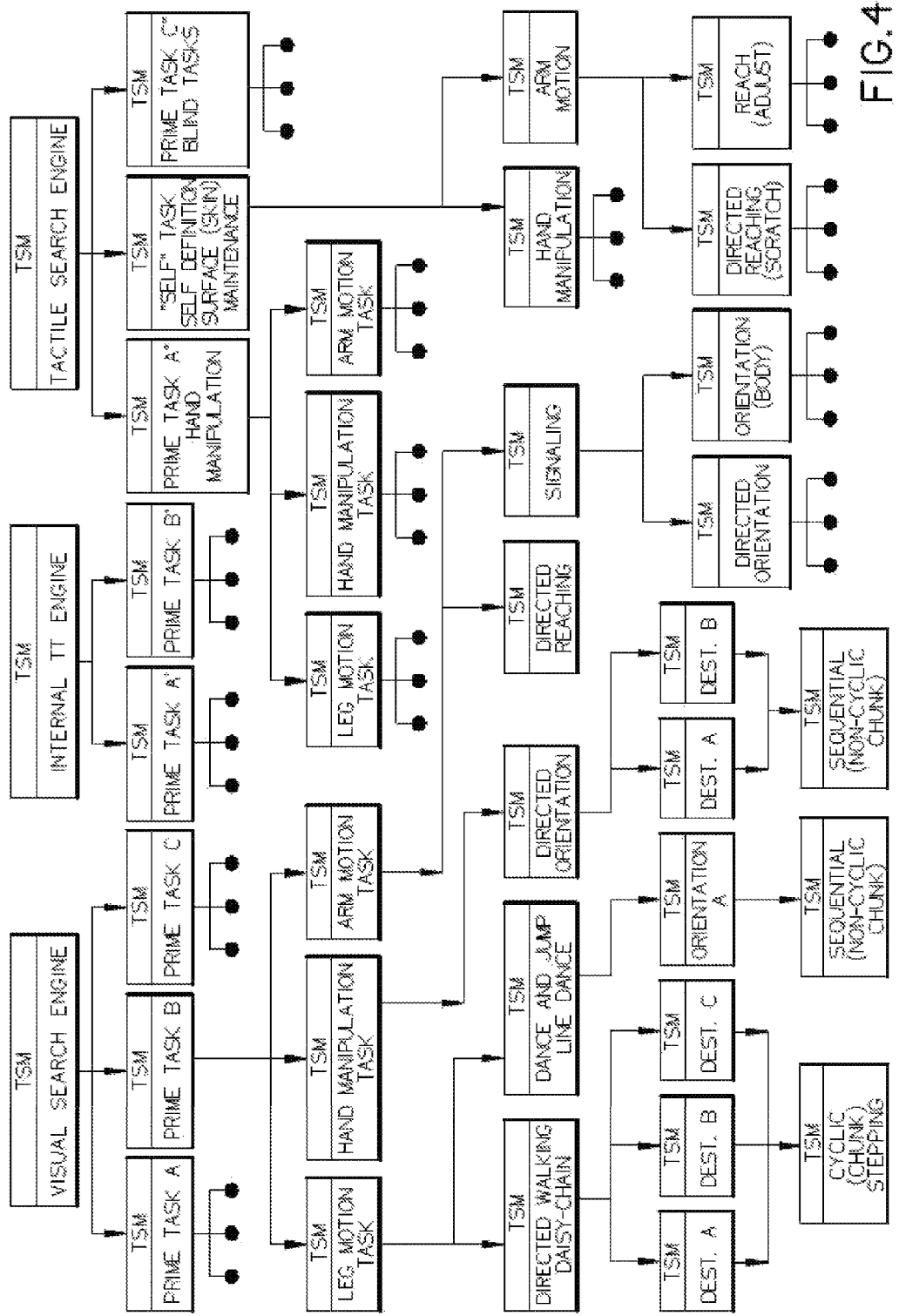
FIG. 4 conceptually illustrates a schematic of the procedural HTD in which TSMs of the procedural search engines form a procedural memory system within the RRC in some embodiments.

Section A the operation of the RRC, is described by reference to FIG. 1, FIGS. 2 and 3, and FIG. 4. FIG. 1 illustrates of the various recording monitors included in the Auditory RRC-Humanoid Robot (described in the RRC-patent (see Related Applications)). FIGS. 2 and 3, the Declarative Hierarchical Task Diagram (DHTD), describes the TSMs of the auditory search engine. Those TSMs form a declarative memory system within the RRC. FIG. 4, the procedural HTD, describes the TSMs of the procedural search engines that form a procedural memory system within the RRC (Figure taken from the RRC-patent).

Section B the auditory apparatus stage, is described by use of two steps (Step 1 and 2), one Figure (FIG. 5), and one table (Table 2). Step 1, the description of the auditory input microphones, includes FIG. 5 that shows the details of the auditory RRC Recording Monitor. Step 2, the description of the verbal-phoneme sound generator includes Table 2 that shows the list of English phonemes and phoneme-combinations utilized in the preferred embodiment.

Figure 7:
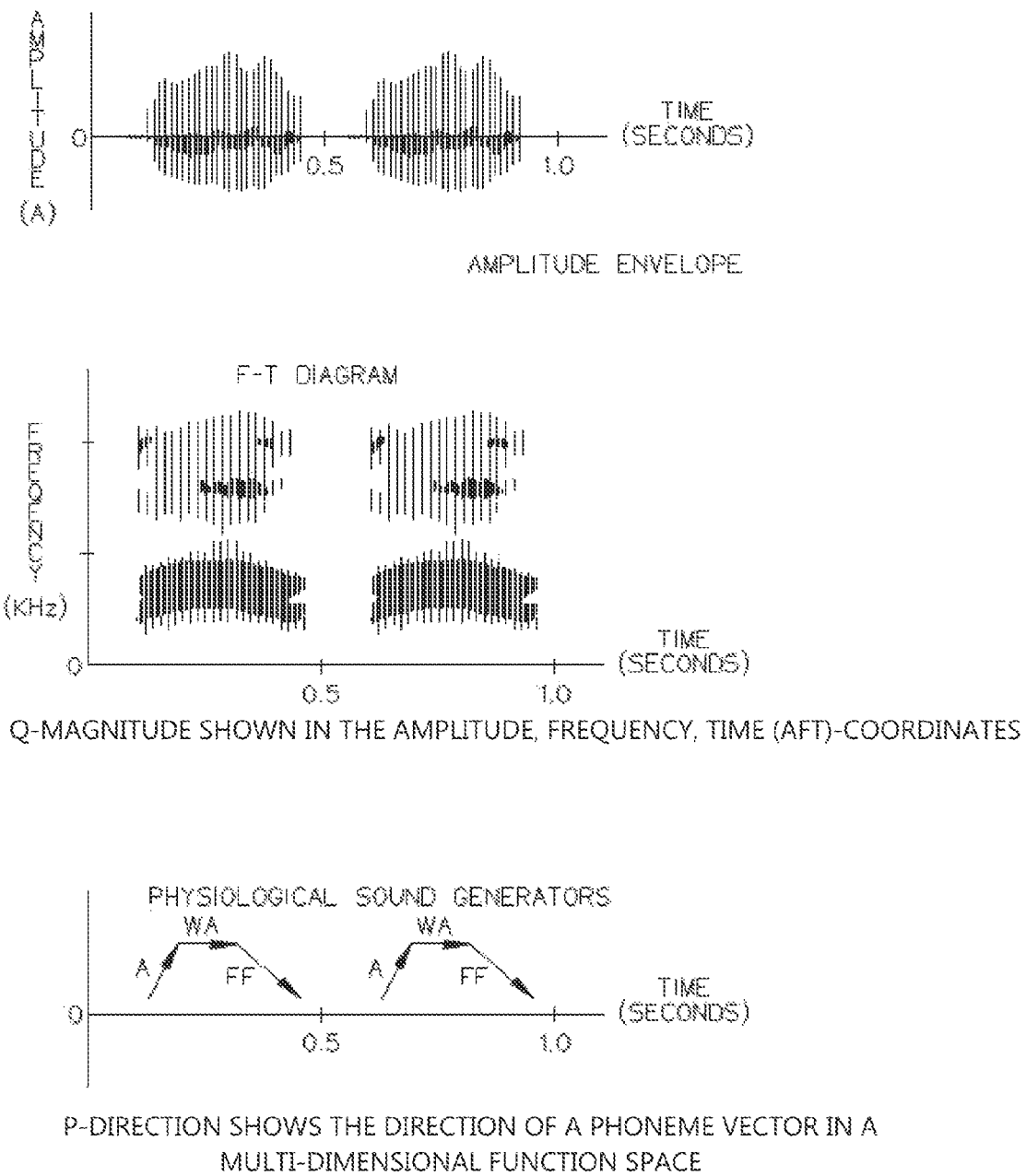
FIG. 7 conceptually illustrates sample data of a-f-t diagram-Spectrogram of two short bursts of sound represented by three-sequential p-phonemes a-wa-ff with a directional vector representation of the p-phonemes input to the p-q phoneme nodal map module is shown in some embodiments.
Figure 8:
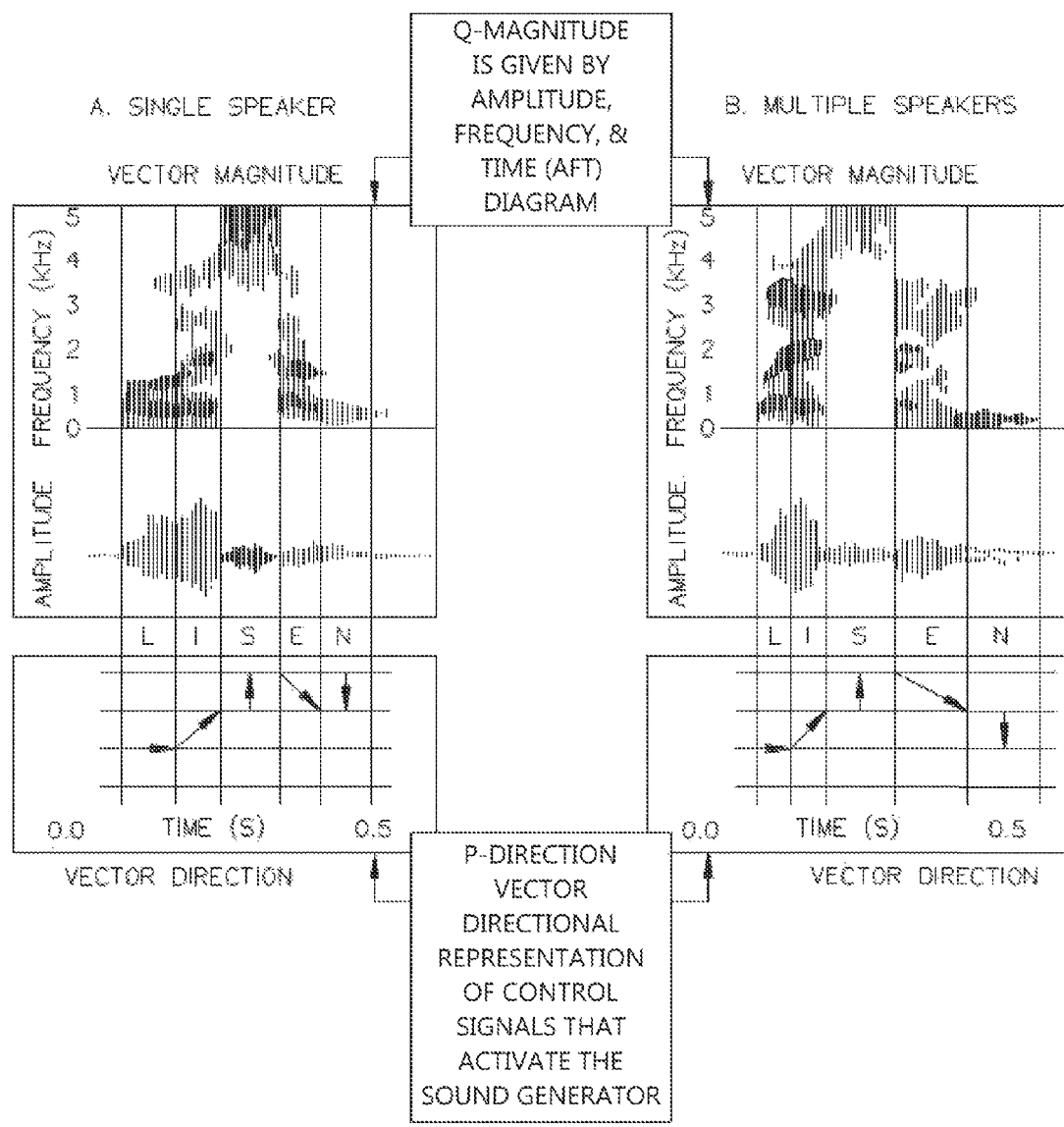
FIG. 8 conceptually illustrates samplings of data of a-f-t diagram-spectrograms showing the magnitudes and directions of a sequence of multi-dimensional p-phoneme vectors representing the word "listen" where the vector direction is shown at the bottom and the functional vector magnitude is shown at the top with FIGS. 8A and 8B showing the differing amplitude and frequency formants for different speakers.
Figure 9:
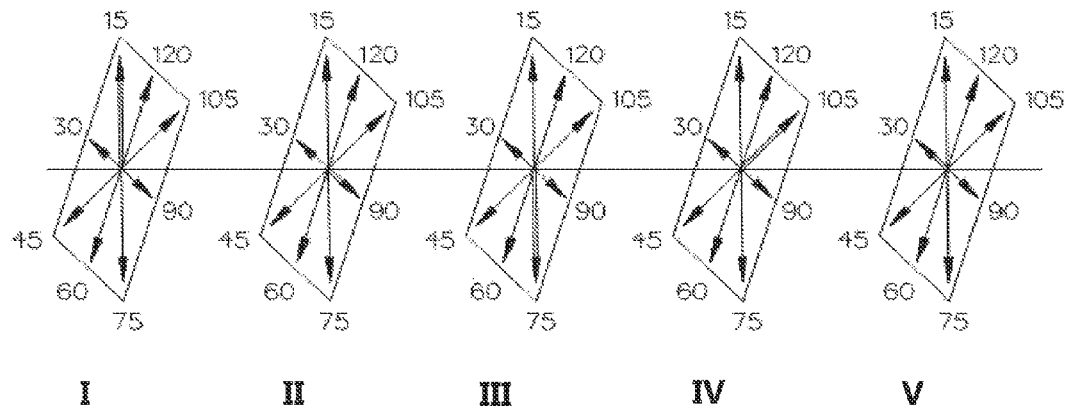
FIG. 9 conceptually illustrates the navigational path in the multidimensional p-q phoneme nodal map module of a sequence of p-phonemes associated with a 5-phonemes sequence taken from the list of 120-phonemes shown in Table 2.
Figure 9:
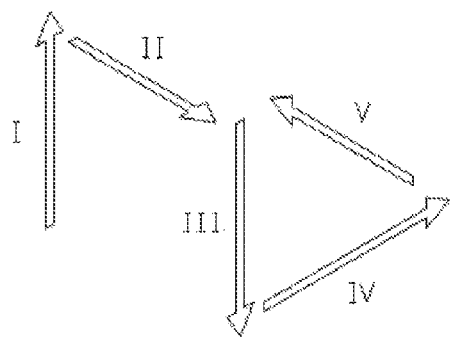

Section C the interface-circuit stage, is described, by use of 4 steps (Step 3, 4, 5, and 6a), four figures (FIGS. 6, 7, 8, and 9), and two tables (Table 3 and Table 4). Step 3, the description of the spectrum analyzer (shown as subsystem 502 in FIG. 5) and the methodology for the decomposition of the input signal into collective modalities, includes FIG. 6 that shows the decomposition of the input auditory signal into collective modalities tuned to the verbal and non-verbal elements of the input signal. Step 4, The design of the q-magnitude and p-direction of a p-phoneme vector, includes FIG. 7-8 that shows a sample a-f-t diagram Spectrogram of 2 short bursts of sound represented by 3-sequential p-phonemes a-wa-ff. Step 5, the design and selection of the multi-dimensional auditory Nodal Nap Module, includes FIG. 8 and FIG. 9. FIG. 8 shows the magnitudes and directions of a sequence of multi-dimensional p-phoneme vectors representing the word "listen." The vector direction is shown at the bottom of the figure, whereas the functional vector magnitude is shown at the top of the figure. FIGS. 8A and 8B show the differing amplitude and frequency formants for different speakers. FIG. 9 presents the Navigational path of a sequence of p-phonemes associated with a 5-phonemes sequence taken from the list of 120-phonemes shown in Table 2. Step 6a includes innovative speech processing techniques for verbal pattern recognition and phoneme sound generation by use of two tables (Table 3 and Table 4). Table 3 describes the training-programming the TSMs of the declarative memory system and the application of the search engine access rule described in Section D. Table describes the Training methodology (Subtask A-1) for repetition and Babbling. Repetition training consists of programming the system to repeat phoneme-sound based words and sentences spoken by the trainer-supervisor.

Figure 10:
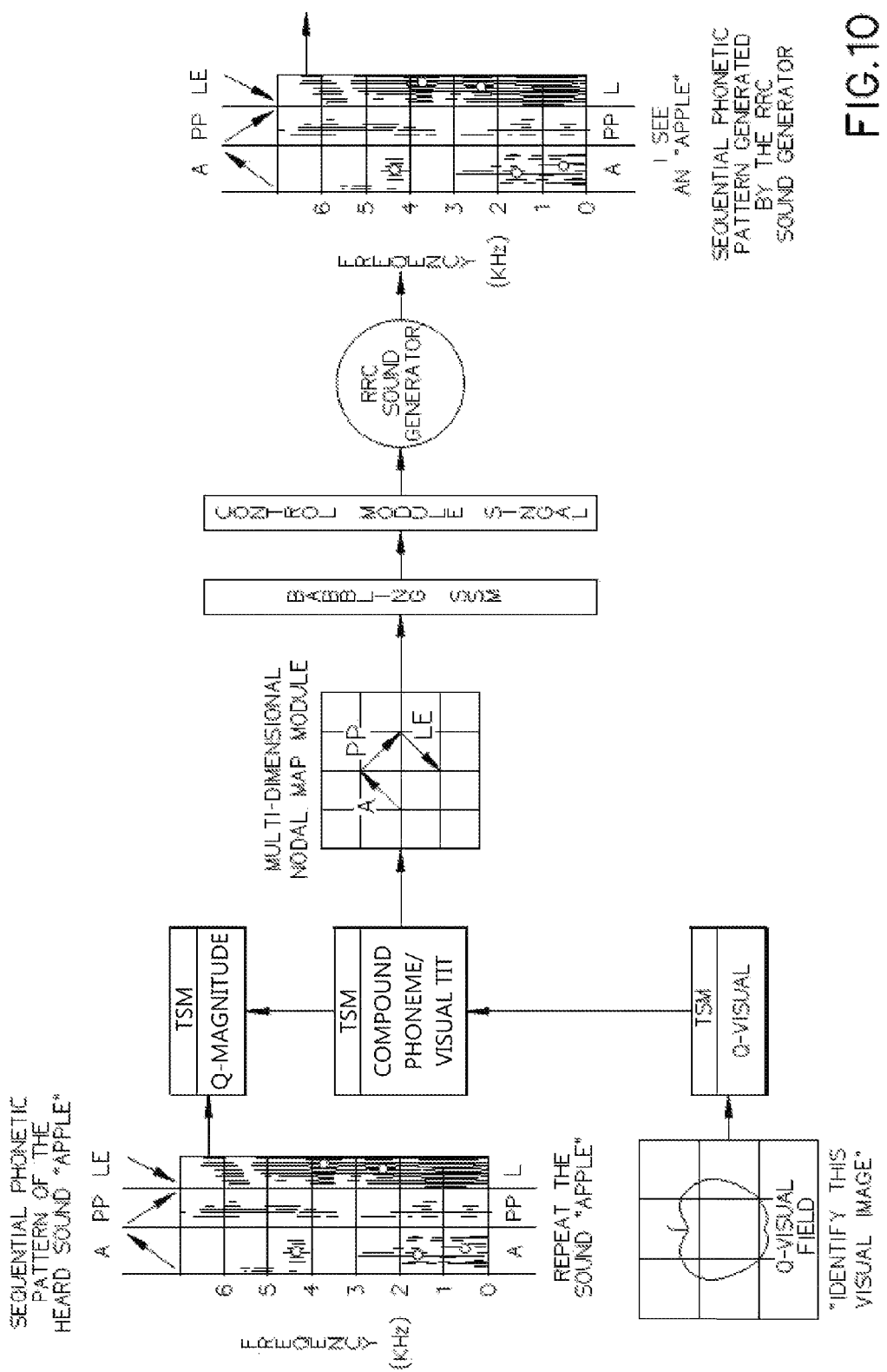
FIG. 10 conceptually illustrates a schematic block diagram that shows the q-visual, q-phoneme flow through the auditory RRC for comprehension training of the word "apple" in some embodiments.

Section D programming-proof that the interface supports human-like AI-levels is described by use of three steps (Step 6b, Step 7 and Step 8), one figure (FIG. 10), and eleven tables (Table 5AB, Table 6ABC, Table 7ABC, and Table 8ABC). Step 6b, the method of Training the RRC to read and write words and sentences, is described by Tables 5AB, and Table 6ABC. Table 5A describes the training methodology to verbally read (subtask A-2a and Table 5B describes the training required to verbally spell the written words and sentences (subtask A-2b). Tables 6A, 6B, and 6C describe the training methodology to verbally spell, typewrite the read text, and take dictation, respectively of the words and sentences spoken by the trainer-supervisor. Step 7, the Training of the comprehension of words and sentences describing all objects located in the coordinate space around the robot, is described by use of FIG. 10 and Tables 7A, B, and C, and Tables 8A, B, and C. FIG. 10 is a block diagram that shows the q-visual, q-phoneme flow through the auditory RRC for comprehension training of the word "apple." Tables 7A, B, C describe the training methodology to verbally describe visual data (sub-task B-1), and experiential data (sub-task B-2), and program the robot to respond to verbal commands (sub-task B-3), respectively. Table 8A, B, C: describes the training methodology to command the robot to perform displacement tasks (sub-task B-3), describe "how to" tasks (sub-task B-4), read books (subtask B-5) and 'do arithmetic' (sub-task B-6). Step 8, training the robotic system to converse intelligently with humans and other robots, is described with the aid of Tables 9A, B, and C. Table 9A presents the training methodology (sub-task C-1) to allow the robot to perform robotic human-like conversation. Table 9B, presents the training methodology (Subtask C-2) to perform 'in passing,' non-confrontational robotic conversation. Table 9C, presents the training methodology (Sub-task C-3) to perform 'in passing,' confrontational robotic conversation.

Section E presents improvements to the speech processing methodology described in this disclosure, due to the high level of AI incorporated into the system.

stage (Section C), and the processing of the data stage (Section D) is described as an 8-step process for the 3 stages illustrated in Table 1.

TABLE 1

An auditory RRC controlled robot includes a RRC-controller controlling a humanoid RRC-system (described in Section A), the auditory apparatus including microphones and a verbal-phoneme sound generator (described in Section B), an interface circuit between the auditory input microphones and the RRC-controller (described in Section C), and a processing-training stage during which the RRC controller is programmed and trained to show that the data-signals may be identified, recognized and comprehended in a human-like manner (described in Section D). The design of the auditory RRC-recording monitor is described as an 8-step process (shown in the Table)

SECTION A

THE RRC SYSTEM STAGE

SECTION B

THE AUDITORY APPARATUS STAGE
STEP 1                                     STEP 2
AUDITORY INPUT MICROPHONES                 VERBAL PHONEME SOUND GEN.
       AUDITORY SENSING AND SOUND GENERATION TRANSDUCERS

SECTION C

| INTERFACE CIRCUIT STAGE | | | |
|---|---|---|---|
| STEP 3 | STEP 4 | STEP 5 | STEP 6a |
| SPECTRUM ANALYZER DECOMPOSITION INTO COLLECTIVE MODALITY | DESIGN OF THE P-PHONEME VECTOR | DESIGN OF THE AUDITORY NODAL MAP MODULE | SPEECH PROCESSING: TRAINING TO REPEAT SOUNDS |
| THE INNOVATIVENESS LIES IN THE DESIGN OF THE INTERFACE | | | SPEECH PROCESSING: MAPPING SIGNALS ONTO PHONETIC STRUCTURES |

SECTION D

| TRAINING | | |
|---|---|---|
| STEP 6b | STEP 7 | STEP 8 |
| SPEECH RECOGNITION TRAINING TO READ AND WRITE SPEECH PROCESSING: MAPPING SIGNALS TO PHONETIC STRUCTURE | TRAINING COMPREHENSION OF WORDS & SENTENCES COMPREHENSION TRAINING. THE INTERFACE IS HUMAN-LIKE | TRAINING THE ROBOT TO CONVERSE INTELLIGENTLY VALIDATION THAT |

Section F the description of the underlying electronic system, as described by reference to an example electronic system shown in FIG. 11.

Section G differentiates between robotic and, human-like subjective experiences, and presents a disclaimer regarding robotic subjective experiences of the RRC-robot.

DETAILED DESCRIPTION

In the following sections, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

A description of the operation of a RRC that supports programming of human-like intelligence levels into the system is presented in Section A, followed by a description of the auditory apparatus stage (Section B), the interface circuit Section A: Operation of a RRC that Supports Programming Human-Like Levels of AI The Search Engine Mode of Operation The auditory search engine is shown in the Hierarchical Task Diagram (HTD) presented in FIG. 2 and continued in FIG. 3. The FIGS. 2-3 HTD is the top-level specification for the performance of all declarative-verbal tasks performed by the RRC system. The visual and tactile search engines shown in the HTD of FIG. 4 operate concurrently with the FIG. 2-3 HTD to guide the robot in the performance of the multiple tasks listed in the two figures. The FIG. 4 HTD was taken from, and described in U.S. Pat. No. 6,560,512, issued May 6, 2003. Each search engine is used to search the environment of the robot, as detected on the respective Nodal Map Modules (NMM), for signal patterns that will be recognized by the RRC as Task Initiating Triggers, (TIT)-patterns that activate any of the tasks listed in the FIG. 2-3 or FIG. 4 HTD.

Each of the prime level tasks, shown in FIGS. 2-4, has a programmed Task Selector Module (TSM) associated with it. The dominant electronic component of each TSM is a pattern recognition circuit that is programmed to recognize and prioritize the TIT-pattern detected by each of TSMs as they operate on each of the input Nodal Map Modules (NMMs).

The NMMs, subsystems 110 in FIG. 1, are part of the array of the self-location and identification NMMs that make up the RRC-block diagram. Subsystems 130 show the Auditory q-field multi-dimensional verbal-phoneme NMM and the visual q-field NMM that is calibrated with the self-location and identification NMM. System 100, described in U.S. Pat. No. 6,560,512, issued May 6, 2003, and are shown again in FIG. 1 of this disclosure. Those descriptions are fully applicable to this disclosure and are utilized extensively in Section-D (the RRC-processing stage).

Time scales used in operations and training: Two time scales are maintained during the training/programming of the RRC-robot, the training-mode time-scale and the operational mode time-scale. The training mode time scale is used to train the robot to perform time-independent tasks when the robot is not in an operational mode. The operational mode time scale is measured in real time by the operational clock-time of the robot. It is also called the real-time of the robot. After the robot has been trained offline, when the robotic system first becomes operational, the operational clock of the robot is initiated. Robotic clock time tracks human clock time and is activated and maintained throughout the operational lifetime of the robot.

Programming the Memory System of RRC-Humanoid Robot: Learning and memory is generally classified as procedural (or reflexive) if the learning or memory involves motor skills, and declarative if the learning or memory involves verbal skills.

A procedural memory system within the RRC: In the patented volitional multi-tasking RRC-robot, procedural TITs operate in the muscle-joint NMM, and procedural memory is the basis for all the control functions of the somatic motor system. FIG. 4 shows the TSMs associated with the procedural memory system. The programmed-trained TSMs shown in FIG. 3, give the robot the capability to "remember how" to perform all the mechanical displacement subtasks listed under the prime level task. (e.g., a mail delivery robot "remembers" via the set of prioritized TITs, the procedure for delivering mail). The design of the procedural memory capability of the RRC-robot was claimed in U.S. Pat. No. 6,560, 512, issued May 6, 2003.

A declarative memory system within the RRC: FIG. 2-3 shows the TSMs associated with the declarative memory system. The programmed-trained TSMs shown in FIG. 2-3, give the robot the capability to "remember how" to perform all the sub-tasks listed under the 3-prime level tasks. The declarative memory system includes a robotic capability to a) repeat, read and write all words and sentences presented to the robot (T-200 in Table 2-3), b) comprehend and identify and describe verbally all nouns, adjectives, verbs and adverbs that are presented to the robotic visual and tactile systems (T-300 in Table 3). And c) perform robot-human conversation with comprehension (T-400 in Table 3). The design of a declarative memory system for the auditory RRC-Humanoid Robot is claimed in this disclosure.

The programming of the auditory RRC-robot: Programming/training the RRC-robot is a process of training the pattern recognition circuits of each TSM associated with each prime level task and all the TSMs associated with the sub-tasks listed under the prime level task. The pattern recognition circuits must recognize, identify and prioritize input-signal TIT patterns that initiate the prime level task and all the lower priority TIT-sub-tasks that are listed under the prime level task. The programmed TSMs associated with all the tasks in FIGS. 2-4, give rise to declarative and procedural memory systems within the controller. Training the procedural memory system of a multi-tasking RRC was discussed and presented in U.S. Pat. No. 6,560,512, issued May 6, 2003. Training the declarative memory system of the auditory RRC-robot is presented in the following sections.

Training-programming the declarative TSMs: Frame rates and TIT-processing periods: The auditory sound generating TSMs may be trained in either the supervised or unsupervised programming mode. The supervised programming mode is described in this disclosure. In both modes the auditory TSMs consist of multiple pattern recognition circuits that must a) identify the phoneme content of the incoming (a-f-t)-signal, b) group a sequential set of individual phonemes into words, clauses, and or sentences, c) select and identify a sequential grouping as a TIT, and d) assign a priority level to the selected TIT. Thus the auditory TSM breaks up the incoming sound signal into a set of sequential TIT-groups. Each TIT-group consists of a sequential grouping of phoneme sounds. The TIT groups are made up of a variable number of sequential phonemes, depending on whether the group represents an individual phoneme or the sequential number of phonemes that make up a word, clause or sentence. The TIT-processing period associated with every TIT-grouping determines the number of sequential phonemes that must be processed before the RRC recognizes the total sequence as a TIT.

The selection of TIT-processing periods and formation of TITs that distinguish phonemes, words, clauses and sentences: The selection and identification of a sequential group of phonemes as a TIT is performed in the TSM pattern recognition circuit by training the TSM to repeat the phoneme sounds spoken by the trainer-supervisor (see Step 6a, subtask A-1). For each phoneme, word, clause, or sentence spoken by the trainer-supervisor, the RRC is trained to recognize the total word, clause or sentence as a TIT and accurately repeat the words spoken by the trainer. In this training mode the TSM may be programmed to determine the speaking rate of the trainer, the number of frame periods per phoneme, per word, per clause, or per sentence, and the spacing between words, clauses or sentences.

The process of training the declarative memory system of the auditory RRC: The output of the auditory TSM (subsystem 153 in FIG. 1) is recorded on the auditory NMM (subsystem 115 in FIG. 1) and thence to the Sequence Stepper Module (subsystem 120 in FIG. 1), Control Signal Output Module (subsystem 160 in FIG. 1), and finally the verbal-phoneme sound generator (subsystem 143 in FIG. 1) that may repeat the phoneme sounds spoken by the trainer-supervisor.

The sequence of steps for training-programming the declarative memory system of the auditory RRC is presented in Table 3. Training the RRC-robot to repeat words and clauses, taken from a word lexicon, is presented in part A, subsystem T-200 of Table 3. The training methodology (Subtask A-1) for repetition and babbling is presented in Table 4. Note that during the learning process the total heard clause acts as a TIT. Training the RRC robot to relate words to visual data and to respond with motion to verbal commands is described in part B, subsystem T-300 of Table 3. The training methodology to read, write and take dictation (Subtasks A-2, A-3, A-4, and A-5) is presented in Table 5A, B and Table 6A, B, C. The training methodology (Subtasks B-1 to B-6) for all verbal comprehension tasks is presented in Tables 7A, B, C and Table 8A, B, C. The auditory TITs are generally simultaneously associated with, related-correlated, or conditioned with visual field TITs, tactile field TITs, or other sound field TITs. Finally, training the RRC to receive and recognize verbal descriptor TITs and then generate an appropriate response is described in part C, subsystem T-400 of Table 3

(Robot-Robot or Robot-Human conversation with comprehension). The training methodology (Subtasks C-1, C-2, C-3) to converse intelligently is presented in Tables 9A, 9B, and 9C.

Note also the difference between the q-final TITs used in FIG. 4 and the auditory TITs of FIG. 2-3. The auditory TITs often consist of a long sequence of phonemes, words, clauses or sentences, and the total pattern is not recognized until the end of the sequence. This is particularly noticeable in the training of part C, subsystem T-400 of Table 3, and the training methodology in Table 9A, that describes training the RRC to respond verbally to verbal speech. The higher-level sound generating tasks consist of sentences and paragraphs, as shown in FIG. 2-3. Generally sentences are structured by multiple TITs, possibly one TIT per word or clause. Thus in the auditory HTD shown in FIG. 2-3 the TITs are imposed on the system bottom-up, rather than top-down as in the multi-tasking HTD shown in FIG. 4. That is, the sequential phonemes form chunks, clauses or sentences before they are recognized as TITs, and if a verbal response is to be generated, the total sequential response structured as a TIT must be activated. Since it is necessary to comprehend the total sentence or paragraph generated by the speaker before one can respond, it is important that the representation at the top of the hierarchy, shown in FIG. 2-3, is included in the lower level TITs used to train the low and mid level hierarchical task structures. This gives rise to greater variability in the syntactical structure of the sentences and clauses and greater complexity in the implementation of the search engine access rule described below. The search engine must choose among the various grammatically acceptable syntactical structures of sentences and clauses (by use of the access rule) a response that assures that the sound generation process is a comprehensible response to the syntactical structure picked up by the sound search engine TIT shown at the top of FIG. 2-3.

The pattern recognition circuits of the auditory-TSMs may be programmed (trained) "off-line" using the training mode time scale for all the tasks listed in Table 3. The same trained auditory-TSMs, shown in FIG. 2-3, are utilized during the operational mode to control and activate the auditory verbal-phoneme sound generator. The sub-tasks at the bottom of the hierarchy are the vocabulary words which make up the "chunks" forming the "line dances" described in U.S. Pat. No. 6,560,512, issued May 6, 2003. In the auditory HTD, the line dance is made up of a sequence of word (chunks) that is shown at the bottom of FIG. 2-3. The sequence of words is initially selected from a 50,000-word lexicon that serves as the vocabulary of the robot and as a source of auditory sound field TITs.

Section B—the Auditory Apparatus Stage (Steps 1 and 2)

Step 1—the Auditory Input Microphones

Figure 5:
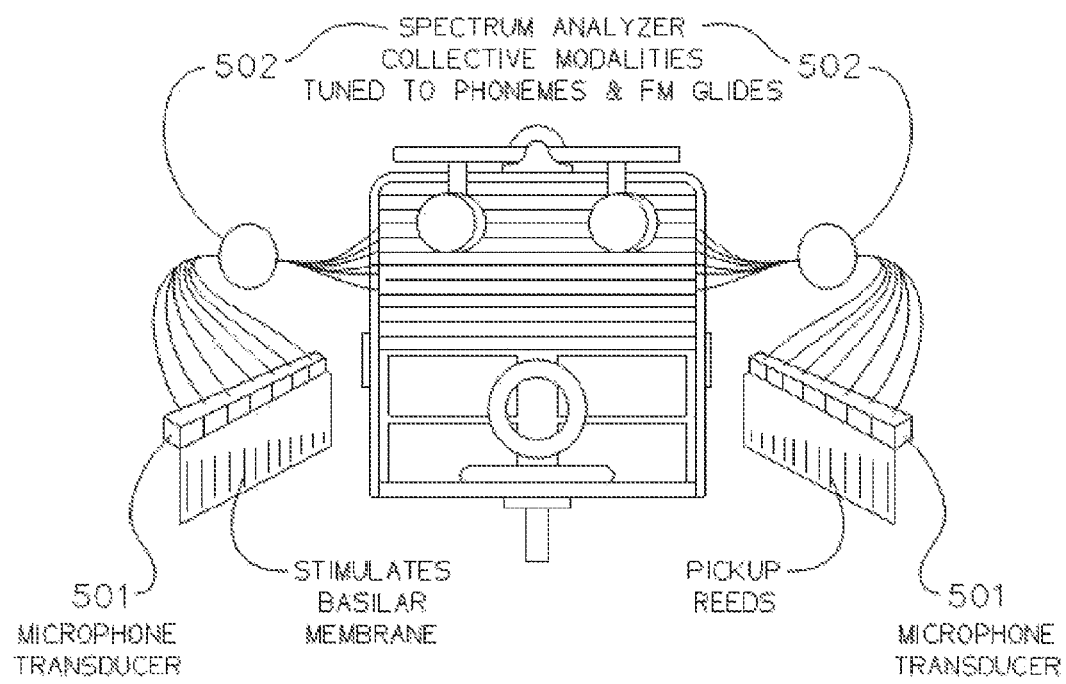
FIG. 5 conceptually illustrates the auditory RRC Recording Monitor, shown as subsystem 133 in FIG. 1.

The auditory input microphones are shown as subsystems 501 in FIG. 5. The auditory input apparatus of the auditory RRC-recording monitor consists of two linear pick up microphones, sensitive to the frequency range of 10 to 16,000 cps, and a digital spectrum analyzer that is tuned to verbal and non-verbal collective modalities.

The linear pick up microphones and spectrum analyzers are placed on the right and left side of the electronic enclosure of the RRC. The pick up microphones convert the incoming sound into an electronic signal characterized by an amplitude, frequency, time (a-f-t) diagram showing the amplitude and frequency of the incoming sound as a function of time. The spectrum analyzer is a pre-processing tool used to help identify the phonetic content that may be present in the incoming sound. Generally the spectrum analyzer searches for the time rates of change, amplitude and frequency modulations in the a-f-t diagram (AM and FM sweeps or glides).

An alternative embodiment of the linear pick up microphones is described in this section in order to clarify the operation of the spectrum analyzer in the next section. In the alternative embodiment, shown in FIG. 6, the auditory input system is organized tonotopically such that the frequency of a stimulating sound is mapped onto a location along a basilar membrane. The active elements located on the basilar membrane are approximately 16,000 stiff, elastic, reed-like fibers that are fixed at their basilar ends and free to vibrate (like the reeds of an harmonica) at the other end. The length of the fibers increase and the stiffness decreases progressively as one goes from the base to the apex. Thus high frequency resonance of the basilar membrane occurs near the base and low frequency resonance occurs near the apex of the basilar membrane. The vibrations of the reed like basilar structure activate microphone-transducers that convert the mechanical vibrations into an electrical signal with a frequency determined by the mechanical frequency of vibration of the fiber.

Figure 6:
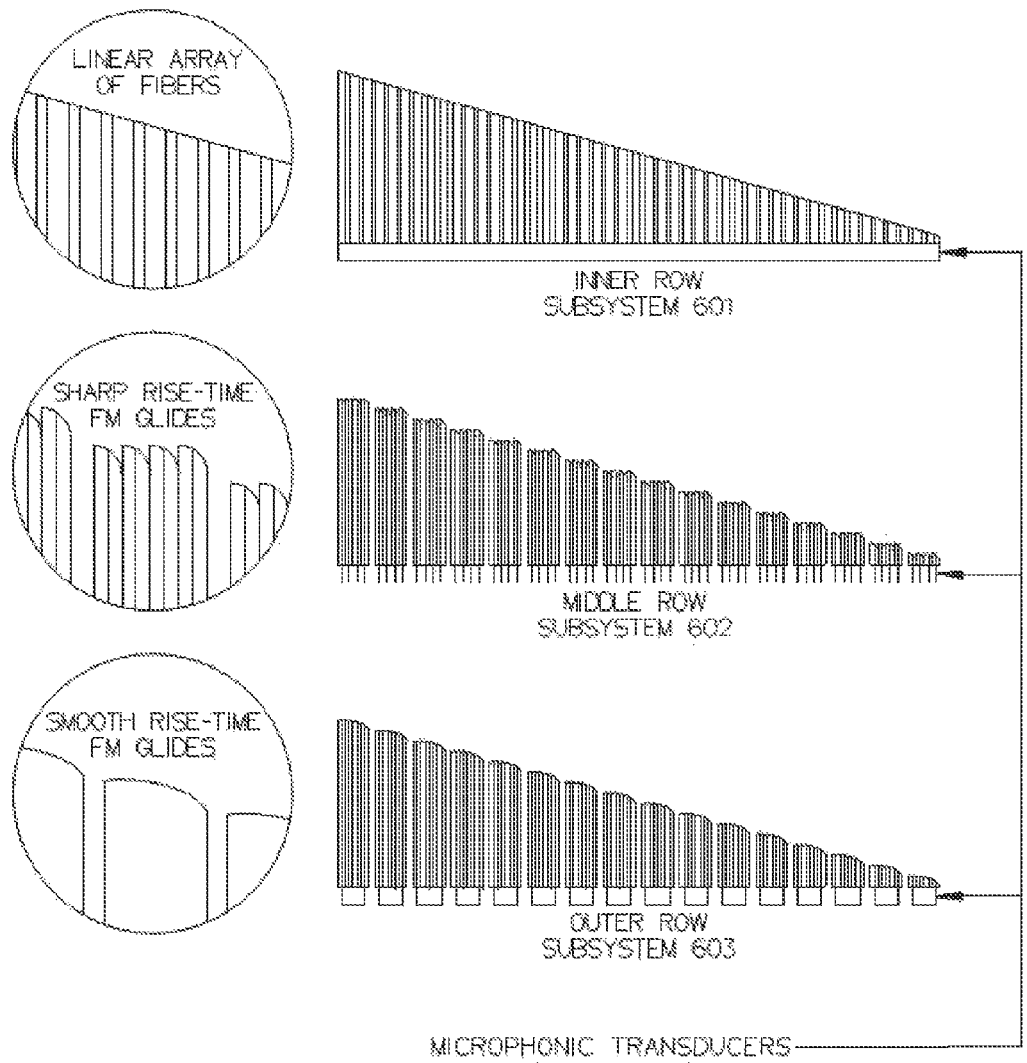
FIG. 6 conceptually illustrate the spectral decomposition of the auditory input signal in the frequency range of 0-20,000 cps, and in which the input auditory signal is decomposed into collective modalities that are tuned to the verbal and non-verbal elements of the input signal, as in subsystem 502 in FIG. 5.

Determination of Sound Frequency:

Every fiber shown in FIG. 6, located on the basilar membrane has a frequency associated with it. Different frequencies may be determined by the position of the fiber along the basilar membrane (the "place" principle).

Note: The biological hearing system utilizes the "place" principle for determination of the (tuned) best frequency (Guyton, A. C. (1991), Textbook of Medical Physiology p. 575). The biological auditory system is organized tonotopically such that the frequency of a stimulating sound is mapped onto a location along a basilar membrane within the cochlea and thence to the mechanoreceptor hair cells. The "place" principle is consistent with a collective modality of sound receptors and may be the basis for the definition of frequency pattern modalities defined in a frequency-time f-t space within the brain.

In this disclosure, the definition of sound modalities follows the definitions of the biological hearing system. Since the fibers operate as sound receptors for the RRC-robot, the sound perceived by a vibrating fiber is called the modality of that fiber-receptor. The sound perceived by a set of fiber-receptors vibrating simultaneously is called the collective modality of the group of fibers.

Determination of Loudness:

Loudness is determined by the auditory system in at least 3 ways. In a first way, as the sound becomes louder, the amplitude of vibration of the basilar membranes and hair cells also increases. In a second way, high amplitudes of vibration cause spatial summation of impulses (on the fringes). In a third way, certain hair cells may have a higher sound level activation threshold.

Step 2—the Verbal-Phoneme Sound Generators

The verbal-phoneme sound generator of the auditory RRC (shown in FIG. 1 as subsystem 143) consists of a sound generating speaker system that emits an array of distinct and separate sound types wherein each sound type is called a phoneme. The control signal that activates the verbal-phoneme sound generator is called a p-phoneme control signal and is part of the array of p-control signals emitted by the Sequence Stepper Modules of the RRC. Each p-phoneme control signal generates one of the 120 phoneme sounds listed in Table 2. When a p-phoneme control signal is applied to the verbal-phoneme sound generator, the speaker system is activated to generate the distinct phoneme sound associated with the p-phoneme control signal. This distinct phoneme sound, when it is picked up by the auditory input microphones of the RRC is called a q-phoneme sound.

The p-field sound generating capability of the verbal-phoneme sound generator is limited to the number of distinct and separate phoneme-sounds that humans can make. Generally, humans may generate almost 100 distinct and separate phoneme-sound types. There are 91 phonemes (63 consonants and 28 vowels) in the International Phonetic Alphabet, whereas the sounds of the English language require only 44 phonemes. In the preferred embodiment RRC the q-phoneme field has been selected to consist of 120 individual and combinations of English language phoneme sounds. Table 2 presents the q-phoneme field of the auditory RRC and lists the individual phonemes and phoneme combinations selected for the preferred embodiment. The p-phoneme field is also limited to the 120 distinct and separate control signals, wherein each control signal applied to the auditory verbal-phoneme sound generator causes the verbal-phoneme sound generator to emit one of the 120 phoneme sounds listed in Table 2.

The verbal-phoneme sound generator is designed with the voice of the trainer-supervisor, by recording each of the phoneme sounds spoken by the trainer-supervisor, and taken from the set of individual phoneme sounds listed in Table 2. Each phoneme sound type recorded into the verbal-phoneme sound generator has a distinct p-phoneme control signal associated with it. The p-phoneme is the control signal that, when applied to the verbal-phoneme sound generator, will generate, via a speaker system, the distinct q-phoneme sound associated with the p-phoneme control signal. A sequence of p-phoneme signals may be used to generate a sequence of phoneme sounds, representing a word, whereas a larger sequence of (words) phoneme sounds may represent a verbal sentence.

The selected phoneme combinations and the total number of phoneme-types that make up Table 2 may be optimized so that every sequence of phonemes generated by the verbal-phoneme sound generator is a high fidelity representation of the words or sentences ordinarily spoken by humans. Each sequence of p-vectors includes control functions such as loudness, sequential word-speaking rates and intonations such as questioning, declarative, commanding, etc. It is important to note a) that each distinct q-phoneme recorded into the verbal-phoneme sound generator has a p-phoneme signal associated with it, b) that each sequence of p-phoneme control signals are trained to represent the words and sentences spoken by the human trainer-supervisor who recorded the individual distinctive phoneme into the verbal-phoneme sound generator, c) that the initial recognition training and error correction is performed by using the q-field output of the verbal-phoneme sound generator as an input to the linear microphones of the auditory RRC-recording monitor, and d) that the collective modalities designed into the RRC recording monitor are tuned to the q-phoneme sounds generated by the trainer-supervisor. Note that training-programming the auditory verbal-phoneme sound generator is analogous to learning to play the piano, wherein each key of the piano is equivalent to a p-direction control signal. Instead of controlling the pitch (frequency associated with a piano-key), the auditory RRC learns the sequential variable processing periods between p-vectors so as to solve the co-articulation problem, and thereby generate an understandable set of words and sentences.

TABLE 2

English phonemes and phoneme-combinations utilized in some embodiments
120-English phonemes and phoneme combination

| | |
|---|---|
| 1-5 | a e i o u |
| 6-11 | ba be bi bo bu b(short) |
| 12-17 | sa se si so su s(short) |
| 18-24 | ka ke ki ko ku kay k(short) |
| 25-30 | da de di do du d(short) |
| 31-36 | fa fe fi fo fu ef |
| 37-42 | ga ge gi go gu g(short) |

TABLE 2-continued

English phonemes and phoneme-combinations utilized in some embodiments
120-English phonemes and phoneme combination

| | |
|---|---|
| 43-48 | ja je ji jo ju jay |
| 49-53 | ha he hi ho hu |
| 54-59 | la le li lo lu el |
| 60-65 | ma me mi mo mu em |
| 66-71 | na ne ni no nu an |
| 72-76 | pa pe pi po pu |
| 77-81 | qa qe qi qo qu |
| 82-86 | ra re ri ro ru |
| 87-92 | ta te ti to tu t(short) |
| 93-97 | va ve vi vo vu |
| 98-102 | wa we wi wo wu |
| 103-106 | xa xe xi xo xu |
| 107-111 | ya ye yi yo yu |
| 112-116 | za ze zi zo zu |
| 117-120 | ss ff oo ee |
| - Table 2 - | |

Section C—the Auditory Interface Circuit Stage
(Steps 3, 4, 5, 6)

Step 3. The Spectrum Analyzer and Decomposition into Collective Modalities

The spectrum analyzer searches the incoming signal for specific amplitude and frequency modulations that are characteristic of verbal speech. Such amplitude and frequency modulations are described as AM or FM glides. The rise times of a small collection of frequencies that form an AM or FM glide gives rise to alternative collective modalities of the groups of fibers (depending on the FM-time characteristics of the group). And the spectrum analyzer is programmed to search the incoming signal for collective modalities that are characteristic of words, consonants or vowels present in the incoming signal.

The collective modalities that are tuned to the verbal-phoneme input are applied to the input of an RRC-controller equipped with a control-signal-operated verbal-phoneme sound generator. The RRC is trained to perform real time verbal-word and sentence pattern recognition, identification and comprehension. It generates phoneme-words-sentences in response to the decomposed input sound signals.

In the alternative embodiment the function of the spectrum analyzer is performed by the tonotopiclly organized basilar membranes. The decomposition of basilar membranes into collective modalities is shown in FIG. 6. Three basilar membrane rows are designed into the right and left side pick up microphones, a total of 6-basilar membranes. Each set of basilar rows consists of an inner row (subsystem 601 in FIG. 6), a middle row (subsystem 602 in FIG. 6), and an outer row (subsystem 603 in FIG. 6). Each basilar row is made up of the approximately 16,000 stiff elastic reed-like fibers and a set of microphone transducers located on the opposite side of the basilar membrane that pick up and convert the mechanical vibrations into electrical vibrations.

The Uniform Collective Modality:
The fiber bundles of the inner row (subsystem 601 in FIG. 6), illustrate that the length of the fibers increase linearly (and the stiffness decreases progressively) as one goes from the base to the apex of the basilar membrane. The frequency resonances of the linear basilar membrane and the microphone transducers distributed along the basilar membrane also increases linearly as one goes from base to apex.

The modality of a single vibrating reed-fiber is a sound sensation of a pure tone representing the pitch or tuned frequency of vibration of the reed fiber. The collective modalities of all the reeds vibrating simultaneously are a high fidelity representation of the combined sound, the timbre of the sound generated by the collection of vibrating reeds. For example, the collective modality associated with an orchestral rendition is the combined musical output. The so-called 'tone' or 'color' of all the instruments in the orchestra. The two notable features of the collective modalities of orchestral sounds are a) since perception does not imply recognition it is likely that animals, auditory robots and humans detect the orchestral rendition as a high fidelity sound stream that distinguishes the pitch, timbre, and loudness of the sound, limited only by the frequency response and sensitivity of the auditory sensors, and b) The spectral volume of the sound may be described in terms of the sub-modality of additive (coincident) spectral bands (each band defined by a microphone), similar to the addition of visual color receptors. Just as the experience of the sum or difference of two visual color filters, such as a red filter combined with a green filter to yield a red, green color hue modality, so the sum of two or more orchestral spectral bands may yield a "rich spectral volume," called the timbre of the sound, that represents the modality of the sum of the spectral bands generated by the various instruments of the orchestra. Thus the array of microphones may form a sound collective modality similar to the visual collective modalities described in the visual RRC-recording monitor disclosure. The basic difference between the collective sound modality and the visual modality is in the amount of location and time-sequence data generated by the pattern. The visual data yields precise location data in a three-dimensional nodal mapping of the 3-D Euclidian space, whereas the sound modality operates in a function space free of location-spatial data. And whereas the collective visual data may be streaming-videos or stationary in time, the collective sound modalities are always sequential and streaming.

Non-Uniform Collective Modalities:

Non-uniform collective modalities are groupings of hair-like fibers that are tuned selectively to some distinctive features of the spectrographic (a-f-t) frequency pattern. Among the distinctive features are segments of frequency changing in time (FM sweeps or glides) or band-pass noise bursts with specific center frequency and bandwidth. Examples of non-uniform collective modalities are shown in FIG. 6 (subsystem 502 and 503). The middle and outer rows of basilar membranes shown in the Figure consist of v-shaped palisade of fibers. Each of the v-shaped palisades has a unique FM-glide or sweep rise time associated with it and a microphone-transducer sensitive to that rise time. The microphone-transducer will generate an electrical output if, and only if, the FM-glide rise-time matches the rise-time of the reed-fibers in the v-shaped palisade. The v-shaped palisades shown in FIG. 6 (subsystem 602 and 603) are designed to be tuned to distinctive FM-glides, sweeps or specific band-pass noise bursts that are present in human verbal speech.

Collective modalities for auditory perception generate sound segregation that allows the RRC-robot to detect low amplitude (whispers) and distinctive f-t-features of different phoneme sounds in a high background noise environment. The RRC-robot may also discriminate between very small differences in frequencies and intensity levels. The non-uniform collective modality may give the robot the capability to distinguish spectral patterns regardless of the region of the spectral band in which they occur. Thus the same phoneme sound patterns may be identified regardless of whether they are generated by a high pitch female voice or a low pitch male voice. In addition the auditory RRC-recording monitor is designed to perform spectro-temporal and spatial-location analysis on the signals received by the dual microphone transducers shown in FIG. 5.

Step 4. The q-Magnitude and p-Direction of a p-Phoneme Vector

Each set of q-phoneme and p-phoneme signals may be characterized by a p-vector wherein the q-phoneme signal is the magnitude of the p-vector and the p-phoneme control signal is the direction of the p-vector. The magnitude of each p-vector is the q-phoneme signal that is characterized by a spectrogram that shows the electronic amplitude and frequency of the q-phoneme sound wave in an amplitude-frequency-time (a-f-t) function space-domain. The p-phoneme, q-phoneme characterization and the multi-dimensional function space domain were claimed in the patented RRC disclosure (U.S. Pat. No. 6,560,512, dated May 6, 2003). Each (a-f-t)-characterization of a phoneme-sound is identified with, and related to a p-phoneme control signal that represents a pointing direction in a multi-dimensional p-vector space. Note that the p-phoneme directional vector when applied to the verbal-phoneme sound generator, via a speaker system, generates the q-phoneme sound associated with the p-phoneme directional vector. FIG. 7 shows a sample a-f-t spectrogram of two short bursts of sound. Each burst of sound represents the 3-phoneme sequence, a-wo-ff, which is received by the array of microphone transducers. The amplitude, frequency, and time of the bursts represent the magnitude of the p-vectors and are shown as a function of time in the upper portion of the FIG. 7. The associated p-phoneme vector directions, shown in the lower part of the FIG. 7, represents a sequence of control signals that when applied to the verbal-phoneme sound generator, generates the sound bursts defined by the (a-f-t)-spectrogram.

Step 5. The Multi-Dimensional Auditory Nodal Map Module

The auditory Nodal Map Module (NMM), shown as subsystem 115 in FIG. 1, is a multidimensional p-q function space wherein the q represents the spectrographic characteristics of the phoneme sound and the p is a control signal that activates one of the 120 phoneme sounds generated by the verbal-phoneme sound generator. In contrast to the displacement Nodal Map Modules (NMM), wherein the q-visual and q-tactile signals are totally independent of the control signal-p, in the auditory-NMM the q-signal is tightly attached to the p-phoneme control signal. The magnitude of each p-phoneme vector is the q-phoneme signal itself. That is, the magnitude of the p-phoneme vector is the spectrographic characteristic (the a-f-t function) of the phoneme sound, and the direction of each p-phoneme vector is one of 120 directions to an adjacent node in a multi-dimensional function space. Also, whereas in the displacement Nodal Map Module, the p-vectors represent a physical displacement to an adjacent node in 3D Euclidean space, in the auditory Nodal Map Module, the p-vector represents a displacement to an adjacent node in a multi-dimensional function space. Since the p-vector represents one of 120 different directions (to an adjacent node), a 5-dimensional function space is required to accommodate the 120 directions to adjacent nodes. Note that in order to relate the multi-dimensional nodal map vectors to the self-knowledge self location and identification coordinate frame, the 120 p-phoneme directions of the multi-dimensional space are activated by a selected set of 120 nodes in the 3D-self location and identification coordinate frame. And the control of the verbal-phoneme sound generator is analogous to controlling the vocal chords as one learns to play the piano with 120 fingers (See Step 2 describing the verbal-phoneme sound generator).

In general, if a larger number of phonemes, say N-phonemes are selected for Table 2, the dimensionality of the auditory Nodal Map Module must be sufficiently high so that at least N different adjacent nodes surround the initial position of p, and each transition to an adjacent node represents one of the N different phoneme sounds generated by the verbal-phoneme sound generator. The functional significance of the auditory Nodal Map Module is selected so that each p-transition between nodes has a unique q-phoneme associated with it, and each q-phoneme has a correlated p-phoneme direction associated with it. Thus a "heard" sequence of q-phonemes generating a word or sequence of words may be converted by the auditory RRC into a sequence of p-vector directions, where the direction of each p vector is determined by its q-magnitude, the amplitude, frequency and time characteristics of the q-signal. It is this close relationship between sequences of a-f-t patterns and the sequence of p-phonemes that describe them, that may allows the sequence of a-f-t patterns to be perceived as a sequence of p-vector directions in a 5-dimensional Nodal Map Module space. This total navigational path within the multi-dimensional Nodal Map Module space may also be perceived as a TIT (Task Initiating Trigger) that initiates either a simple verbal repetition task or any other task designed into the HTD.

For example, the magnitudes and directions of a sequence of auditory p-vectors representing the sequence of phonemes of the word "listen' is illustrated in FIG. 8. In FIG. 8, the q-sequence of phoneme-sounds is shown on the a-f-t diagram located above the p-phoneme directional vectors. The a-f-t diagram represents the magnitudes of a sequence of p-vector, whereas the various pointing directions of the p-vectors are control signal that may be applied to the verbal-phoneme sound generator. Each p-phoneme vector shown on the bottom of FIG. 7, is a control signal that controls one of the distinct sounds generated by the sound generating speaker system. The navigational path of the sequence of p-phonemes for the word listen is illustrated at the bottom of FIG. 8. FIG. 9 illustrates the navigational path of five p-phonemes directional vectors through a 5-dimensional phoneme space that accommodates the 120-phoneme sounds listed in Table 2. This figure is similar to the multi-dimensional p-phoneme vector transitions shown in FIG. 4 of U.S. Pat. No. 6,560,512 dated May 6, 2003. FIG. 9 illustrates that at each nodal location there are 120 distinct and separate directions to adjacent nodes and that each direction represents one of the phoneme sounds listed in Table 2. The sequence of p-signals, shown as a navigational path through the 5-dimensional function space, may be used to generate any multi-phoneme word when the p-signals are applied to the verbal-phoneme sound generator.

The mathematical formulation of the auditory Nodal Map Module is a multi-dimensional vector function space where the magnitude of each vector is given by the spectrographic (a-f-t)-function and the identification of the phoneme sound is determined by its direction. The robotic p-phoneme directional vectors are control signals that are analogous to the motor control of the human sound generating mechanism. The human muscle-motor control signals contort the facial muscles, the mouth-lip-tongue-vocal chord, and airflow of the human sound generator in order to generate the q-phoneme sound associated with the human-facial contortions. The 120 nodes in the self location and identification coordinate frame, referred to above, activate and are analogous to the human-muscle motor control signals.

If the auditory Task Selector Module (TSM) of an RRC-controller is trained to repeat the sound heard by the RRC-robot, the q-phoneme (a-f-t) of the heard sound is identified as a repeat-TIT and applied to the Nodal Map Module as a sequence of p-q nodal positions. The repeat-TIT activates the Sequence Stepper Module to generate a sequence of control p-directional signals. In the repeat-TIT mode the navigational path in the Sequence Stepper Module is the same as the one detected by the Nodal Map Module. The output of the Sequence Stepper Module is a sequence of p-directional signals that control the verbal-phoneme sound generator to generate the appropriate q-phoneme (a-f-t) sound associated with each p-directional signal. The p-directional signals and the q-phonemes are related to the self-knowledge module by utilizing the selected nodes of the 3-D self location and identification coordinate frame to generate the p-directional vectors in the auditory multi-dimensional function space.

TABLE 3

Training-Programming of the TSMs of the Declarative Memory System: Application of the Search Engine Access Rule.

T-100

Training-programming TSMs of Declarative Memory System:
Application of the Search Engine Access Rule
T-200

A. Babbling Sequence Stepper Training
Training to repeat, read and write
201. repeat the heard word
202. read the written word
a) read the printed word
b) read-spell the printed words
203. write (type) the printed words
204. dictation training: voice activated typewriting.
T-300

B. Comprehension Training
All objects located in the visual space
301. verbal comprehension of all spoken word
302. verbal comprehension of all procedural tasks
303. verbal commands that activate displacement tasks
304. training to generate and respond to "how-to" training TIT's
305. training to read a book with comprehension
306. comprehension of numbers and mathematical computation.
T-400

C. Conversational Training:
Robot-human and robot-robot Conversation
401. robot-human conversation task
402. response to in-passing friendly confrontation
403. response to emergency and in-passing confrontational interactions Note that Step 6a, the speech processing training step, shown in Table 1, is part of the interface circuit stage. It presents a new and unique speech processing methodology that has never before been applied to a system. The speech processing methodology is part of the training-programming methodology for the TSMs of the declarative memory system, as described in Table 3. The Step 6a is divided into 2 parts. The first part presents explanatory notes and terminology associated with the discipline of speech processing. The second part describes, in Table 4: Subtask A-1, the training methodology of the RRC for the repetition and babbling of phoneme-sounds spoken by the trainer-supervisor (sub-task T-201 in Table 3).

Explanatory Notes and Terminology:

Speech processing (without robotic comprehension) of the vocal or written words and sentences presented to the robot, is presented in this section. In Step 6a, the auditory RRC is trained to repeat the words spoken by the trainer. In the following section, Step 6b, it is trained to verbally read the words written and presented to the visual system of the RRC, and to write-type words either spoken by the trainer or written words presented to the visual system of the RRC.

Step 6a-Subtask A-1. Training to Repeat Phoneme-Sound Based Words and Sentences: A New Methodology of Speech Processing Repetition and Babbling in the Sub-Task A-1 TSM (Sub-Task T-201 in Table 3):

The first step for training the auditory RRC is to program the "babbling" Sequence Stepper Module and an associated TSM to accurately and quickly repeat the sound of words, strings of words, or sentences heard by the robot. The trained repetition and babbling TSM (the sub-task A-1 TSM) activates the total vocabulary of the robot. Any and all words or sentences spoken by the robot and activated by other prime task TSMs must access the sub-task A-1 TSM and form a compound TSM that does not necessarily repeat the sound but accurately enunciates other words and sentences (taken from the sub-task A-1 TSM) and associated with the compound TSM. Many of the design activities of the auditory RRC are aimed at achieving enunciation accuracy in the repetition and babbling sub-task A-1 TSM. In order to achieve repetition accuracy it is necessary to refine the design of the verbal-phoneme sound generator, expand the number of phoneme sounds listed in Table 2, and refine the tuning of the spectrum analyzer to the actual collective modalities present in the English language verbal input signal.

RRC-Processing of "Repeat this Sound:

Table 2 lists the 120 phonemes sounds that are the constituents of all words and sentences generated by the verbal-phoneme sound generator. Initially the robot may be programmed to repeat the combinations of p-phonemes included in the 120 English language p-phoneme list and the phoneme sounds listed at the bottom of the HTD shown in FIG. 2-3. This process is repeated for all phonemes and all words made up of a sequence of 2 to 7 phonemes listed in a 50,000 word-clause lexicon and commonly used combinations of words, clauses and sentences selected by the trainer-supervisor.

Each set of sound phonemes is picked up by the array of pick up microphones associated with the sound search engine and transmitted to the auditory-pattern recognition circuit. The pattern recognition circuit of the prime task A TSM is programmed to recognize as a TIT any sequence of q-phonemes that are preceded by the trainer-supervisor-command 'repeat this sound.' The sound TIT is applied to the Nodal Map Module, which activates the Sequence Stepper Module (SSM) to generate the sequence of p-phoneme directional signals. The sequence of p-directional signals are applied to the verbal-phoneme sound generator that regenerates the (a-f-t) sound sequence applied to the Nodal Map Module. The difference between the sound generated by the trainer-supervisor, and the sound generated by verbal-phoneme sound generator may be used initially as an error signal that corrects the sequential p-directional signals generated by the Sequence Stepper Module. For example, training the Sequence Stepper Module to repeat accurately the sequence of p-phoneme control signals (as in the word a-pp-le shown in FIG. 9) may be achieved by successive error correction and refinements of the "self"-generated sound until it is identical to the external "heard" sound. In each case the heard sound must be a TIT that initiates the motor controlled repetition. When the heard q-sequence is a TIT (as when preceded by the command "repeat this sound"), then the Sequence Stepper Module must generate a pre-planned sequence of p-phoneme control signals (a babbling sequence of p-phonemes that are identical to the initiating TIT).

After the system has been trained to accurately repeat the words of the trainer supervisor, the second stage of training begins. In this stage the system is trained to recognize words and sentences spoken by a large variety of persons, and the co-articulated and colloquial variations commonly used in English speaking countries. In this stage, the system does not repeat the heard word, but utilizes the data obtained during the initial phase to accurately represent the heard colloquialism with words and sentences learned during the initial stage of the training.

"Unpacking" the Highly Encoded, Context Dependent Speech Signals:

The problem of converting the perceived acoustic spectrographic properties of language into an identifiable phonetic structure is an ill posed problem, similar to the inverse optics problem (Marr, D (1962), "Vision," Freeman Press). There is not a simple one to one mapping between the acoustic properties of speech and the phonetic structure of an utterance. The acoustic problem is generally stated as the problem of mapping the phonetic levels into acoustic levels. Co-articulation (the segmentation problem) is generally identified as the major source of the problem. Co-articulation gives rise to difficulty in dividing the acoustic signal into discrete "chunks" that correspond to individual phonetic segments and a lack of invariance in the acoustic signal associated with any given phonetic segment. The lack of invariance means that the precise form-pattern of an acoustic spectrogram changes with a given phonetic context as a function of the co-articulation. The standard methodologies of speech processing for mapping the acoustic properties of speech into the phonetic structure of an utterance include lexical segmentation processing (co-articulation), word recognition processing, interactive-activation processing, context effect processing, syntactic effects on lexical access processing, lexical information and sentence processing, syntactic processing and intonation-structure processing.

The RRC Methodology for Solving the Inverse Auditory Problem:

Because of the complexity in the mapping between the acoustic signal and phonetic structure, the auditory RRC must have some means of "unpacking" the highly encoded, context dependent speech signals. "Unpacking" is performed by training the RRC to repeat and "remember" (recognize TITs in the pattern recognition circuits) the "heard" words and sentences of multiple speakers as described above. Further "unpacking" is performed by associating and calibrating the heard verbal speech with the corresponding visual and tactile data obtained in the visual and tactile coordinate frames in which the robot is operating, and developing a sensitivity to such factors as acoustic phonetic context, speaker's "body language," speaking rates, loudness and "emotion laden" intonations. The auditory-visual RRC takes into account the acoustic consequences of such variations when mapping the acoustic signal into the phonetic structure. The problems of speaker's "body language," "emotion laden" intonations, acoustic phonetic context, speaking rates, and loudness is solved by the auditory RRC by coordinating the search engines of the visual and tactile systems with the search engine of the auditory RRC. The visual and tactile search engines are presented in FIG. 4, the Hierarchical Task Diagram (HTD) of the visual-tactile RRC that has been copied from a figure presented in U.S. Pat. No. 6,560,512, issued May 6, 2003. FIG. 2-3 adds an additional search engine, the auditory search engine, to the three search engines shown in FIG. 4. The visual search engine may add visual cues for unpacking the acoustic phonetic context associated with "body language," facial expression, and observed lip movement. The auditory search engine is designed with collective modalities that are tuned to the self-generated distinctive feature in the a-f-t diagram, and operating in conjunction with the other search engines, may distinguish the acoustic phonetic context, speaking rate, loudness, and "emotion laden" intonations present in the input signal. Table 4 presents the training methodology for the RRC-repetition and babbling of phoneme-sounds spoken by the trainer-supervisor (sub-task T-201 in Table 3).

The trained prime task A-TSM is a memory module that stores all the TITs that identify and properly enunciate all the words listed in the lexicon and the commonly used combinations of words, clauses and sentences selected by the trainer-supervisor. All subsequent verbally generated tasks must access the TITs stored in the prime task-A TSM in order to associate those words and phrases with other TIT generated by the visual system, the tactile system, the olfactory system, the gustatory system, or other word TITs received by the auditory system.

At this point the controller has performed all the speech processing that allows it to recognize and repeat, but not comprehend, all the phoneme constituents of words, sentences and clauses listed in the lexicon. The auditory RRC-monitor has thereby mapped the acoustic signal onto a linguistic representation that is amenable to declarative comprehension described in Section D. (See prime tasks B and C shown in FIG. 2-3).

TABLE 4

Training Methodology for Repetition and Babbling: The auditory RRC is trained to repeat, via the verbal-phoneme sound generator, the words and sentences spoken by the trainer-supervisor, as follows:
The high priority TIT that shifts the robot to Sub-Task A-1 is a simultaneous visual recognition image of the trainer, and the command "repeat this sound" spoken by the trainer.
All the words and sentences repeated by the robot are taken from a 50,000 word lexicon that represents the total vocabulary of the robot.
The lexicon or vocabulary of the robotic controller consists of the set of words and sentences that the sub-task A-1 TSM has been trained to repeat.
The trained sub-task A-1 TSM is a memory system that properly enunciates all the words and sentences listed in the lexicon.
Optimization of the sub-task A-1 TSM to properly enunciate all the words and sentences listed in the lexicon entails a) refining the design of the phoneme sound generator to assure that the lexical segmentation and timing intervals between successive phonemes are optimized. b) expanding the number of phoneme sounds listed in Table 1 to optimize co-articulation problems. And c) refining the tuning of the spectrum analyzer (illustrated in FIG. 5) to the actual collective modalities present in the English language verbal input signal.
The sub-task A-1 TSM memory system is always accessed by other TSMs in order to form compound TITs whenever verbal sounds other than the "repeat this sound" TIT are to be generated by the robot.
Queries that access the sub-task A-1 TSM generally relate to the verbal enunciation of the words and phrases stored in the A-1 TSM. Therefore in anticipation of such questions acceptable and not acceptable grammatical structural forms of verbal enunciation should be programmed into the search engine for each word or phrase in the lexicon and the specific answer to each anticipated query must be programmed into a compound TSM.
An example of a compound TIT is the command "identify this visual image."
The compound TIT may consist of the visual image-TIT presented to the robot, and the sub-task A-1 TSM-TIT "repeat this sound." In this compound TIT, described in the training of the sub-task B-1 TSM, the robot is conditioned to relate the image of an object with the verbal word taken from the A-1 TSM that describes the object.

Section D—The RRC Processing Stage; Training the system to Respond to the Auditory Signals (Steps 7 and 8)

Explanatory Notes and Terminology:
The following sections describe the training-programming terminology and processes associated with comprehension training of the RRC-Humanoid robot. The basic operation of the RRC was described in Section A.

The Query Search Engine Access Rule for Training the Declarative TSMs:

The declarative memory system of the RRC-robot is made up of an array of TSMs with each TSM storing a large number of words phrases and sentences that represent the total vocabulary of the robot. In order to respond verbally with appropriate words and sentences the RRC must analyze the verbal input data present in any query, search through the memory TSMs, find the set of TSMs that have parts of the answer stored in them, form a compound TSM that has the total explicit word-answer stored in it, and activate the appropriate word answer that is stored in that compound TSM. The following programming rules have been devised in order to facilitate the search for an appropriate response to any auditory-query input signal: a) Search the input signal to determine which TSMs are likely repositories of the appropriate verbal response b) Form a compound set of TSMs wherein the response may be stored, and c) Utilize the data present in the auditory input signal and in the compound set of TSMs to □home in on an appropriate response.

For example, the search of the Robot for an answer to a verbal query by the trainer-supervisor to "identify this visual image" (a visual image presented to the Robot) leads to an identification of two TSMs and the formation of a compound TSM. The two identified TSMs are most likely the TSM containing the visual image pattern-TIT presented to the robot, and the TSM containing the repeat this sound—verbal word or phrase that describes the presented visual image—TIT taken from the sub-task A-1 TSM that stores all the nouns, adjectives, verbs and adverbs taken from the 50,000 word lexicon. The formation of the compound TSM includes the phrase 'I see an . . . ', wherein the training should select that word or phrase that describes the presented visual image. The word selected by the trainer is repeatedly related to the image until the compound TSM is conditioned to respond 'I see a (insert word selected by the trainer)' without the prompt from the trainer to 'repeat this sound-(word selected by trainer)-.'

Note that without the access rule the compound TSM does not contain sufficient data to narrow the search to the particular words or phrases that describe the visual image. The access rule facilitates the process of narrowing down the search by noting that the sub-task A-1 TSM may be accessed by means of a 'repeat this sound' command. Thus the compound TSM may be programmed to combine a 'repeat this sound- verbal descriptor of the visual image-' TIT with the particular visual image TIT, and generate the answer TIT of 'I see a -verbal descriptor of the visual image-.'

Note that if the compound TSM is made up of more than 3-TSMs as the likely repositories of a response, the response of the robot should be a verbal request for more information. If on the other hand, there is no trained TSM wherein the response is stored, the response of the robot is 'I don't know' or 'I've not been programmed to respond to that question.'

The search engine access rule is always taken into consideration in the programming of the various TSMs by assuring that any query presented to the robot contains pointers to other TSMs or compound TSMs that contain a response to the query. Verbal interactions are greatly improved when the person interacting with the robot is familiar with the TSMs and compound TSMs that comprise the declarative memory system of the robot.

Accessing the Verbal Data Stored in the Trained Declarative TSMs:

Verbal data stored in the array of TSMs that make up the declarative memory system is generally accessed either directly in response to a query TIT presented to the robot, or by use of the access rule forming a compound TSM that contains the proper response to the query. Each TSM is programmed to receive query-TITs that verbally abstract the information stored in the TSM. Direct queries that form TITs are generally applied to the TSM during the training phase. Queries that form TITs may also come from other TSMs to form a compound TSM that contains the proper response to the query.

A major constraint on the design of each TSM is that all possible queries associated with the data stored in the TSM must be anticipated whenever a verbal sentence is programmed into the TSM. For each of the possible queries one or more of the array of TSMs must have an appropriate and specific answer programmed into it.

The programming technique (and the manpower required) is similar to the programming of some of the word based search engines such as Google or Bing. Additional examples and methodologies for accessing the data stored in the array of declarative TSM are presented in the preface to Steps 6a to 8.3 that describe the declaratory verbal information programmed into each TSM and the anticipated queries that utilize the data stored in the TSM to form compound TSMs. The compound TSMs generally include TITs that activate the response to any given query.

Correcting Incorrect Grammatical Structures:

Grammatical rules are implicitly programmed into the system in the training phase when queries are anticipated in order to access data stored in the TSMs, and when compound TSMs are formed that contain a specific verbal response to the query. Incorrectly structured queries must include sufficient information to form compound TSMs. Such queries are trained to form compound TSMs that not only generate a specific response to the query, but are also trained to include within the response, recognition of the incorrect grammatical structure and correction of the incorrect grammatical structure.

Step 6b. Training to Repeat, Read, and Write Phoneme-Based Words and Sentences (Sub-Task A-2 to 5)

Step 6b, the speech recognition-training step shown in Table 1, is part of the general robotic training programming performed on the robot. The explanatory note, presented in the introductory part of Section D, the training-programming section, applies to Step 6b. Step 6b is divided into 4 subtasks (Subtask A-2 to A-5). The training methodology for each subtask is presented in the following tables:

Table 5A and 5B presents the training methodology for subtask A-2. It describes the training methodology to verbally-read and spell the written words and sentences. Verbal reading, Sub-subtask A-2a, is shown in Table 5A. Whereas verbal spelling, sub-subtask A-2b, is shown in Table 5B.

TABLE 5A

Training methodology (Subtasks A-2a) to verbally read written words and sentences(Subtask T-202 in Table 3).
Sub-subtask A-2a Verbal reading a) The high priority TIT that shifts the robot to sub-task A-2-1 is a simultaneous visual recognition image of the trainer, a visual image of the written word or sentence, and the command "read the words you see" spoken by the trainer.
b) The command-TIT to "read the words you see" is a compound-TIT that couples the "repeat this sound" command stored in the sub-task A-1 TSM with the visual image-TIT of the written letters that spell the spoken word.

TABLE 5A-continued

Training methodology (Subtasks A-2a) to verbally read written words and sentences(Subtask T-202 in Table 3).
Sub-subtask A-2a Verbal reading c) The programming technique used to generate compound TITs is a repetitive-associative (Pavlovian) technique that trains the RRC-robot to respond to the visual image of written letters, when the compound command "repeat this sound" is not given.
d) Queries that access sub-task A-2-1 generally relate to verbal reading of various types of material (articles, periodicals, books etc), the beginning and end for each reading, and the identification of the audience for which the reading is performed. All anticipated queries should be programmed into the search engine and specific answers programmed into compound TSMs.
e) The queries that access sub-task A-2-1 are limited by the lack of comprehension of the words read by the RRC. The full range of queries are included in sub-task B-5 TSM which involves robotic reading with comprehension.

TABLE 5B

Training methodology (Subtasks A-2b) to verbally spell written words and sentences(Subtask T-202 in Table 3).
Sub-subtask A-2b Verbal spelling a) The high priority TIT that shifts the robot to sub-task A-2-2 is a simultaneous visual recognition image of the trainer, a visual image of the letter-spelling of the written word taken from the 50,000 word lexicon, and the command "read-spell the words you see" spoken by the trainer.
b) The TIT to "read-spell the words you see" is a compound-TIT that associates and conditions the visual image of the written letters with "repeat this sound" command (sound of verbal spelling) stored in the sub-task A-1 TSM and the "read the words you see" command.
c) All the words and sentences read and spelled by the robot are taken from the 50,000 word lexicon that represents the total vocabulary of the robot.
d) The trained sub-task A-2-1 and A-2-2 TSMs are memory systems that properly enunciate and verbally spell all the written words and sentences listed in the lexicon.
e) Queries that access the sub-task A-2-2 TSM may be expanded to "how do you read-spell this word," and other lexical structures that express the same query. However, an expanded range of spelling queries are included in the prime task B-TSM that add comprehension to all the words present in the lexicon.
f) Queries that access the sub-task A-2-2 TSM may be expanded to hand written text by training the TSM to relate handwritten words with type-printed words.

Tables 6A, 6B and 6C present the training methodology for Subtasks A-3 to 5. Table 6A describes the training methodology to verbally spell a verbal word (Subtask A-3: Sub-task T-203 in Table 3 and sub-task A-3 in FIGS. 2-3). Table 6B describes the training methodology to typewrite the read text (Training the robot to reads and then type-write the read text) (Subtask A-4: Sub-task T-204 in Table 3, sub-task A-4 in FIGS. 2-3). Table 6C describes the training methodology to program the RRC-robot to take dictation; Voice activated typewriting (using the training mode time scale). (Subtask A-5 in FIGS. 2-3, and subtask T-205 in Table 3).

TABLE 6A

Training Methodology to Verbally Spell Words
Subtask A-3: Training methodology to verbally spell the words spoken by the trainer-supervisor (subtask T-203 in Table 3, Sub-task A-3 in FIGS. 2-3)

1. The high priority TIT that shifts the robot to sub-task A-3 is a simultaneous visual recognition image of the trainer-supervisor and the command"spell the following word-- specify word--"
2. The TIT"spell the following word-- specify word--" forms a compound TSM that associates two conditioning TITs: a) A visual image of the written word TIT and b) The"read-spell the word you see" TIT, with the conditioned "spell the following word" command.

TABLE 6A-continued

Training Methodology to Verbally Spell Words
Subtask A-3: Training methodology to verbally spell the words spoken by
the trainer-supervisor (subtask T-203 in Table 3, Sub-task A-3 in FIGS. 2-3)

3. The compound TSM generates a response that consists of a repetition of
the "word" specified in the "spell the following word ---" command followed
by the read-spelling sounds described in sub-task A-2-2.
4. After successive repetition the two conditioning TITs are slowly
removed from the presentation until the compound TSM responds without
the aid of the conditioning TITs.
5. All the words and sentences trained to be spelled by the robot are also
included in the 50,000 word lexicon that represents the total vocabulary
of the robot.
6. The trained sub-task A-3 TSM is a memory system that permits the
robot to properly spell all the words and sentences spoken by the
trainer-supervisor.

TABLE 6B

Training methodology (Subtasks A-4) to typewrite the read text.
Subtask A-4: Training methodology for teaching the robot to
type-write the read text (SubtaskA-4 in FIG. 2 and T-204 in Table 3)

1) The high priority TIT that shifts the robot to sub-task A-4 is a
simultaneous visual recognition image of the trainer, a visual image of the
written word or sentence and the command "write the viewed written word-
data" spoken by the trainer.
2) The TIT to "write the viewed written word-data" is a compound-TIT
that associates the "spell the following word" TIT, the "read-spell the words
you see" command, and the sub-task B-3 commands to perform a previously
trained displacement task (described in section 7.3 sub-task B-3: Verbal
descriptor commands that activate displacement tasks).
3) Note that the previously trained task, in this case, is a procedural finger-
typing training task (listed in the HTD shown in figure 3). The procedural
typing task converts the read-spell letters into the proper finger-keystrokes of
a typewriter keyboard.
4) All the words and sentences trained to be written-typed by the robot are
also included in the 50,000 word lexicon that represents the total vocabulary
of the robot.
5) The trained sub-task A-4 TSM is a memory system that permits the
robot to properly type and spell all the words and sentences read by
the robot.
6) Queries that access the sub-task A-3 TSM may be expanded to hand
written text by training the TSM to relate handwritten words with
type-printed words.

TABLE 6C

Training methodology (Subtasks A-5) to Verbally take dictation.
SubtaskA-5: Training the RRC-Robot to Take Dictation (Voice Activated
Typewriting) (sub-task T-205 in Table 3, and Sub-task A-5 in FIGS. 2-3).

1) The high priority TIT that shifts the robot to sub-task A-5 is a
simultaneous visual recognition image of the trainer and the command "type
the following dictated words" spoken by the trainer.
2) The TIT to "take dictation" is a compound-TIT that associates the
words spoken by the trainer-supervisor with a visual image of the written
words and sentences spoken by the trainer-supervisor, and the command to
type-write the read text. After successive conditioning the visual image is
removed, and the RRC generates the typewriting displacement task,
activated only by the words spoken by the person dictating.
3) Note that the procedural finger-typing training task must be performed
as described in section 7.3 sub-task B-3.
4) Dictation is initially limited to the total vocabulary of the robot (50,000
word lexicon). The vocabulary may be expanded to include professional
words spoken by a specialist.
5) The trained sub-task A-5 TSM is a memory system that permits the
robot to take dictation and properly spell-type all the words and sentences
spoken by the trainer.
6) Queries that access the sub-task A-5 TSM may be expanded to "take
dictation" and other lexical structures that express the same query.

Step 7. Comprehension of all Objects Located in the Coordinate-Space Around the Robot (Listed as Task T-300 in Table 3, and Prime-Task B in FIGS. 2-3)

Explanatory Notes and Terminology:

The following sections describe the training programming terminology and processes for training "comprehension" into an auditory humanoid RRC-system.

Robotic Comprehension:

Programming-learning to comprehend the meaning of a "heard" word: Robotic comprehension is the simultaneous identification and coupling each word or sentence heard, read, spoken or written by the robot, with the visual image, tactile data, olfactory data, gustatory data and lexical definition (taken from the 50,000 word lexicon) that is associated with each word or sentence.

In order to comprehend the meaning of a word or a sequence of word-TITs it is necessary to use a conditioning learning technique that associates and relates the sequence of words-TITs taken from the lexicon recorded in the prime task A-TSM with the visual TIT, tactile TITs, or other word-sequence TITs that relate to the sequence of words-TITs. For example, a visual image TIT may serve as a visual descriptor by associating or conditioning that image with a q-phoneme sequence TIT that is the "word definition" or "verbal descriptor" of the visually-seen image. Thus the visual image in combination with a word TITs may serve as a compound TSM that generates a TIT for the generation of one or more "words" that is descriptive of the image. And hearing the one or more words may serve to generate an "association" with the visual image, which is defined to be comprehension of the meaning of the one or more words.

In order to achieve a high level of verbal comprehension, the training process requires that the trainer-supervisor repeatedly display the sight, smell, feel-touch, verbal definition of the object, and possibly taste of the object that is to be comprehended. For high levels of comprehension of an object such as an apple, the search engine operates on pattern recognition circuits associated with the auditory, visual, tactile, olfactory and taste sensors. Thus in order to achieve a higher level of verbal comprehension, the programming associates the word apple with the visual image of the apple the verbal definition of an apple, the "feel" of the apple, the "smell" of the apple, or even the "taste" of the apple.

Verbal Descriptors of Sensory Data:

Verbal descriptors are words that describe visual sensory data, auditory sensory data, tactile sensory data, olfactory sensory data or gustatory (spectroscopic) sensory data. Visual sensory data is the prime identifier of the meaning of verbal words. Auditory, tactile, olfactory or gustatory data are generally secondary identifiers of the meaning of words, that when added to the prime visual data identifier, increases the level of comprehension of the RRC-robot.

In the following sections, the functional flow will be described by using the visual system as the primary identifier of the meaning of verbal words. A higher level of comprehension is achieved by correlating the visual image with the tactile, olfactory and taste pattern recognition circuits. The highest level of comprehension of the visual image, a distinctly human form of comprehension, is achieved by correlating the verbal words that describe the visual image to a verbal dictionary definition and encyclopedic description of the words or phrase that describe the visual image.

Verbal Descriptors of Visual Data:

Visual data is the primary identifier of verbal words. Training the RRC-robot to perform sub-task B-1-1 consists of programming the sub-task B-1-1 TSM to identify visual images by using words to define the visual image. The verbal words are all the nouns, adjectives adverbs and verbs of a 50,000-word lexicon that are associated with robotic visual images and tactile sensors. The high priority TIT that shifts the robot to sub-task B-1-1 is the simultaneous visual image of the trainer, coupled with the command spoken by the trainer, "identify this visual image," or "what is this." This command generates a search of all the TIT words in the 50,000 word lexicon and is programmed to respond with only one sequence of words that identify the visual image (note that the search is performed in this case by relating the visual image obtained from the visual search engine TSM (in FIG. 4), with the repeat the heard sound TSM (shown in FIG. 2-3). Learning the exact sequence of words is performed by conditioning the visual image to the words that describe the visual image.

The first step in the conditioning-training process is the noun comprehension and conceptualization phase of the training. In this step the trainer supervisor presents a visual image of the noun-object to the robot and generates the command "identify the visual image". The robot must learn to respond to this command by generating a verbal noun identifier of the image. Learning the correct verbal noun identifier is performed in a compound TSM, by conditioning a repeat the heard sound command operating on the verbal noun identifier, with the "identify the visual image" command and the visual image itself. After successive verbal identifiers spoken by the robot, the trainer-supervisor first omits the "repeat the heard sound command" and speaks only the noun identifier, followed by the omission of the noun-sound identifier. At this point the robotic response of the viewed noun-object and the command "identify the visual image," programmed into the compound TSM, is the verbal response by the robot of the verbal noun identifier. Higher levels of noun comprehension is achieved by adding verbal descriptors of the tactile, olfactory, and gustatory sensory data that is related to the visual image of the noun, and relating the verbal dictionary definition of the noun to the noun-visual image. Generally, it is convenient to perform the adjective word comprehension training, described in step 3, by coupling all possible adjectives to the noun training process described above.

The second step in the training process is the verb comprehension and conceptualization phase. In this step a videovisual action patterns presented to the visual system of the robot, may be used as the Task Initiating Triggers for a sequence of phonemes that generate the words that are descriptive of the visual action (i.e. walk, run, jump, hit, punch, hug, kiss, eat etc.). The comprehension of verb-actions is achieved when the robot learns to verbally describe the visually observed verb-action. The training methodology, including higher levels of comprehension, is the same as that described above for noun comprehension. Generally, it is convenient to perform the adverb word comprehension training, described in step 3, by coupling all possible adverbs to the verb training process described above.

The third step in the training process is the adjective and adverbs comprehension and conceptualization phase of the training. In this phase adjectives and adverbs may be attached to the nouns and verbs included in the first and second steps of the training process. The video visual data presented to the visual system of the robot include scenes that are described verbally by "walking fast," "running away," "picking up the cup," etc. The comprehension of the visual scene is achieved when the robot learns to verbally describe the observed scene verbally with a combination of nouns, adjectives, verbs and adverb. The training methodology is the same as that described above for the noun and verb comprehension training.

Higher levels of description and comprehension are included in the steps described above by including verbal descriptors of the tactile, olfactory, and gustatory sensory data that is descriptive of the verbal words defined by the visual images, and the verbal dictionary definitions and encyclopedic descriptions of the verbal words defined by the visual images.

Conceptualization:

Since the conditioned learning methodology of the pattern recognition network is experiential in nature, the training yields a circuit that may "conceptualize" the meaning and comprehension of the nouns, verbs, adjectives, and adverbs listed in the three steps described above. For example the word "chair" may be learned as the class of all objects that one "sits on", regardless of their color, shape, or material. The word "door" is conceptualized as the class of all objects that allow entry, egress, and closure of a closed space. In addition, the combined pattern recognition circuits may identify (and comprehend) an "apple" as distinct from "pear" not only by means of the visual system (shape and color) but also by the simultaneous use of the taste pattern recognition circuit, the tactile (texture) pattern recognition circuit and the olfactory pattern recognition circuit. Learning is accomplished by repeated conditioning of the "heard" sound of "apple" with the sight of an apple, with the "touch-feel" of an apple, and with the "self" generated (vocalized) sound of an "apple". That is, an apple must be recognized as a class of all objects such that the visual, tactile, olfactory and gustatory system-TITS act as a confirmatory conditioning response, and the word a-pp-le will become the conditioned response.

Robotic Comprehension of the Word 'Apple':

FIG. 10 illustrates the training steps required to program the robot to comprehend the meaning of the word "apple." In order to comprehend the word apple, it is necessary to command the robot to "identify this visual image" and to present to the robot a visual image of an apple. The command to identify this visual image is also a programming signal to generate a virtual compound TSM. The visual pattern of the apple is recognized as a TIT, and transferred to the virtual compound TSM. Immediately after the "identify this visual image command," the command to "repeat this sound-apple-" (See FIG. 10) is applied to the compound TSM. The phoneme a-f-t pattern of the word apple is then transmitted to the virtual compound TSM. The compound TSM then relates visual images with q-phoneme (a-f-t)-patterns. The pattern recognition circuit associates the TIT-word "apple" with the TIT-sight of the apple and generates a compound TIT that activates the words "I see an apple" in the Nodal Map Module, Sequence Stepper Module and Control Signal Module (CSM) shown in FIG. 10. The phonetic sound of the word "apple is accessed in the q-phoneme TSM by the "repeat this sound" command. By combining the 'repeat this sound' command applied to the word 'apple' with the 'identify this visual image' command applied to the visual image of an apple, the compound TSM may be programmed to generate the TIT-words 'I see an apple,' rather than the word 'apple' itself.

Note that prior to the time that the robot is given the hint-command "repeat the sound-apple-," the primary effect of the 'identify this visual image' command on the virtual compound TSM, is the phoneme word preface of 'I see a-'. However the robot does not know what it sees. At this point the trainer supervisor commands the robot to "repeat this sound"-'Apple.' And the robot respond with 'I see a-apple'. With repeated coupling of the command "repeat this sound"-'apple'- with the visual sight of the apple, the combined-TSM phoneme pattern recognition circuit will be conditioned to generate the 'I see an apple' response to the command 'identify this visual image', without the accompanying 'repeat this sound—apple' command. That is, every time the visual sight of an apple is coupled with the identify this visual image command, the robot will respond, 'I see an apple.' The robotic controller is now trained to comprehend the meaning of the word 'apple' (In terms of the visual-experiential impact that the apple has on the robot.)

The training methodologies for subtasks B-1, B-2, and B-3 are presented in Tables 7A, B, and C. Table 7A presents the training methodology for subtask B-1. Training the RRC-robot to perform sub-task B-1 consists of programming the sub-task B-1 TSM to identify verbally all the nouns, adjectives, verbs and adverbs (of a 50,000 word lexicon) that are presented to the robotic visual and higher level sensory systems.

TABLE 7A

Training Methodology (Subtask B-1) to verbally describe visual image data.
Subtask B-1: Verbal identification of visual images 1) The high priority TIT that shifts the robot to sub-task B-1 is the simultaneous visual image of the trainer, coupled with the command, "identify this visual image."

2) The TIT to "identify this visual image" is a compound-TIT that couples the "repeat this sound" command stored in the prime task A-TSM with the visual image TIT-data presented to the auditory RRC recording monitor.

3) After multiple repeated coupling of the 2 commands, the TSM is conditioned to verbally identify the visual image without the "repeat this sound" command 4) In order to access data stored in task B-1-1 to B-1-4 TSMs, the trainer-supervisor anticipates all possible queries that direct the system to the task B-1-1 to B-1-4 TSMs.

Compound TSMs are formed for all queries that relate to higher level sensory systems and programmed to generate a specific response to each anticipated query.

5) The trained sub-task TSMs form a memory system in the controller that verbally relates the nouns, adjectives, verbs, and adverbs in the lexicon with other sensory data.

6) Training queries to point to sub-task B-1-1 to B-1-4 TSMs. To accommodate higher level sensory systems TSMs the task B-1 TSM may be divided into 4 separate parts:

Sub-Task B-1-1 TSM stores verbal (descriptors) identification of visual images for all nouns, verbs, adjectives and adverbs listed in the 50,000 word lexicon.

Sub-Task B-1-2 TSM stores verbal dictionary definitions of all visual images and associated nouns, verbs, adjectives and adverbs listed in the 50,000 word lexicon.

Sub-Task B-1-3 TSM: The B-1-3 TSM stores verbal encyclopedic descriptions, of all visual images and nouns, verbs, adjectives and adverbs listed in the 50,000 word lexicon that are associated with them.

Sub-Task B-1-4 TSM: The B-1-4 TSM stores verbal descriptions of higher level sensory data (tactile, olfactory, gustatory) obtained on each of the visual images associated with all nouns, verbs, listed in the lexicon.

Table 7B presents the training methodology for subtask B-2. Training the RRC-robot to perform sub-task B-2 consists of programming the sub-task B-2 TSM to verbally describe all procedural tasks (and procedural TITs) trained in Table 3 (with many relations and correlations to visual and tactile data).

TABLE 7B

Training Methodology (Subtask B-2) to verbally describe experiential data
Subtask B-2: Verbal Description of experiential sensory data 1) The TITs recorded on the sub-task B-2 TSM form an experiential verbal record of everything "experienced' by the robot throughout its lifetime as measured by the operational mode time scale.

2) The training of the sub-task B-2 TSM is a "real-time" verbal recording function that takes place autonomously and simultaneously while the robot is performing other prime level tasks.

TABLE 7B-continued

Training Methodology (Subtask B-2) to verbally describe experiential data
Subtask B-2: Verbal Description of experiential sensory data 3) Training the RRC-robot to perform sub-task B-2 consists of programming the sub-task B-2 TSM to time-tag and generate verbal TITs that describe the real time procedural task performed by the robot.

4) The time tagged verbal TITs recorded in the sub-task B-2 TSM, form an experiential, time-tagged, verbal memory system that "remembers" all the robotic tasks and visual and higher level sensory tasks.

5) The time tagged verbal TIT recorded in the sub-task B-2 TSM may be accessed by the prime task C-TSMs and by queries posed to the robot that relate to the experiential operation of the robot at any time.

6) In order to access the data stored in the sub-task B-2 TSM, the trainer-supervisor anticipates all possible queries that direct the system to the sub-task B-2 TSMs. Compound TSMs are formed for all queries.

7) The sample queries that point to the sub-task B-2 TSM includes any mention within the query of present, past, or future tasks performed and the times that they were performed.

Table 7C presents the training methodology for subtask B-3. Training the RRC-robot to perform sub-task B-3 consists of programming the sub-task B-3 TSM to respond to verbal commands that activate displacement tasks that were formerly activated by visual or tactile TITs.

TABLE 7C

Training Methodology (Subtask B-3) to verbally describe
commands that activate displacement tasks
Subtask B-3 Verbal commands that activate displacement tasks 1. Only group 1-2 persons (see section C) are authorized to command the RRC-robot to perform sub-task B-3 tasks.

2. The high priority TIT that shifts the robot to sub-task B-3 is the simultaneous visual image of the group 1-2 person, coupled with the command spoken by the trainer.

3. Visual or tactile TITs generally initiate procedural tasks defined in the FIG. 3 HTD. In the sub-task B-3 TSM, new verbal initiating triggers may be created that are associated with the visual-tactile TITs.

4. The programming procedure includes the formation of a compound TSM that relates the verbal triggers (sub-task B-3 TSM) with the visual-tactile triggers (TSMs shown in FIG. 3).

Explanatory Notes:

Verbal descriptor commands are verbal commands to perform previously trained procedural tasks (prime level tasks and lower level destination tasks in FIG. 3). Verbal commands that require a verbal response (e.g., invalid or emergency commands that are not validated by the visual and higher level sensory systems) are discussed in Step 8.

Verbal Descriptor TITs that Generate Motor Action TITs:

In this case a verbal command descriptive of a procedural-displacement task is generated rather than a visual or tactile q-final TIT that generally activates displacement tasks in FIG. 4. In addition to activating the prime level tasks listed in FIG. 4 by means of a verbal clause that is descriptive of the prime level task, it is possible to activate the destination, orientation reaching and manipulation displacement actions listed in FIG. 4 by relating the appropriate verbal destination clause with the q-final TIT associated with the destination shown in FIG. 2-3. Sample auditory TIT-verbal clauses that may activate displacement tasks are "walk to the chair," "sit down," "come in," "walk out." These short clauses (shown in FIG. 2 as destination clause A, destination clause B, etc.) are analogous to the destination A, destination B, etc., daisy chains shown in the hierarchical task diagram in FIG. 4.

Incorrectly Structured Verbal Commands that Activate Displacement Tasks:

The sub-task B-3 TSM may be programmed to respond to verbal descriptor commands that are (grammatically) incorrectly structured. For example "walk to the chair" which is descriptive of a visual action may be implemented when the verbal descriptor command is "chair to walk", "chair walk to", and "walk chair to." The incorrectly structured verbal descriptor commands contain all the data required to form a compound TSM, and may be trained to form compound TSMs that not only generate a specific response, but may also be trained to include in the response, recognition of the incorrect grammatical structure and correction of the incorrect grammatical structure.

The Training Methodologies for Subtasks B-4, B-5, and B-6 are Presented in Tables 8a, 8B, and 8C.

Table 8A presents the training methodology for subtask B-4. Training the RRC-robot to perform sub-task B-4 consists of programming the sub-task B-4 TSM to describe verbally "How to" perform a previously learned procedural task. It is a process of converting visual and tactile TITs into verbal descriptor TITs.

TABLE 8A

Training Methodology (Subtasks B-4) Verbal description of "how-to" perform a previouslylearned procedural task 1) In order to verbally describe any procedural level task that the robot is trained to perform, the sub-task B-4 TSM is programmed to verbalize the procedural-TIT sequences associated with each procedural prime level Task (TSMs shown in FIG. 3).
2) The procedural TIT sequence generally consists of visual and tactile TITs, whereas the B-4 TSM TITs are the verbal words that describe each of the procedural TITs.
3) The B-4 TSM consists of compound TSMs that relate the visual and tactile TITs with the verbal words that describe each of the procedural TITs.
4) In order to access the data stored in the sub-task B-4 TSM all possible queries relating to the procedural prime level task must be anticipated and the verbal answer programmed into the compound TSM. Data stored in the B-4 TSM facilitates the answer to queries such as "how does one perform procedural task A?"

Table 8B presents the training methodology for subtask B-5. Training the RRC-robot to perform sub-task B-5 consists of programming the sub-task B-5 TSM to read a book with comprehension. Data stored in the sub-task B-5 TSM gives the robot the capability to verbally verify whether the book/article was read, when it was read, the book/article title, the book/article author, and verbally describe the contents of the book/article. Queries that access the sub/article task B-5 TSM range from whether and when a book/article was read to questions about the contents of the book/article. (Also shown as subtask T-305 in Table 3).

TABLE 8B

Subtasks B-5: Training the RRC-robot to read books.

1) The book/article title and author and the time spent "reading the book" are time tagged and maintained in the experiential (operational) mode time scale.
2) The verbal contents of the book/article are recorded and time-tagged in the training mode time scale
3) Robotic comprehension of the verbal contents of a book is achieved by relating the written words to the sub-task B-1 TSMs (visual, auditory and tactile TITs that are associated with those words).
4) The data stored in the sub-task B-5 TSM allows the robot to remember and recall the contents of the book in the training mode time scale.
5) In order to access the data stored in the sub-task B-5 TSM all possible queries relating to the reading of the book and the contents of the book must be anticipated and the verbal answer programmed into the compound TSM.
6) The robot may also be trained to read with comprehension suitably written (listing both visual tactile and verbal TITs) "How to" books (e.g "How to" deliver mail, wash dishes, repair a lawn-mower motor etc), and utilize that information in implementing those "how to" tasks.

TABLE 8B-continued

Subtasks B-5: Training the RRC-robot to read books.

7) Queries that access the sub/article task B-5 TSM range from whether and when a book/article was read to questions about the contents of the book/article.

Table 8C presents the training methodology for subtask B-6. Training the RRC-robot to perform sub-task B-6 includes programming sub-task B-6 TSM to comprehend numbers and perform mathematical computations. The sub-task B-6 TSM stores numbers and units attached to those numbers and procedural data relating to the operational tasks of arithmetic, algebra, geometry, calculus and statistical mechanics. The amount of data stored in sub-task B-6 TSM is determined by the queries anticipated by the trainer-supervisor relating to numbers, arithmetic, algebra, geometry, calculus and statistical mechanics, and the answers that must be programmed into the compound TSMs that represent a quantitative mathematical response to the query. (See Table 3 sub-T-306).

TABLE 8C

Subtask B-6. Training the task B-6 TSM to comprehend numbers and perform mathematical computations.

1) Sub-task B-6 TSM expands the comprehension of words described in sub-task B-TSM to numbers and their attached units.
2) Sub-task B-6 TSM may be trained to perform (in training mode time scale) the procedural operational tasks of arithmetic, algebra, geometry, calculus and statistical mathematics.
3) The B-6 TSM relates the comprehension of verbal and written numbers and their attached units to the procedural operational tasks that it has been trained to perform.
4) Comprehension of numbers occurs in the training mode time scale and expands on the comprehension of numbers present in the 50,000 word lexicon (see section 7, prime task B).
5) The operations of addition subtraction multiplication and division are procedural task that are performed in the training time mode either by written or verbal communication.
6) The RRC may be trained to solve addition, subtraction, and multiplications problems by using an auxiliary device, such as a calculator. However, this method reduces the mathematical comprehension of the task B-6 TSM.
7) Procedural algorithmic training (similar to the methods taught humans) is performed in the task B-6 TSM to store all the arithmetic, algebraic, geometric, calculus, and statistical mechanics procedural algorithms for solving problems in that field.
8) Mathematical queries may be presented to the RRC verbally or in printed form. The robot shall be trained to answer queries either verbally or in written form.
9) In the training mode, the Task B-6 TSM performs all the mathematical exercises present in a standard mathematical text book.
10) A sampling of queries that access the task B-6 TSM are verbal word problems or printed problems or exercises Step 8. Training the Prime Task C TSM to Respond Verbally to Verbal Speech Explanatory Notes:

Robot-robot and robot-human verbal interactions are generally auxiliary interactions that are performed after the robot has been trained to perform multiple procedural tasks listed in FIG. 4 and the prime level A and B declarative tasks listed in FIG. 2-3 and Table 3. The auditory RRC-robot is initially trained to interact with the following groups of persons. Group-1 persons are the trainer-supervisors of the RRC-robot. Only the trainer-supervisors may interrupt or modify the primary programming of the robot (programming of all prime level task TSMs). Group-2 consists of those persons who are associated with the procedural-jobs that the robot is trained to perform. The robot is trained to visually recognize and verbally identify by name all the persons who are members of group 1 and group 2. Members of those groups are trained to interact with the RRC-robot. Members of group 2 may interrupt an on-going procedural task and place the robot in the conversational mode described in sub-task C-1, and also allow the robot to resume the procedural task that was interrupted. Group-3 persons consist of all people who are not members of groups 1-2 (persons not associated with the jobs that the robot is procedurally trained to perform). Interactions with persons in groups 1-2 is described in sub-task C-1. Interactions with persons in group-3 are described in sub-task C-2, the "in passing" non-confrontational mode, and sub-task C-3, the "in passing" confrontational mode. Group 3 persons are generally not visually recognized by the robot and are regarded as strangers who do not know or understand the programming of the robot. However, a multitasking robot that operates in the public arena is trained, first and foremost, with a prime directive that any physical interaction with another human or robot is forbidden. Not only are humanoid robots programmed to avoid obstacles that trigger their "skin-like" pressure transducers, they are also programmed that under all circumstances pressure transducer contact with another human is doubly forbidden. Humanoid robots are programmed to obey rules of pedestrian and vehicular traffic, visually recognize and respond to policemen, firemen, or public workers, and visually recognize and avoid commonly occurring unusual situations or emergencies. Finally, as a general rule, the trained RRC-robot should not placed in an environment that the robot is not trained to cope with. Since the RRC-robot is trained to avoid all obstacles and all physical interactions with humans, it is prudent not to place the robot in an environment where humans are bent on the robot's destruction.

The Training Methodologies for Subtasks C-1, C-2, and C-3 are Presented in Table 9A-B-C:

Table 9A presents the training methodology for subtask C-1. Training the RRC-robot to perform sub-task C-1 consists of programming the sub-task C-1 TSM to perform robotic conversation, first with the trainers (group-1 persons) and then with robotic companions (group-2). (Listed as task T-401 in Table 3).

Conversational Constraints Related to Subtask C-1:

Any statement or question posed to the RRC-robot requires that the RRC-controller search through its TSM-declarative memory systems for an appropriate reply. In general the RRC is trained to utilize the search engine access rule described in the introductory explanatory notes to Section D, in order to facilitate the search for an appropriate response to any auditory input signal. Immediately after the RRC-robot is placed in a conversational mode it is necessary that the robot apply the access rule to any verbal input that represents a question or statement directed to the RRC-robot. The access rule applied to the query should abstract and point towards a TSM or compound TSM where the reply to the input query may be stored.

The eight most important TSMs available to form compound TSMs for the sub-task C-1 conversational mode are the following:

1. Sub-Task B-1-1 TSM: The B-1-1 TSM stores sets of TITs of verbal (descriptors) identification of visual images for all nouns, verbs, adjectives and adverbs listed in the 50,000 word lexicon.

2. Sub-task B-1-2 TSM: The B-1-2 TSM stores sets of TITs of verbal dictionary definitions of all visual images and the nouns, verbs, adjectives and adverbs listed in the 50,000 word lexicon that are associated with them.

3. Sub-Task B-1-3 TSM: The B-1-3 TSM stores sets of TITs of verbal encyclopedic descriptions, of all visual images and nouns, verbs, adjectives and adverbs listed in the 50,000 word lexicon that are associated with them.

4. Sub-Task B-1-4 TSM: The B-1-4 TSM stores sets of TITs of verbal descriptions of higher level sensory data (tactile, olfactory, gustatory) obtained for each visual image associated with all nouns, verbs, adjectives and adverbs listed in the 50,000 word lexicon.

TABLE 9A

Programming Robot to Perform Robotic Conversation
Subtask C-1: programming robot to perform robotic conversation 1. The high priority TIT that shifts the robot to a conversational mode, the sub-task C-1 mode, is a simultaneous visually recognized image of a group 1-2 person, and the spoken words by the person "stop-lets talk" or "lets talk."
2. The "stop-lets talk command causes the robot to interrupt the procedural task it is doing and devote itself to conversation, whereas the "lets talk" command allows the robot to continue the procedural task and converse during the ongoing procedural task.
3. The sub-task C-1 TSM is trained to utilize the search engine access rule to form a set of compound TSMs and search for the particular TSM that has the proper response programmed into it.
4. A sampling of verbal queries that point to the B-1-1 to B-1-4 TSMs and a sample set of responses programmed into the task B-1-1 to B-1-4 TSMs is presented in section 7.1 (Note, the verbal definition of a visual image (B-1-2 TSM) may be used to comprehend that image).
5. A sampling of verbal queries that point to the B-2 TSM and a sample set of responses programmed into the sub-task B-2 TSM is presented in section 7.2.
6. A sampling of verbal queries that point to the B-4 TSM and a sample set of responses programmed into the sub-task B-4 TSM is presented in section 7.4.
7. A sampling of verbal queries that point to the B-5 TSM and a sample set of responses programmed into the sub-task B-5 TSM is presented in section 7.5.
8. A sampling of verbal queries that point to the B-6 TSM and a sample set of responses programmed into the sub-task B-6 TSM is presented in section 7.6 (Note that the RRC-robot cannot discuss topics and data obtained from books and/or periodicals that have not been programmed into the TSM system).
9. The generated verbal speech exhibits "comprehension" of the input sound signal by training the response so it is based on the TITs programmed into the task B TSMs that exhibit comprehension (relations to visual-auditory-tactile-olfactory-gustatory data) of the words and sentences stored therein.

5. Sub-Task B-2 TSM: The B-2 TSM stores sets of TITs of time tagged verbal "memories" of past, present, experiential tasks and actions performed by the robot (operational mode time scale) and future tasks planned and programmed using the operational mode time scale.

6. Sub-Task B-4 TSM: The B-4 TSM stores sets of TITs of time independent "How to" Verbal descriptors of all procedural tasks.

7. Sub-Task B-5 TSM: The B-5 TSM stores sets of TITs of time tagged verbal descriptors of all books, articles, newspapers, and notes "read" with comprehension by the RRC-robot. Note that the date and time of reading-training the contents of the reading material is time tagged in the operational mode time scale, whereas the story line of the reading material may be time tagged in book-time, a subcategory of the training mode time scale.

8. Sub-Task B-6 TSM: The B-6 TSM stores sets of TITs of time independent verbal descriptors of numbers and mathematical computations that the robot is trained to perform.

Programming the access rule into the queries is a process that begins with the programming of the prime task B TSMs themselves. In the design of each task B TSM (comprehension tasks) all possible queries associated with sub-task C-1 must be anticipated whenever a (comprehensive) verbal sentence is programmed into the task B TSM. For each of the possible queries one or more of the array of task B TSMs must have an appropriate and specific answer programmed into it. The programming technique (and the manpower required) is similar to the programming of some of the word based search engines such as Google or Bing.

Conversational Constraints Related to Subtask C-2:

Table 9B presents the training methodology for subtask C-2. Training the RRC-robot to perform sub-task C-2 consists of programming the sub-task C-2 TSM to respond to polite auditory confrontations (group-3 persons), (listed as task T-402 in Table 3, and Sub-task C-2 in FIG. 2). A multi-tasking robot that operates in the public arena is trained to obey the laws and rules of pedestrian and vehicular traffic, visually recognize and verbally respond to policemen, firemen, or public workers, and visually recognize and avoid commonly occurring unusual situations or emergencies. The sub-task C-2 TSM is programmed to add a polite verbal interaction capability to RRC-robots that operate in the public arena.

TABLE 9B

Subtask C-2: "In Passing" Non-Confrontational Mode.

1. The sub-task C-2 TSM responds verbally to a non-confrontational, "in passing," verbal statement generated by a group-3 person. The "in passing" verbal encounter is treated as an obstacle that delays but does not interrupt the operational task. The verbal statements consist of greetings, questions, friendly comments, and non-confrontational statement.
2. The sub-task C-2 TSM is programmed to respond politely to all non-confrontational statements anticipated by the trainer-supervisor.
3. All queries that request information or lengthy conversation are programmed with the response that ends the encounter. For example, a response such as "sorry, I am not programmed to talk to you or answer any additional queries."

Conversational Constraints Related to Subtask C-3:

Table 9C presents the training methodology for subtask C-3. Training the RRC-robot to perform sub-task C-3 consists of programming the sub-task C-3 TSM to respond to auditory confrontations, emergency sounds, and valid/invalid commands (group-3 persons). Task T-403 in Table 3, and Sub-task C-3 in FIG. 2.

A visual, non-verbal multi-tasking RRC robot is trained to operate cooperatively and inconspicuously in any confrontational or emergency situation that it has not been programmed to cope with. The visual, verbal multi-tasking RRC-robot adheres to the trained procedural response of the non-verbal RRC, except that the declarative memory system, namely the sub-task C-3 TSM, is accessible to verbally enhance the cooperative, inconspicuous training of the non-verbal RRC.

The subtask C-3 TSM is programmed to interrupt any operational task that it is performing, and respond to a) a verbal or physical obstruction by a group-3 person, b) a commanding, authoritative loud sound, c) a loud sound such as a scream, screech, crash, explosion, siren, etc., and d) an emergency situation (obstructions or accidents). In order to discuss the verbal response of the task C-3 TSM, group 3 persons are divided into 2 sub-groups. The first sub-group, C-3a, includes group-3 persons that are recognized as policemen, firemen, ambulance personnel, and authoritative public leaders (mayor, councilman, etc.). The second subgroup, C-3b, includes pedestrians, curious viewers, or victims or perpetrators of the situation.

TABLE 9C

Sub-task C-3, the "in passing" Confrontational mode.

1. The high priority TIT that shifts the robot to sub-task C-3 is a physical or verbal obstruction by a group-3 person, a commanding or authoritative sound, or an emergency sound (e.g., scream, crash, siren, etc), often coupled with visual and tactile emergency TITs.
2. The robot must first assure whether the interaction is with a person in subgroup C-3a o rC-3b. (If uncertain-The RRC may ask "are you a policeman?")
3. In case of a verbal or physical obstruction by a subgroup C-3b person, the RRC-robot couples a verbal response with a careful, non-violent withdrawal from the interaction. In the case where the interaction does not involve physical contact, a sample verbal response is "sorry, I am not programmed to talk to you or answer any additional queries- I must now return to my job."
In the case where the interaction is becoming violent and may lead to damage to the robot, a sample verbal response is "stop! stop! I am calling the police, stop!"
4. In case of an emergency sound or a commanding authoritative sound not directed at the robot, a RRC-robot not specifically trained to cope with this emergency situation shall obtain visual, tactile, and/or olfactory data and respond to the sound by moving to a safe location.The auditory RRC-robot shall respond to a un-recognized non-confrontational, commanding, authoritative sound as specified above. If the authoritative sound is coupled with confrontational behavior the sub-task C-3 TSM shall respond as specified above.
5. In an emergency in which the auditory data (e.g., screech, explosion, etc) is validated by visual-tactile data, a RRC-robot co-mingling with group-3 people is trained to interrupt its operational displacement tasks, respond verbally to emergency queries, accept a limited number of emergency commands, and wait until questioned by subgroup C-3a persons.
6. Emergency queries programmed into task C-3 TSM include a) what happened? ("I don't know," "I saw an accident", etc.) b) "where is a safe location," or "lets get out of here."
7. Sample emergency commands & queries accepted by the RRC robot are "lets get out of here," "step aside," "please stand out of the way, in the corner, and " "who are you?" "identify yourself," "what were you doing at this location," etc.
8. Queries that access the sub/article task B-5 TSM range from whether and when a book/article was read to questions about the contents of the book/article. Improvements associated with b) higher levels of intelligence programmed into the system.

Higher levels of identification recognition and comprehension may be applied to any sensation by relating the sensation to a larger number of related patterns and signals obtained by all the sensors. For example, the sensation resulting from visualization and comprehension of the image allows the robot to a) reconstruct and distinguish the characteristics of a low resolution or partly obscured sensation-image by accessing data stored in the memory storage system of the RRC robot. b) Distinguish whether the image presents a threat or is benign (such as a dangerous gun versus a toy gun). And c) distinguish the magnitude of any threat or obstacle by means of the priority level assigned to any recognized image. For example high levels of artificial intelligence may be achieved by use of the awareness of feedback data from joints and reaction forces from the ground when training the robot to walk, run or dance like a human.

In general, higher levels of identification, recognition, awareness and comprehension applied to any sensation improves the sensation itself and leads to greater knowledge of how to respond to the sensation.

Section E—Innovative Robotic Speech Processing and Commercial Application

Improvements in Robotic Verbalization and Speech Processing that Lead to Commercial Application Step 6a in the Interface Circuit Stage (Table 1) describes the unique speech processing methodology performed in the design of the intelligent verbalizing RRC-Robot. The auditory RRC-robot performs speech processing in a unique manner that diverges from the standard methodologies of speech processing, such as word recognition processing, lexical segmentation processing, interactive-activation processing, context effect processing, syntactic effects on lexical access processing, lexical information and sentence processing, syntactic processing and intonation-structure processing. Instead, speech processing is performed by training the verbal-phoneme sound generators to repeat the "heard" phoneme-sound based words and sentences. The RRC is trained to identify and recognize co-articulated word structures and commonly used colloquial expressions. Furthermore, in section D, the RRC robot is trained to comprehend experientially the processed words and sentences. The result is a greatly improved capability of the RRC Robot to understand the heard words and sentences and to respond intelligently to the heard words and sentences.

Great Improvements in State of the Art of Speech Processing Occurs in the Mapping of the Single Variable Acoustic Signal onto the Multi-Variable Phonetic Structure.

A unique phonetic structure requires 'unpacking' all the variables that are dependent on the phonetic structure. In the Auditory RRC-Robot "Unpacking" is performed by training the RRC to repeat and "remember" the "heard" words and sentences of multiple speakers as described above. Further "unpacking" is performed by increasing the AI-level of the RRC-robot by relating, associating, and calibrating the heard verbal speech with the corresponding visual and tactile data obtained in the visual and tactile coordinate frames in which the robot is operating. This increase in the AI-level leads to the development of a sensitivity to such factors as a) acoustic phonetic context, speaking rates, and loudness, which are detected. recognized and comprehended by the TSMs that make up the memory system of the Declarative Hierarchical Task Diagram (DHTD), b) the speakers 'body' language (including facial expression), which are detected recognized and comprehended by use of the visual search engine of the procedural HTD, and c) "emotion laden" intonations that include phonetic context, speaking rates, loudness, and body language, which are detected by coordinating the search engines of the visual and tactile systems with the search engine of the auditory RRC. The auditory-visual RRC takes into account the acoustic consequences of such variations when mapping the acoustic signal into the phonetic structure.

In Addition the RRC Humanoid Robot My be Programmed to Recognize and Correct Incorrect Grammatical Structures:

Grammatical rules are implicitly programmed into the system in the training phase when queries are anticipated in order to access data stored in the TSMs, and when compound TSMs are formed that contain a specific verbal response to the query. Incorrectly structured queries must include sufficient information to form compound TSMs. Such queries are trained to form compound TSMs that not only generate a specific response to the query, but are also trained to include within the response, recognition of the incorrect grammatical structure and correction of the incorrect grammatical structure.

Auditory RRC-Verbalizing Answering Machine System:

Commercial application of the invented robotic speech processing capability is exemplified by the RRC-auditory verbalizing answering machine. A stand alone RRC-answering machine is formed by combining 3 parts of a fully trained Auditory RRC Humanoid Robot: a) The auditory apparatus stage, b) The auditory Interface Circuit Stage, and c) The RRC processing stage. A fully trained RRC-auditory-verbalizing answering is sold separately (without the robotic body and limbs) as a stand-alone system.

RRC-auditory verbalizing answering machines may function as telephone answering machines, as a receptionist in any office, commercial organization, non-profit organizations (museums, art galleries, etc.), as a receptionist and guide to any federal, state and local governmental organizations, and as a search engine that is accessed verbally and responds verbally to any query.

Note that RRC-auditory-verbalizing answering machines are unique in that they are the only ones that use an internal one-to-one mapping methodology of the acoustic signals onto a reasonable phonetic structure. As a result, for example, the preferred embodiment system is designed to recognize any word present in a 50,000-word lexicon, and any sentence made up of those words. This leads to an accuracy of identification and recognition of words and sentences approaching 100%. Furthermore, with the search engine access rule the system may be programmed to respond verbally and appropriately to any query.

Section F—the Underlying Electronic System

The electronic control system described in the foregoing pages is a stand-alone robotic controller, the RRC, that is programmed experientially using innovative behavioral programming-training techniques. The underlying computational system is implemented as a set of software processes that are specified as is typical for software processes. That is, as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The high level memory of the RRC-system, described in this disclosure, is implemented in the Task Selector Modules (TSMs), which are described by reference to FIGS. 2-3. However, the term 'memory' also refers to the storage medium used to implement the underlying component subsystems. In that context, the term 'software,' is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.□

FIG. 11 conceptually illustrates an electronic system 1100 with which some embodiments of the invention are implemented. The electronic system 1100 may be a computer, phone, PDA, or any other sort of electronic device. Such an electronic system includes various types of computer readable media and interfaces for various other types of computer readable media. Electronic system 1100 includes a bus 1105, processing unit(s) 1110, a system memory 1115, a read-only 1120, a permanent storage device 1125, input devices 1130, output devices 1135, and a network 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only 1120, the system memory 1115, and the permanent storage device 1125.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1125.

Other embodiments use a removable storage device (such as a floppy disk or a flash drive) as the permanent storage device 1125. Like the permanent storage device 1125, the system memory 1115 is a read-and-write memory device. However, unlike storage device 1125, the system memory 1115 is a volatile read-and-write memory, such as a random access memory. The system memory 1115 stores some of the instructions and data that the processor needs at runtime. In some embodiments, the invention's processes are stored in the system memory 1115, the permanent storage device 1125, and/or the read-only 1120. For example, the various memory units include instructions for processing appearance alterations of displayable characters in accordance with some embodiments. From these various memory units, the processing unit(s) 1110 retrieves instructions to execute and data to process in order to execute the processes of some embodiments.

The bus 1105 also connects to the input and output devices 1130 and 1135. The input devices enable the user to communicate information and select commands to the electronic system. The input devices 1130 include alphanumeric keyboards and pointing devices (also called "cursor control devices"). The output devices 1135 display images generated by the electronic system 1100. The output devices 1135 include printers and display devices, such as cathode ray tubes (CRT) or liquid crystal displays (LCD). Some embodiments include devices such as a touchscreen that functions as both input and output devices.

Finally, as shown in FIG. 11, bus 1105 also couples electronic system 1100 to a network 1140 through a network adapter (not shown). In this manner, the computer can be a part of a network of computers (such as a local area network ("LAN"), a wide area network ("WAN"), or an Intranet), or a network of networks (such as the Internet). Any or all components of electronic system 1100 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Section G—Differentiating Between Robotic and Human-Like Subjective Experiences

To avoid philosophical discussions, is important to note that the authors do not claim that the intelligent robots, with subjective data programmed into them, have the same subjective experiences and emotions that a human has in 'feeling' the tactile data, 'seeing' the visual data, 'hearing' the auditory data, etc. The data is robotically subjective because it is programmed into the self-identity/self-knowledge coordinate frame of the robot. The robot's internal reaction to the data, or whether the robot has an internal reaction is not known to the authors. The authors do not claim that the robot has emotions (pain, pleasure, boredom, love, hate etc.), similar to a human. However, the robots external reaction to the data is experientially, that is behaviorally, programmed to be identical to human behavior. The robot behaves as if it feels the tactile data, as if it sees the visual data, and as if it hears and understands the auditory data. That is why we speak of robots with 'experiential feeling,' 'experiential seeing,' 'experiential hearing,' 'experiential smelling,' 'experiential tasting,' and 'experiential intelligence and knowledge.

While the invention has been described with reference to numerous specific details, one of ordinary skill in the art will recognize that the invention can be embodied in other specific forms without departing from the spirit of the invention. One embodiment disclosed herein is for an Auditory RRC-humanoid robot programmed to achieve human-like levels of verbalization and auditory artificial intelligence (AI). The Auditory-RRC is built upon the Visual-RRC, a disclosure of which is included in co-pending U.S. Non-Provisional patent application Ser. No. 14/253,861, filed Apr. 15, 2014, which in turn is built upon a Relational Robotic Controller (RRC), described in U.S. Pat. No. 6,560,512, dated May 6, 2003, by adding; a) an Auditory recording monitor, b) a verbal-phoneme sound generator, c) a new Interface Circuit between the auditory recording monitor, the verbal-phoneme sound generator, and the RRC, and d) a new auditory-verbalizing programming capability that gives the robot human-like intelligent capability to hear and understand verbal speech and respond intelligently by verbalizing a response to the heard signal. Although preferred embodiments are disclosed herein, many variations are possible which remain within the concept, scope, and spirit of the invention; these variations would be clear to those skilled in the art after perusal of this application.

In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Thus, one of ordinary skill in the art would understand that the invention is not to be limited by the foregoing illustrative details, but rather is to be defined by the appended claims. In the claims section the authors will stress claims that are inherent to the newly added subsystems, and avoid redundant claims associated with claims made in the previously patented disclosure. However, some degree of redundancy is incorporated into the Auditory RRC-Humanoid Robot claims section whenever verbalization-AI is added to the procedural intelligence describe in the other patents and guided by the Procedural HTD (PHTD).

We claim:

1. An auditory relational robotic controller (RRC)-humanoid robot comprising:
    a human-like mechanical robotic system comprising a human-like tactile recording monitor, a human-like visual recording monitor, and a human-like robotic body comprising a set of bipedal limbs, a set of arms, a set of hands, a set of fingers, an energy power source, and sets of motors and gears used to move the body, limbs, arms, hands, and fingers;
    an auditory human-like recording monitor sensitive to an auditory frequency range of 1-20,000 cycles per second (cps), said auditory human-like recording monitor comprising a set of linear pickup microphones and a set of spectrum analyzers that convert incoming sound into electronic phonetic (a-f-t)-signal output characterized by an amplitude, frequency, time (a-f-t) chart showing the amplitude and frequency of the incoming sound as a function of time;
    a relational robotic controller (RRC) that satisfies a set of specification requirements for relational robotic controllers;
    a verbal-phoneme sound generator that generates sequences of phoneme sounds that are controlled by the RRC;
    an interface circuit positioned between the auditory human-like recording monitor and the RRC, said interface circuit configured to decompose an electronic phonetic (a-f-t)-signal output of each spectrum analyzer into collective modalities tuned to the characteristics of verbal speech, generate a q-magnitude and p-direction p-phoneme vector that is a suitable input to a multi-dimensional function space Nodal Map Module (NMM), standardize the p-phoneme vector to operate in a Task Selector Module (TSM), the NMM, a Sequence Stepper Module (SSM) of the RRC, and successfully activate the verbal-phoneme sound generator, and develop a speech processing methodology for obtaining a one-to-one mapping of the acoustic signals onto a phonetic structure free of segmentation errors; and
    a programming methodology defined by a Declarative Hierarchical Task Diagram (DHTD) specification that provides the robot a human-like, high IQ form of verbal artificial intelligence (AI).

2. The auditory RRC-humanoid robot of claim 1, wherein the TSM is included in a Hierarchical Task Diagram (HTD) structure for the assignment of priorities to Task Initiating Trigger TIT-patterns that activate tasks selected by the TSM.

3. The auditory RRC-humanoid robot of claim 1, wherein the verbal-phoneme sound generator generates 120 different phoneme sounds.

4. The auditory RRC-humanoid robot of claim 3, wherein each phoneme sound output of the verbal-phoneme sound generator is activated by one of the 120 different auditory p-vectors.

5. The auditory RRC-humanoid robot of claim 1, wherein the set of linear pickup microphones comprises a right-side linear pickup microphone positioned on the right of an electronic enclosure and a left-side linear pickup microphone positioned on the left of the electronic enclosure.

6. The auditory RRC-humanoid robot of claim 5, wherein the set of spectrum analyzers comprises a first spectrum analyzer that converts incoming sound from the right-side linear pickup microphone and a second spectrum analyzer that converts incoming sound from the left-side linear pickup microphone.

7. The auditory RRC-humanoid robot of claim 1, wherein the DHTD specification comprises a programming methodology that is used to program each auditory TSM.

8. The auditory RRC-humanoid robot of claim 7 further comprising a declarative memory system comprising all programmed auditory TSMs within the RRC.

9. The auditory RRC-humanoid robot of claim 8, wherein the TSMs identify a sequential set of phonemes as a TIT-grouping.

10. The auditory RRC-humanoid robot of claim 9, wherein a TIT-processing period associated with each TIT-grouping determines the number of sequential phonemes that must be processed before the RRC recognizes the total sequence as a TIT.

11. The auditory RRC-humanoid robot of claim 10, wherein a TSM is programmed to repeat sounds spoken by a trainer-supervisor.

12. The auditory RRC-humanoid robot of claim 11, wherein the TSM is programmed to accurately repeat all the words and sentences taken from a lexicon comprising at least 50,000 words that represents a total vocabulary of the robot.

13. The auditory RRC-humanoid robot of claim 12, wherein a TSM is optimized to properly enunciate words and sentences listed in the lexicon by refining a design of the verbal-phoneme sound generator to assure that lexical segmentation and timing intervals between successive phonemes correctly reflect phonetic structure, expanding the number of phoneme sounds to reduce segmentation problems, and refining tuning of collective modalities generated by the set of spectrum analyzers to the actual collective modalities present in an English language verbal input signal.

14. The auditory RRC-humanoid robot of claim 13, wherein a one-to-one mapping between acoustic properties of speech and phonetic structure of an utterance is performed by training the TSM to repeat, recognize, and remember the heard words and sentences.

15. The auditory RRC-humanoid robot of claim 1, wherein the behavioral programming methodology is experiential in a manner such that the system relates, correlates, prioritizes and remembers input patterns by performing verbalization tasks with the verbal phoneme sound generator and relating the performed verbalization tasks to manual dexterity manipulation task TITs, locomotion tasks, and visualization task TITs associated with the self-location and identification coordinate frame.

16. The auditory RRC-humanoid robot of claim 15, wherein behavioral programming techniques are guided by a Hierarchical Task Diagram (HTD) in order to achieve high levels of AI for robotic self-knowledge, identification, recognition, visualization or comprehension of input sensory patterns.

17. The auditory RRC-humanoid robot of claim 16, wherein the robotic self-knowledge level of artificial intelligence, analogous to human proprioceptive self-knowledge, comprises training/programming the robot to reach and touch all itch points located on the surface of the robotic body, and all points in the near space surrounding the robotic body, identify and locate all itch points, and identify and locate all end joint body parts used to reach and touch all the itch points.

18. The auditory RRC-humanoid robot of claim 1, wherein a stand-alone RRC-auditory-verbalizing answering machine system is formed by combining three core parts of a fully trained auditory RRC-humanoid robot, wherein the three core parts comprise an RRC system, an auditory RRC recording monitor comprising a set of pick-up microphones and an interface spectrum analyzer, and a verbal phoneme sound generator.

19. The auditory RRC-humanoid robot of claim 18, wherein the stand-alone RRC-auditory-verbalizing answering machine system is experientially trained by an entire RRC-humanoid robotic system comprising sensors and a complete robotic body and limbs.

20. The auditory RRC-humanoid robot of claim 19, wherein the stand-alone RRC-auditory-verbalizing answering machine system obtains specialized trained expertise and verbal IQ AI level that is a subset of the total AI level experientially trained by an entire RRC-humanoid robotic system.

* * * * *